(12) United States Patent
Ruopp et al.

(10) Patent No.: US 11,802,644 B2
(45) Date of Patent: Oct. 31, 2023

(54) HYDRAULIC LINE COUPLING FOR A HYDRAULIC BRAKE OR CLUTCH OF HANDLEBAR-OPERATED VEHICLES AND HYDRAULIC BRAKE OF A HANDLEBAR-OPERATED VEHICLE

(71) Applicant: Gustav Magenwirth GmbH & Co. KG, Bad Urach (DE)

(72) Inventors: Michael Ruopp, Berghülen (DE); Kevin Braunger, Laupheim (DE); Axel Wechsler, Sindelfingen (DE); Christian Neutsch, Reutlingen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 341 days.

(21) Appl. No.: 16/891,430

(22) Filed: Jun. 3, 2020

(65) Prior Publication Data

US 2020/0378539 A1   Dec. 3, 2020

(30) Foreign Application Priority Data

Jun. 3, 2019 (DE) ...................... 10 2019 208 066.9

(51) Int. Cl.
*F16L 37/40* (2006.01)
*B60T 17/04* (2006.01)
(Continued)

(52) U.S. Cl.
CPC ............ *F16L 37/40* (2013.01); *B60T 17/043* (2013.01); *F16D 48/02* (2013.01); *F16L 37/1225* (2013.01); *F16D 2048/0257* (2013.01)

(58) Field of Classification Search
CPC ......... F16L 37/1225; F16L 37/142–148; F16L 37/40; F16L 37/407; F16L 37/42; B60T 17/043
(Continued)

(56) References Cited

U.S. PATENT DOCUMENTS 3,567,175 A * 3/1971 Sciuto, Jr. ............... F16L 37/40
  251/149.6
5,150,880 A * 9/1992 Austin, Jr. ............. F16L 37/60
  251/149.3
(Continued)

FOREIGN PATENT DOCUMENTS

CN   201330906 Y   10/2009
DE   2617620 A1    11/1977
(Continued)

OTHER PUBLICATIONS

European Search Report for European Patent Application No. 20177708.3 dated Nov. 3, 2020.
(Continued)

*Primary Examiner* — Kevin F Murphy
(74) *Attorney, Agent, or Firm* — Gregory L. Mayback; Mayback IP Law, P.A.

(57) ABSTRACT

A hydraulic line coupling, for a hydraulic brake or clutch of handlebar-operated vehicles, having a line connection piece with a hydraulic line extension and a housing with a coupling opening, in which the line connection piece for coupling the line to the housing can be disposed. The connection piece comprises a passage connected to the line. A valve device is disposed in the housing and is configured such that the valve device closes the connection for the connection piece when the connection piece is not in the coupling opening. The line coupling has a seal, with which seal the valve device closes the connection for the connection piece when the connection piece is not in the coupling opening. With the seal, the connection piece seals the passage from the environment when the connection piece is in the coupling opening.

23 Claims, 45 Drawing Sheets

(51) Int. Cl.
*F16D 48/02* (2006.01)
*F16L 37/12* (2006.01)

(58) Field of Classification Search
USPC .......................................... 251/149.1, 149.6
See application file for complete search history.

(56) References Cited

U.S. PATENT DOCUMENTS

| | | | | |
|---|---|---|---|---|
| 5,253,842 | A | * | 10/1993 | Huebscher ............ F16L 37/40 |
| | | | | 251/149.6 |
| 6,089,540 | A | * | 7/2000 | Heinrichs ............. F16L 37/40 |
| | | | | 251/149.6 |
| 8,813,782 | B2 | * | 8/2014 | Becocci ................ F16L 37/35 |
| | | | | 137/614.04 |
| 2008/0129045 | A1 | * | 6/2008 | Shimizu ............... F16L 13/146 |
| | | | | 285/258 |
| 2014/0225364 | A1 | | 8/2014 | Tsai |
| 2016/0084413 | A1 | | 3/2016 | Wen |
| 2016/0200392 | A1 | | 7/2016 | Bradley et al. |

FOREIGN PATENT DOCUMENTS

| | | |
|---|---|---|
| DE | 102015106236 A1 | 3/2016 |
| EP | 1514758 A1 | 3/2005 |
| EP | 2431647 B1 | 8/2014 |

OTHER PUBLICATIONS

German Search Report for German Patent Application No. 10 2019 208 066.9 dated Mar. 10, 2020.

* cited by examiner

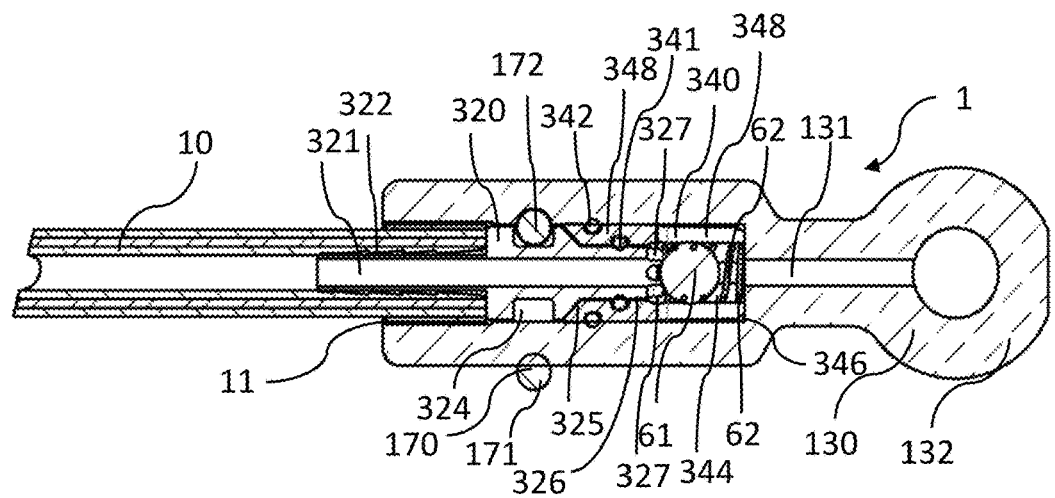
Fig. 18
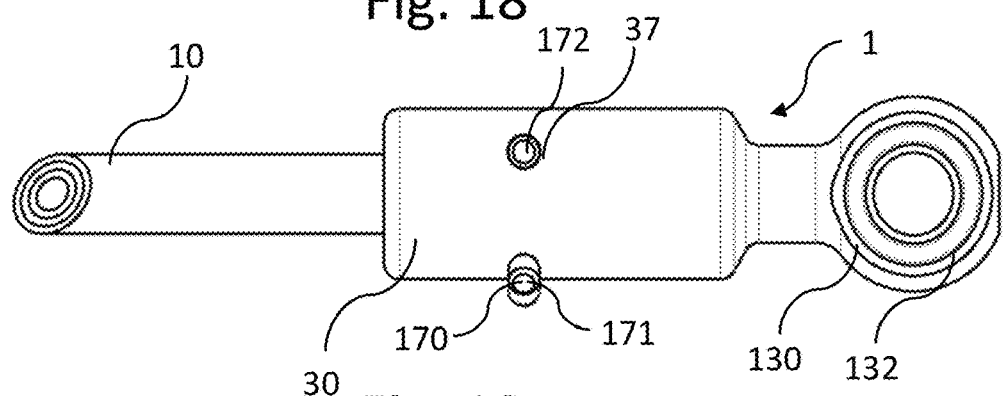
Fig. 19
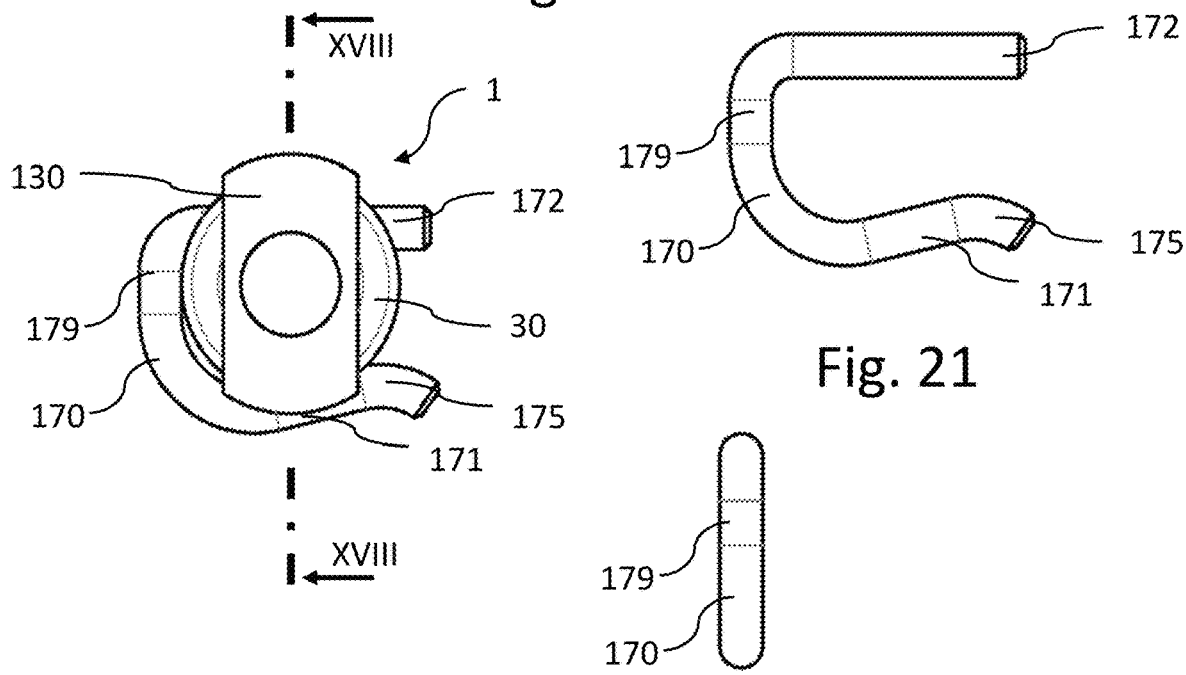
Fig. 20
Fig. 21
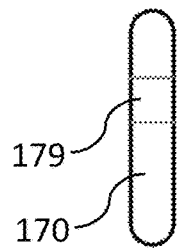
Fig. 22

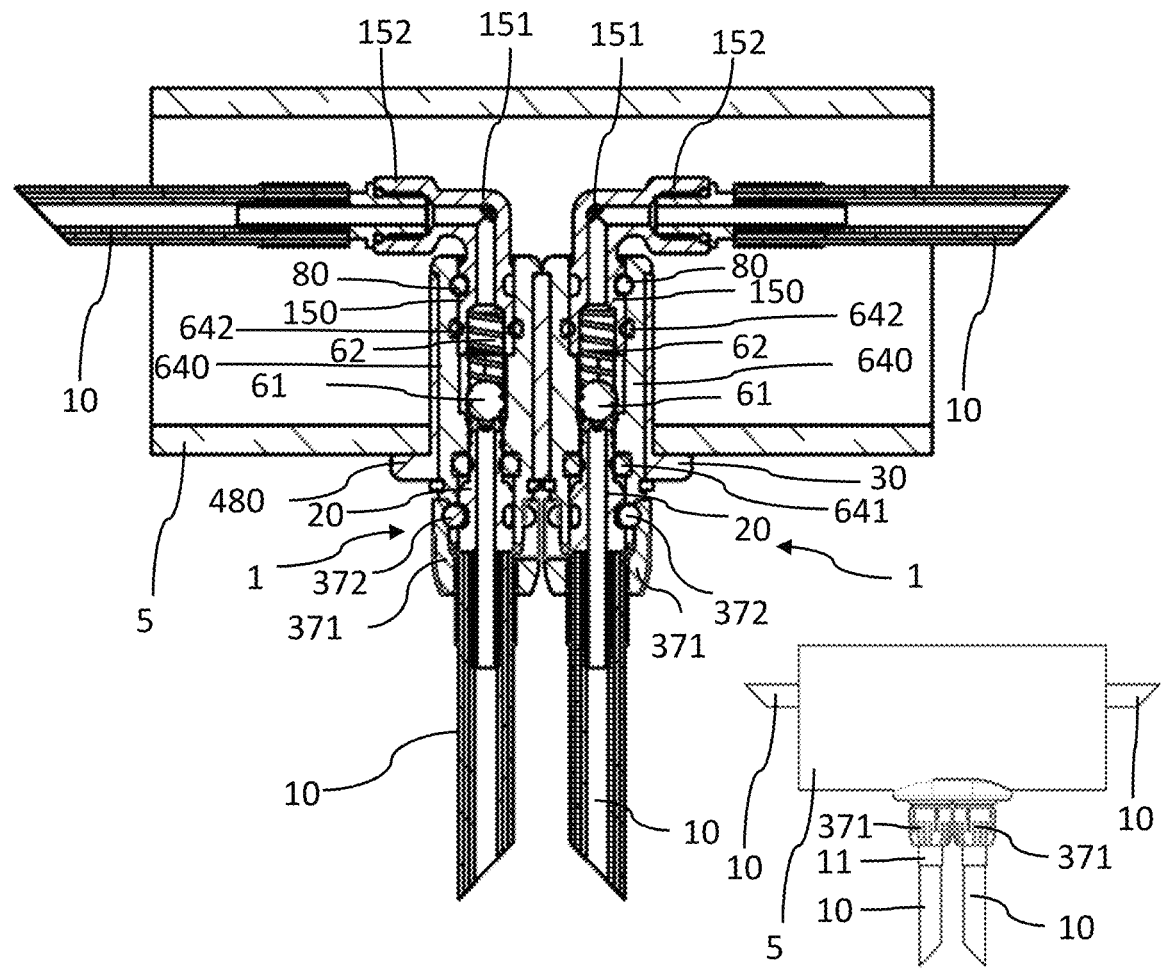
Fig. 66
Fig. 67
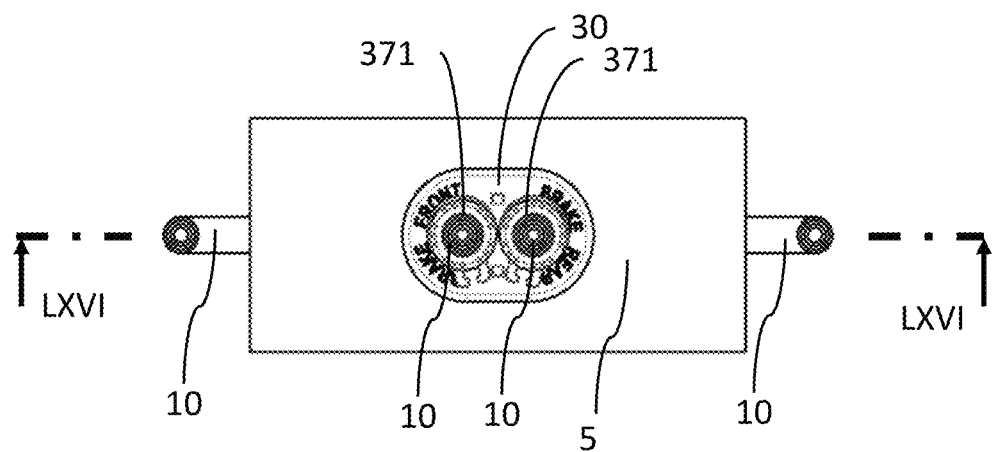
Fig. 68

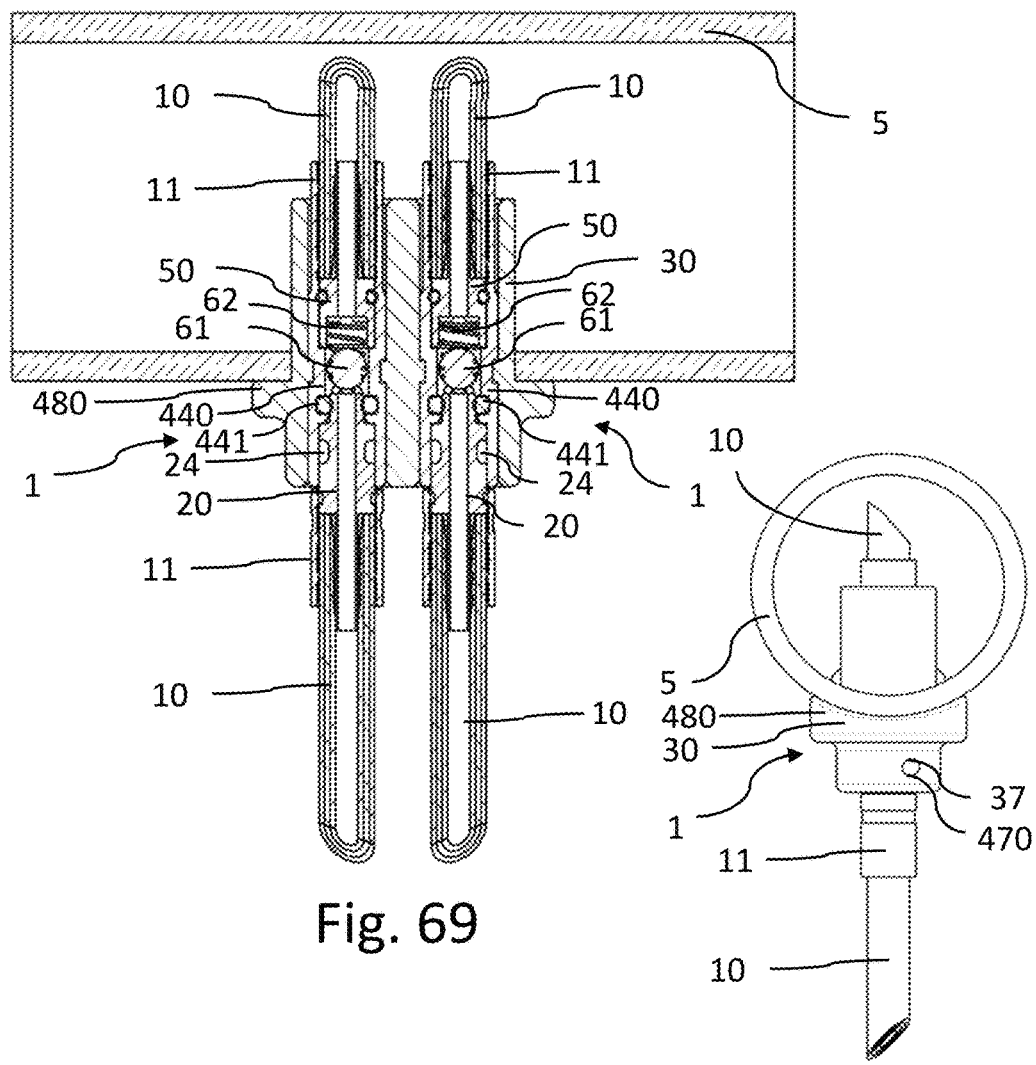
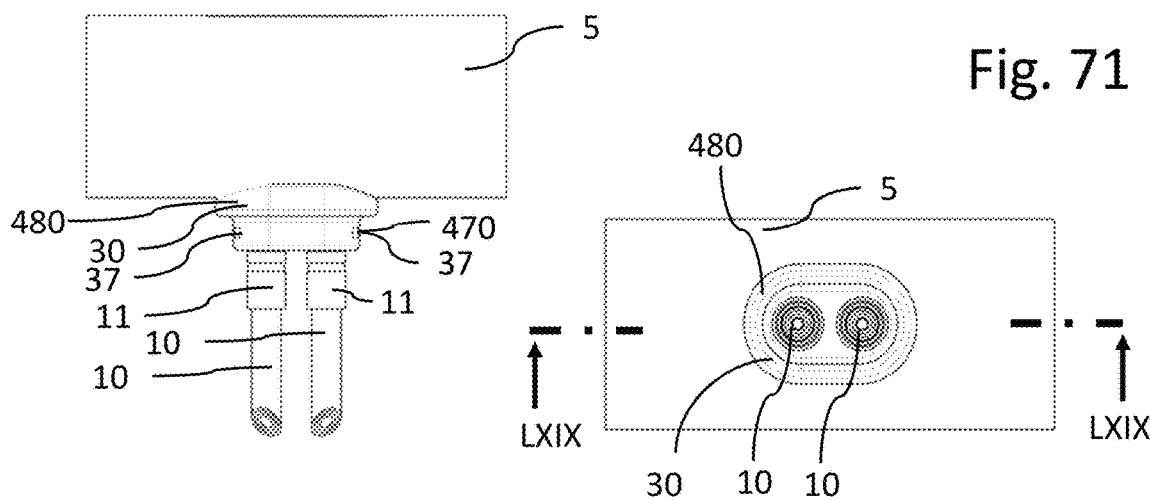
Fig. 69
Fig. 71
Fig. 70
Fig. 72

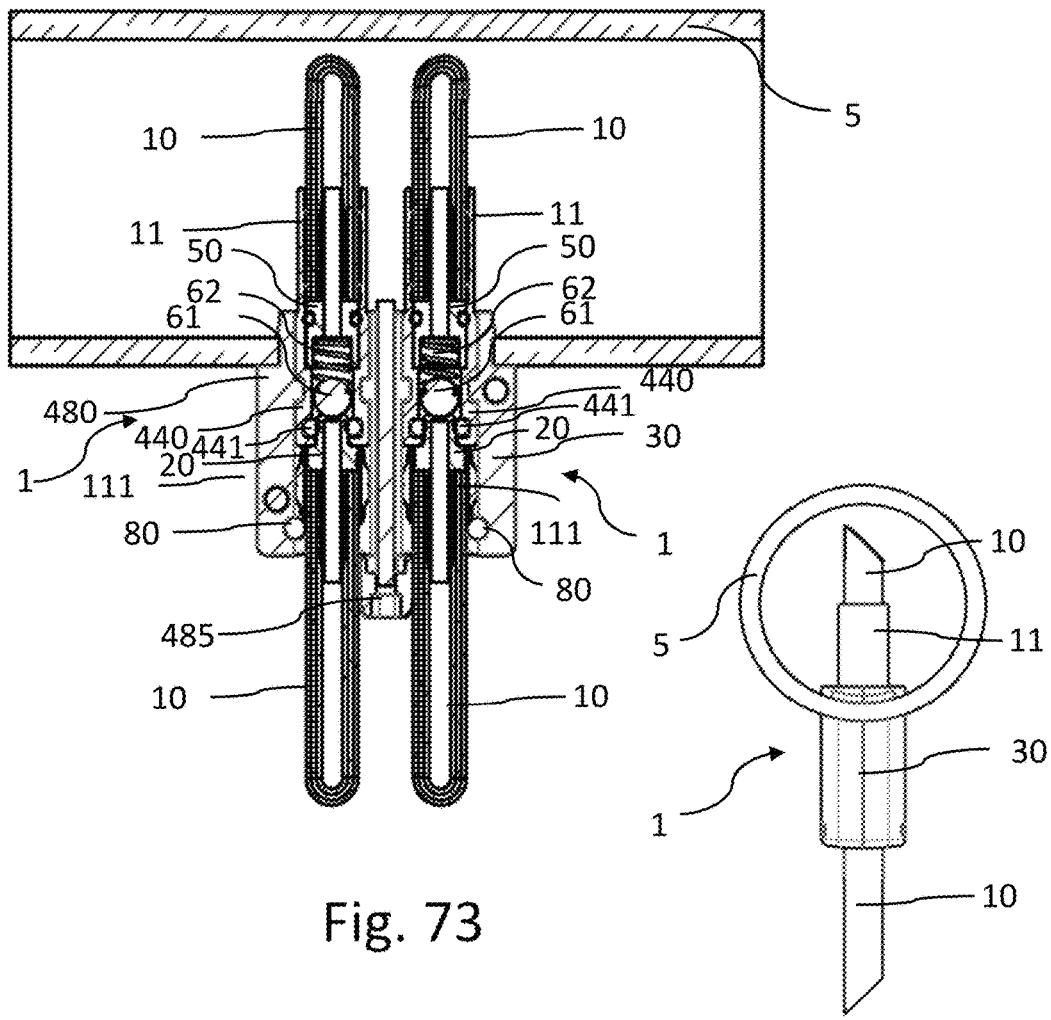
Fig. 73
Fig. 75
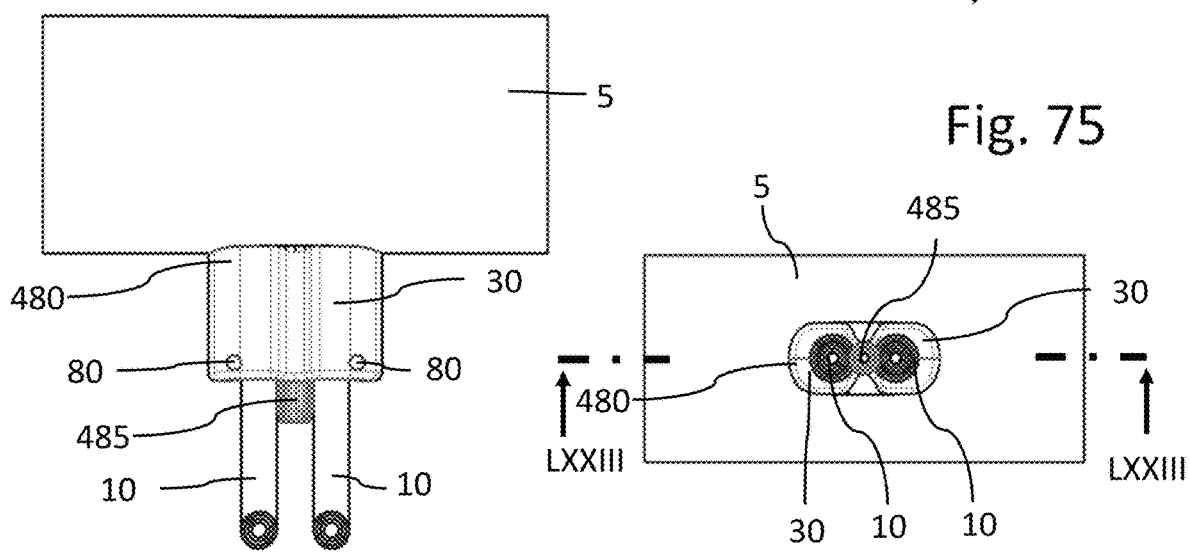
Fig. 74
Fig. 76

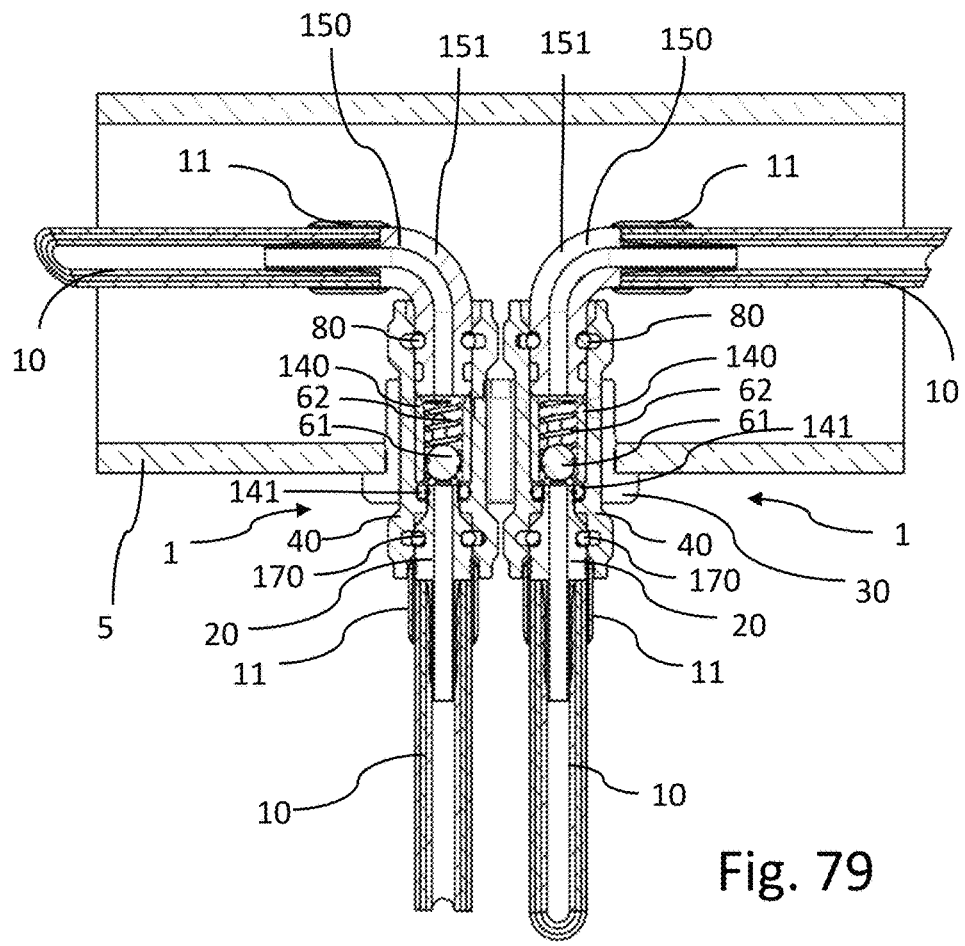
Fig. 79
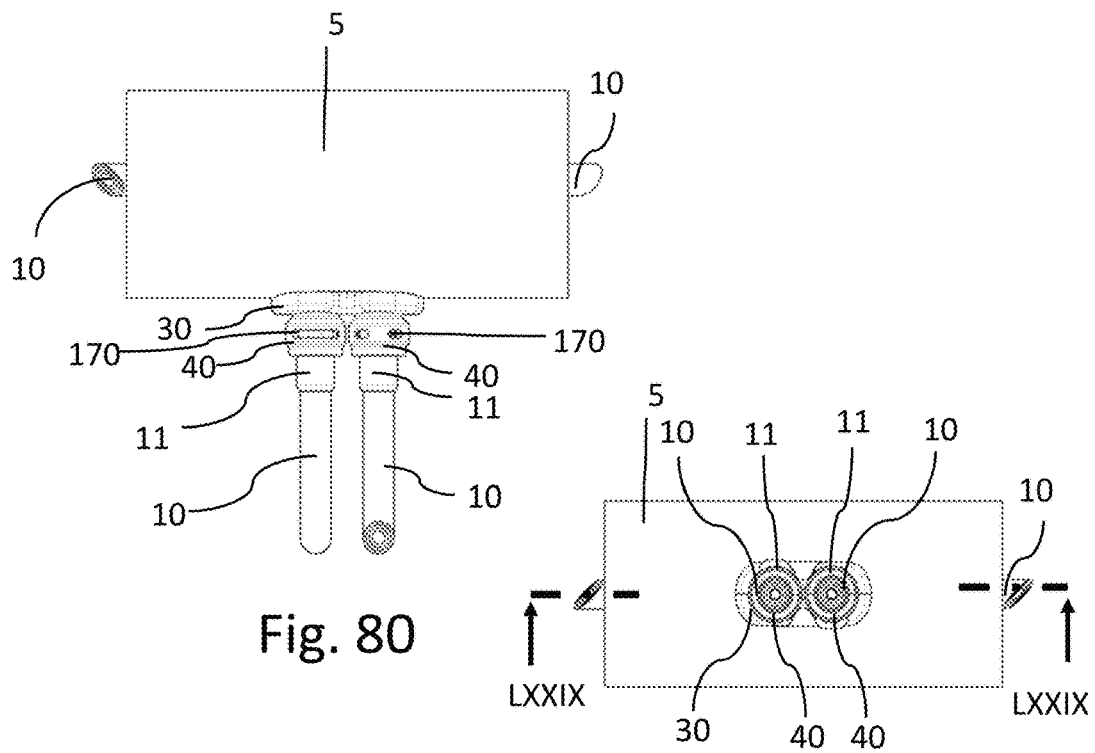
Fig. 80
Fig. 81

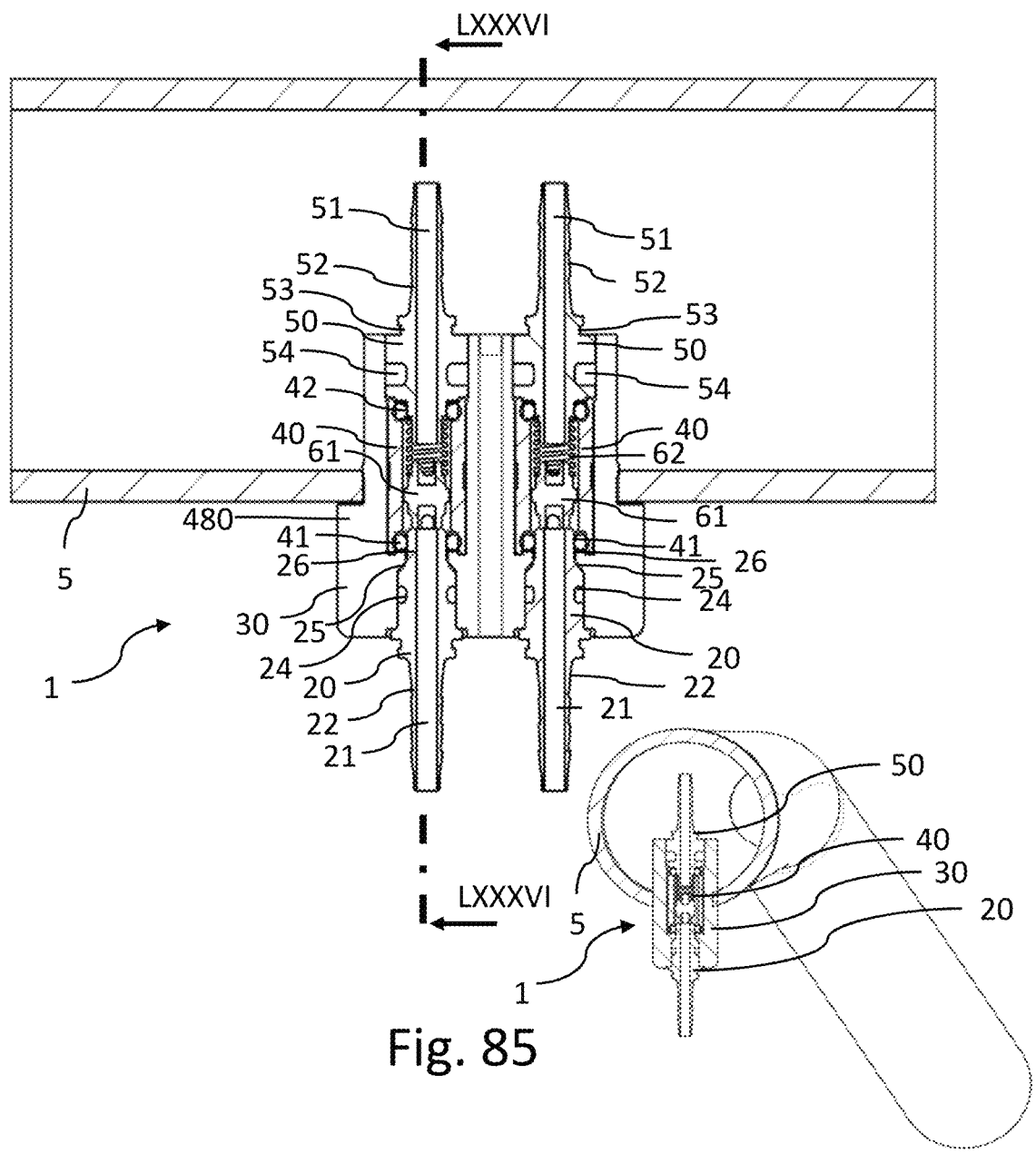
Fig. 85
Fig. 86
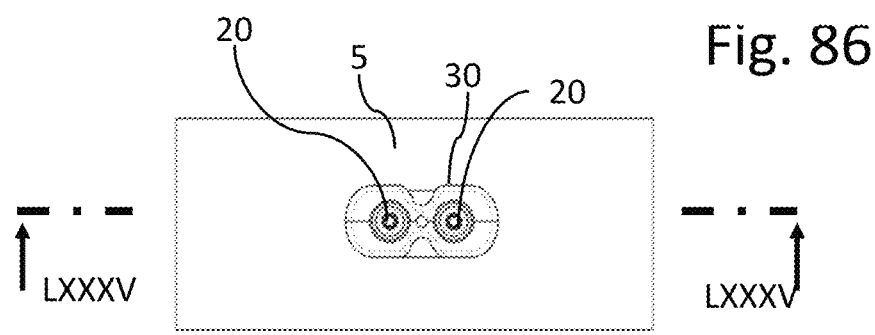
Fig. 87

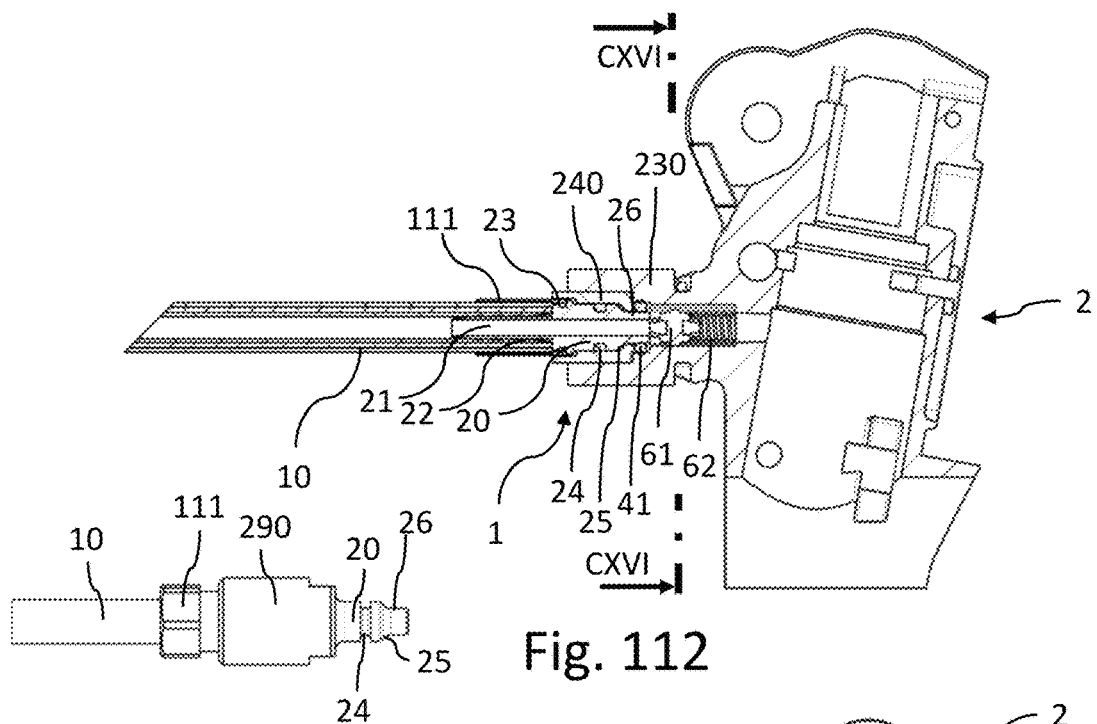
Fig. 112
Fig. 113
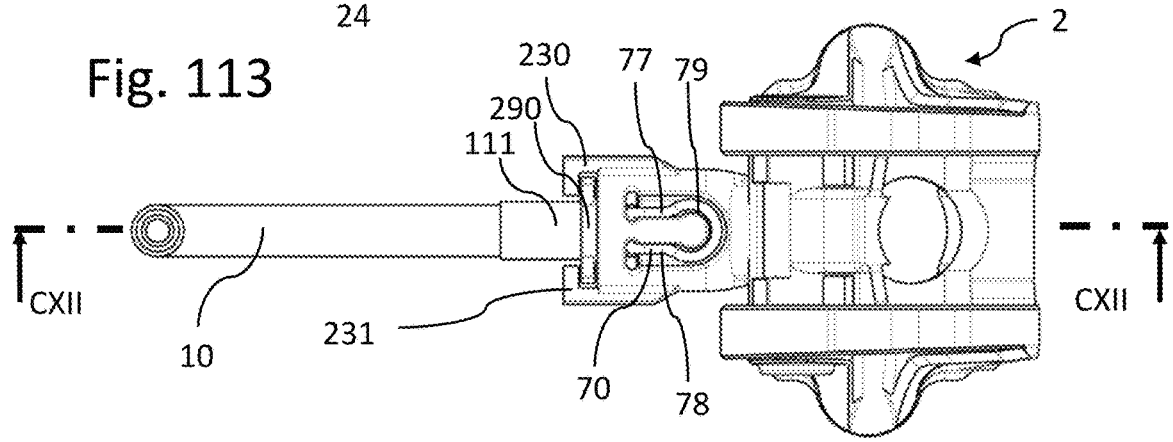
Fig. 114
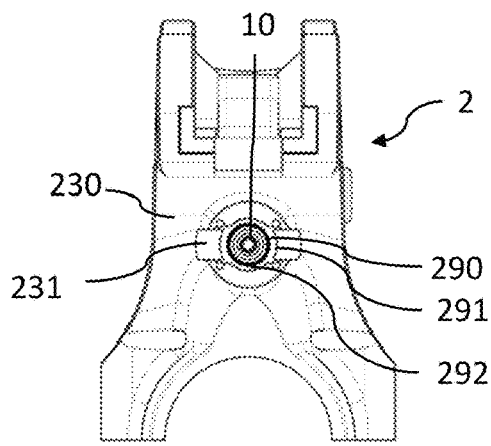
Fig. 115
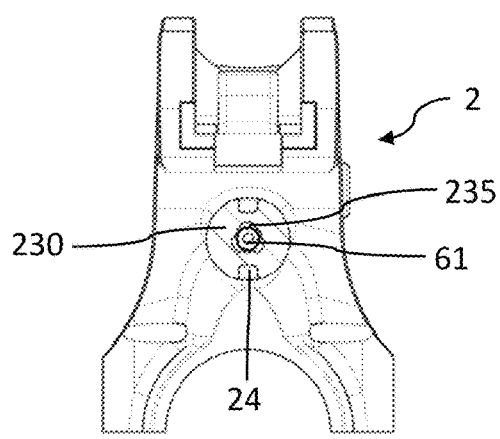
Fig. 116

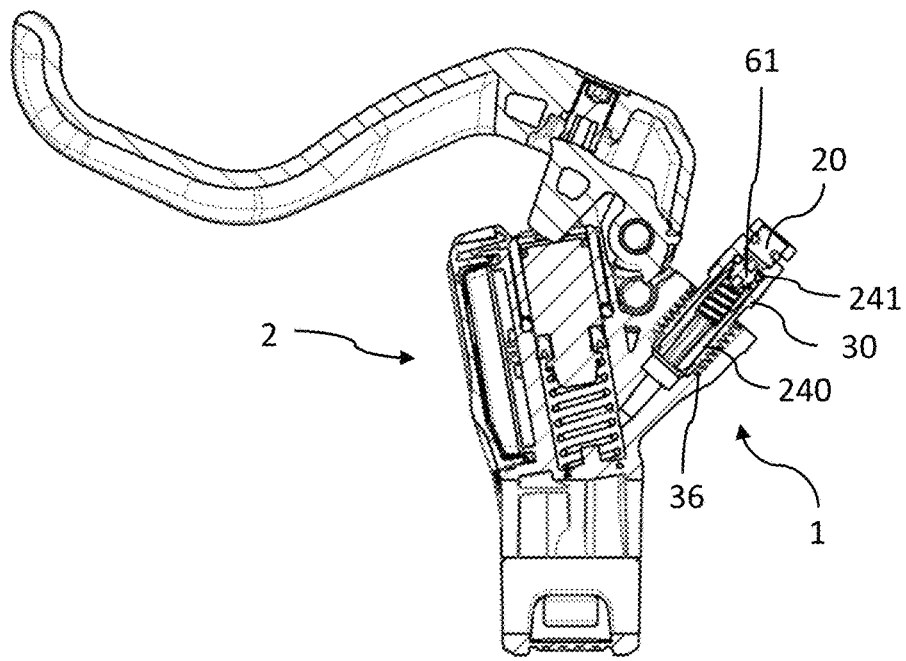
Fig. 117
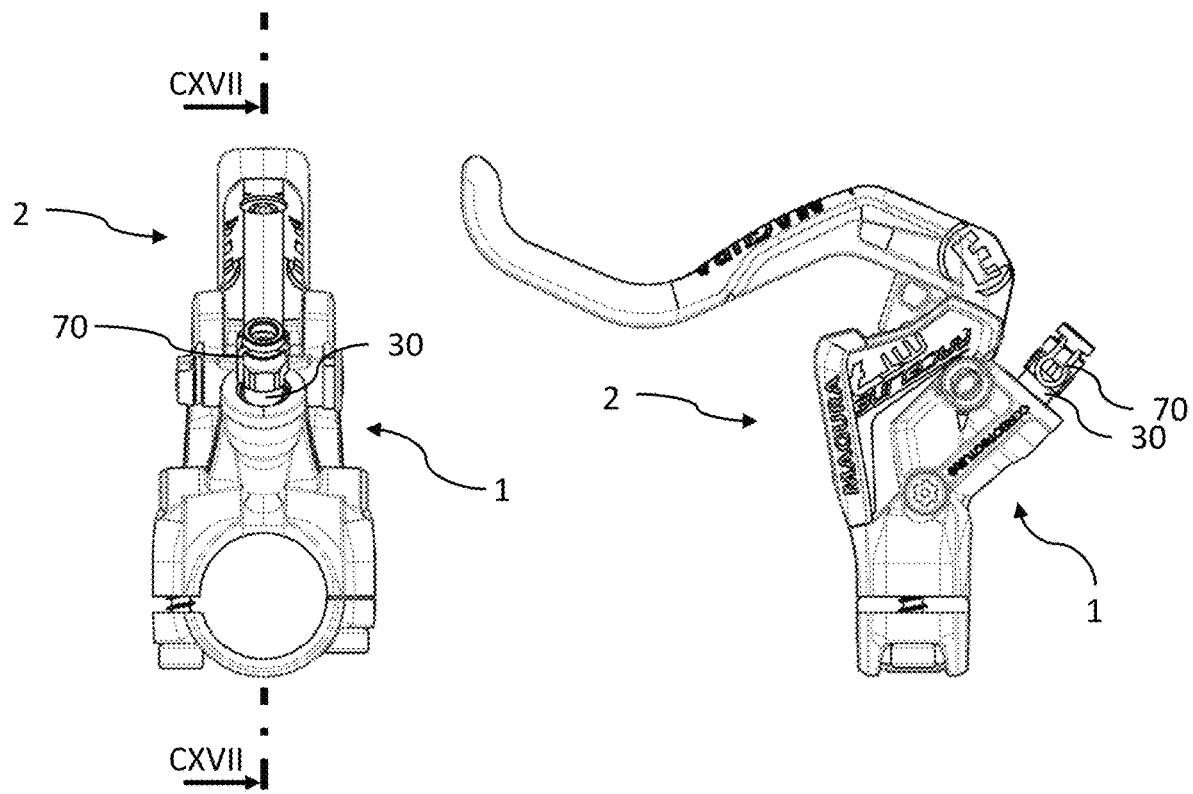
Fig. 118
Fig. 119

HYDRAULIC LINE COUPLING FOR A HYDRAULIC BRAKE OR CLUTCH OF HANDLEBAR-OPERATED VEHICLES AND HYDRAULIC BRAKE OF A HANDLEBAR-OPERATED VEHICLE

CROSS-REFERENCE TO RELATED APPLICATION

This application claims the priority, under 35 U.S.C. §§ 119, 120, 172, 363, and/or 365, of German patent application No. 10 2019 208 066.9, filed Jun. 3, 2019; the prior application is herewith incorporated by reference in its entirety.

STATEMENT REGARDING FEDERALLY SPONSORED RESEARCH OR DEVELOPMENT

Not Applicable

FIELD OF THE INVENTION

The present systems, apparatuses, and methods lie in the field of vehicles, in particular, to a hydraulic line coupling for a hydraulic brake or clutch of a handlebar-operated vehicle or a hydraulic brake of a handlebar-operated vehicle.

BACKGROUND OF THE INVENTION

German Published, Non-Prosecuted Patent Application DE 10 2015 106 236 A1 discloses a hydraulic line coupling that has an internally threaded part and an externally threaded part, the internally threaded part comprising an inner bushing and the externally threaded part comprises a plug insert which can be inserted into the inner bushing for establishing a connection between the internally threaded part and the externally threaded part. When creating the connection between the externally threaded part and the internally threaded part, the externally threaded part and the internally threaded part are directly connected to each other. As a result, the hydraulic line portion formed in the internally threaded part directly adjoins the hydraulic line portion formed in the externally threaded part. A sealing ring is provided on the inner wall of the inner bushing to seal the plug insert so that leakage of oil is prevented when the externally threaded part and the internally threaded part are interconnected. The sealing ring seals in the radial direction. A valve is provided in the internally threaded part and is opened when the externally threaded part and the internally threaded part are interconnected. The valve has a seal that seals in the radial direction.

China Patent Document CN 201 330 906 Y discloses a hydraulic line coupling, in which two hydraulic line portions are directly connected to each other by inserting a hydraulic line part into another hydraulic line part. The hydraulic line portion formed in one hydraulic line part thus directly adjoins the hydraulic line portion formed in the other hydraulic line part. When connecting, one hydraulic line part forms a seal with respect to the other hydraulic line part using a first seal. In addition, a valve disposed in one of the two hydraulic line parts is opened during the connection and has a seal that differs from the seal used to create the seal between the hydraulic line parts.

European Patent Application EP 1 514 758 A1 or European Patent EP 2 431 647 B1 discloses a hydraulic line coupling.

The known hydraulic line couplings have the disadvantage that air can enter or hydraulic fluid can escape during the coupling operation.

SUMMARY OF THE INVENTION

The systems, apparatuses, and methods described provide a hydraulic line coupling that has a simple design that overcome(s) the hereinafore-mentioned disadvantages of the heretofore-known systems, apparatuses, and methods of this general type and that provide such features with an ability to be easily mounted and minimize the loss of hydraulic fluid during the coupling operation or the introduction of air.

According to the systems, apparatuses, and methods, a hydraulic line coupling is provided, in particular for a hydraulic brake or clutch of handlebar-operated vehicles, which has a line connection piece with an extension for connecting a hydraulic line and a housing with a coupling opening in which the line connection piece can be disposed for coupling the hydraulic line to the housing, the line connection piece comprising a passage connected to the hydraulic line and a valve device being disposed in the housing, which is configured such that the valve device closes the connection for the line connection piece when the line connection piece is not disposed in the coupling opening, wherein the hydraulic line coupling has a seal, with which seal the valve device closes the connection for the line connection piece when the line connection piece is not disposed in the coupling opening, and with which seal the line connection piece seals the passage from the environment when the line connection piece is disposed in the coupling opening.

This exemplary embodiment has the advantage that, when connecting the hydraulic line coupling, the possible air entry is extremely low because the seal has a double function, i.e., the seal acts as both a valve seal and a seal between the coupled parts of the hydraulic line coupling.

In another exemplary embodiment, the seal can be made such that, in one of the two functions, the seal primarily or substantially seals in a first direction and, in the other of the two functions, the seal primarily or substantially seals in directions that primarily or substantially extend perpendicularly to the first direction.

In another exemplary embodiment, the seal can be configured such that the seal primarily or substantially seals in an axial direction in one of the two functions and primarily or substantially seals in a radial direction in the other of the two functions. The axial direction can here be the direction in which the hydraulic line coupling is connected. In the case of an O-ring seal, the axial direction is the direction that is perpendicular to the ring plane of the O-ring. For an O-ring seal, the radial direction is a direction along a radius of the O-ring seal.

These exemplary embodiments have the advantage that the different directions of sealing in combination with the use of the same seal for the two functions allow a very fast change of the sealing functions, so that the distance to be covered for the change of the sealing functions can be made very short and, as a result, the possible air entry is very low. This has the advantage that the need for venting after connecting the hydraulic line coupling can be avoided if necessary.

These exemplary embodiments have the further advantage that the hydraulic line coupling can be configured to be very short.

Alternatively or additionally, a hydraulic line coupling is provided that can be configured in particular such that, or according to one of the previous or other exemplary embodiments, in particular for a hydraulic brake or clutch of handlebar-operated vehicles, which has a line connection piece with an extension for connecting a hydraulic line and a housing in which the line connection piece can be disposed, which comprises a passage connected to the hydraulic line, wherein a pressure chamber housing is disposed in the housing, the pressure chamber of which is connected to the passage of the first line connection piece.

These exemplary embodiments have the advantage that, as a result of its configuration in the housing of the hydraulic line coupling, the pressure chamber housing of the hydraulic line coupling can also be made from materials that can withstand less pressure because a pressure prevailing in the pressure chamber housing can be absorbed by the housing in which the pressure chamber housing is disposed. For example, in these exemplary embodiments it is possible to produce the pressure chamber housing from plastic material. For example, the pressure chamber housing can be configured as an injection molded part. These exemplary embodiments have the advantage that there are fewer design limitations for the design of the pressure chamber housing.

Alternatively or additionally, a hydraulic line coupling is provided, which is configured in particular such that or according to one of the previous or other exemplary embodiments, in particular for a hydraulic brake or clutch of handlebar-operated vehicles, which has a housing with a support in which a line connection piece for a connection of a hydraulic line and the line connection piece can be disposed, wherein a valve housing with a valve device comprising a valve closing member disposed therein is disposed in the housing and wherein the valve closing member is disposed and configured such that the valve closing member connects the housing to the passage of the first line connection piece.

Alternatively or additionally, a hydraulic line coupling is provided, which can be configured in particular such that or according to one of the previous or other exemplary embodiments, in particular for a hydraulic brake or clutch of handlebar-operated vehicles, which has a housing with a support in which a line connection piece for a connection of a hydraulic line and the line connection piece can be disposed, the line connection piece being secured in the housing with a locking device that has a press sleeve.

In another exemplary embodiment, the press sleeve can have an engagement portion that engages in a support provided in the line connection piece. The engagement can form an interlocking connection between the engagement portion and the support or between the press sleeve and the line connection piece.

In another exemplary embodiment, the press sleeve can have a snap-in portion that can snap in a support provided in the housing. As a result of the snap-in operation, an interlocking connection can be formed between the snap-in portion and the support or between the press sleeve and the housing.

Alternatively or additionally, a hydraulic line coupling is provided, which can be configured in particular such that or according to one of the previous or other exemplary embodiments, in particular for a hydraulic brake or clutch of handlebar-operated vehicles, which has a housing with a support in which a line connection piece for a connection of a hydraulic line and the line connection piece can be disposed, wherein the line connection piece is secured in the housing with a locking device that has a twist cap.

In another exemplary embodiment, the twist cap can be disposed and configured such that locking members can be moved from an unlocked position into a locked position and from a locked position into an unlocked position by rotating the twist cap. The locking members can here be balls, which are guided along contours or paths into the unlocked or locked positions.

In another exemplary embodiment, the hydraulic line coupling can have a locking device, which secures the line connection piece in the housing.

In another exemplary embodiment, the locking device can have a safety device, which is configured and disposed such that the locking device is secured against unintentional release or removal.

In another exemplary embodiment, the locking device can be secured with an interlocking connection with respect to the line connection piece and with an interlocking connection with respect to the housing such that an indirect interlocking connection between the line connection piece and the housing is created through the locking device.

In another exemplary embodiment, the valve device can be disposed in the pressure chamber housing.

In another exemplary embodiment, the valve device can be disposed in the valve chamber housing.

In another exemplary embodiment, the pressure chamber housing can be configured as a valve chamber housing.

In another exemplary embodiment, the valve chamber housing can be configured as a pressure chamber housing.

In another exemplary embodiment, the seal can be disposed and configured such that the seal seals in the radial direction between the pressure chamber housing and the line connection piece inserted in the connection opening.

In another exemplary embodiment, the seal can be disposed and configured such that a force can be applied to the seal in the axial direction through a front side of the pressure chamber housing or the valve chamber housing.

In another exemplary embodiment, the hydraulic line coupling can have a further line connection piece for the connection of a further hydraulic line.

In another exemplary embodiment, the housing can have a connection area for connection to a hydraulic component.

In another exemplary embodiment, the seal can be an O-ring.

In another exemplary embodiment, the locking device can comprise a bent leg and a straight leg.

In another exemplary embodiment, the locking device can comprise two legs. One leg or both legs can include a support portion for receiving the line connection piece. In addition or alternatively, one leg or both legs can include a securing portion for securing the locking device to the line connection piece.

In another exemplary embodiment, the pressure chamber housing can comprise one overflow channel or several overflow channels. The overflow channel or channels can be formed on the inner side of the pressure chamber housing.

In another exemplary embodiment, the pressure chamber housing can have one channel or several channels, which is or are formed on the outer side of the pressure chamber housing. The channel or channels can be formed circumferentially and/or in the axial direction of the pressure chamber housing.

In another exemplary embodiment, the valve chamber housing can have one web or several webs formed on its outer side.

In another exemplary embodiment, the further line connection piece can be secured in the housing with a locking device. The locking device can here be disposed and configured on two sides opposite in relation to the hydraulic line. Alternatively, the locking device can be configured on one side only, in particular, if the material of the housing can absorb higher forces.

In another exemplary embodiment, the housing can be made of plastic material.

In another exemplary embodiment, the housing can be made of a fiber-reinforced plastic material.

In another exemplary embodiment, the housing can be made of a composite material.

In another exemplary embodiment, the housing can be made of metal.

In another exemplary embodiment, the hydraulic component can be a master apparatus. In this case, the master apparatus can be actuated by a lever and can include a master cylinder. In this case, the master apparatus can include a compensating container. Alternatively, the master apparatus can be a master apparatus of a closed system without a compensating container. The master apparatus can be part of a hydraulic brake or clutch, in particular, a disk brake or rim brake.

In another exemplary embodiment, the connection area can include a screw connection or an external thread for connection to the master apparatus.

In another exemplary embodiment, the hydraulic component can be a slave apparatus. In this case, the slave apparatus can comprise a brake caliper and/or a pair of slave cylinders.

In another exemplary embodiment, the connection area can comprise a ring head connection, which can be connected, e.g., to the hydraulic component with a banjo bolt and/or a bolt provided with external teeth. The line in the banjo bolt and/or the external teeth can here be configured as a hydraulic line connection.

In another exemplary embodiment, the hydraulic line coupling can be configured such that it can couple two pairs of hydraulic lines, for example, a pair of hydraulic lines for a front wheel brake and a pair of hydraulic lines for a rear wheel brake.

In another exemplary embodiment, the hydraulic line coupling can be configured such that it can be disposed and/or mounted in a handlebar tube.

In another exemplary embodiment, the hydraulic line coupling can be configured such that it can be disposed and/or mounted in a steering wheel. In this case, the hydraulic lines can be laid in the steering wheel and guided through, e.g., spokes to the center of the steering wheel and from there through the shaft out of the steering wheel, about which the steering wheel is rotatably mounted.

In another exemplary embodiment, the hydraulic line coupling can be configured such that it can be disposed and/or mounted in a handlebar stem.

In another exemplary embodiment, the hydraulic line coupling can be configured such that it can be disposed and/or mounted in a handlebar shaft.

In another exemplary embodiment, the hydraulic line coupling can be configured such that it can be disposed and/or mounted in a fork crown.

In another exemplary embodiment, the hydraulic line coupling can be configured such that it can be disposed and/or mounted in a frame part.

In another exemplary embodiment, a hydraulic brake or hydraulic coupling or hydraulic bicycle brake is also provided, the hydraulic brake or hydraulic coupling or hydraulic bicycle brake having a hydraulic line coupling according to the invention.

In another exemplary embodiment, the hydraulic bicycle brake can be a disk brake or a rim brake.

The devices, systems, and methods are described below by the exemplary embodiments shown in the drawings. The following reference signs are used here:

1 hydraulic line coupling
2 master apparatus
3 handlebar stem
4 handlebar shaft tube
5 handlebar tube
6 passage (e.g. for cable)
7 fork crown
8 fork leg
9 shaft
10 hydraulic line
11 sleeve
12 protective cap (e.g. bush)
20 line connection piece
21 passage
22 extension
23 fastening portion
24 support
25 transition area
26 sealing area
30 housing
31 housing portion
32 housing portion
33 recess
34 inspection opening
35 sealing area
36 external thread
37 passage
38 passage
39 support
40 pressure chamber hosing
41 seal
42 seal
43 sealing area
44 pressure chamber
45 overflow channel
46 channel (circumferential)
47 channel (axial)
50 line connection piece
51 passage
52 extension
53 fastening portion
54 support
56 sealing area
57 spring support
60 valve device
61 closing member
62 closing spring
65 overflow channel
70 locking device
71 leg
72 leg
73 support portion
74 support portion
75 securing portion
76 securing portion
77 extension portion
78 extension portion
79 connecting portion
80 locking device
91 safety device
92 safety device
111 press sleeve
120 linking device
121 passage 122 ring head
124 support
125 transition area
126 sealing area
127 web
130 housing
131 passage
132 ring head
140 valve chamber housing
141 seal
142 seal
143 contact area
144 valve chamber
147 web
148 passage
149 passage
150 angular line connector
151 angular portion
152 line connection piece support
170 locking device
171 leg
172 leg
175 securing portion
176 securing portion
179 connecting portion
180 insert
190 closure device
191 locking device
192 support
193 passage
194 engagement portion
195 closure device
196 bead
198 flange
199 support
211 threaded sleeve
213 fastening portion
220 line connection piece
221 passage
222 extension
223 fastening portion
224 support
225 transition area
226 sealing area
230 housing
231 clamping device
240 valve chamber housing
241 seal
242 seal
243 contact area
244 valve chamber
245 overflow channel
246 flattening or chamfer
247 web
248 passage
270 locking device
271 leg
272 leg
273 support portion
274 support portion
275 securing portion
276 securing portion
279 connecting portion
280 clamping device
281 safety device
282 clamping device
283 threaded hole
284 adjusting device
285 clamping screw (for the bearing clearance)
286 threaded device
287 threaded device
290 closure device
291 extension
292 flange
293 passage
294 stop
304 support
320 line connection piece
321 passage
322 extension
323 fastening portion
324 support
325 transition area
326 sealing area
327 recess
330 housing
331 closure portion
332 closure portion
340 valve chamber housing
341 seal
342 seal
343 contact area
344 valve chamber
346 flattening or chamfer
347 web
348 passage
370 locking device
371 twist cap
372 locking member (e.g. ball)
380 clamping device
381 passage
382 clamping screws
383 spring device
411 pressing portion
440 pressure chamber housing
441 seal
442 seal
443 sealing area
444 pressure chamber
470 locking device
471 pin
472 support
480 flange
485 clamping screw
540 pressure chamber housing
541 seal
542 seal
544 pressure chamber
570 locking device
571 press sleeve
572 engagement device
573 snap-in device
611 passage (e.g. in the valve closing member)
640 pressure chamber housing
641 seal
642 seal
644 pressure chamber
740 pressure chamber housing
741 seal
742 seal
744 pressure chamber
820 line connection piece
821 passage
822 extension 823 fastening portion
826 sealing area Unless otherwise described, reference signs differing by the value 100 or a multiple of 100 in the present disclosure are intended to describe the same or corresponding features or components, so that reference can be made to the respective descriptions. For example, the reference signs 20, 120, 220, 320, etc., are used to designate, describe, and display line connection pieces.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems, apparatuses, and methods. Advantages of embodiments of the systems, apparatuses, and methods will be apparent from the following detailed description of the exemplary embodiments thereof, which description should be considered in conjunction with the accompanying drawings in which:

FIG. 18 is a cross-sectional view through a hydraulic line coupling according to an exemplary embodiment along lines XVIII-XVIII of FIG. 20, said cross-sectional view corresponding to FIGS. 1, 9 and 15;

FIG. 19 is a top plan view of the hydraulic line coupling of FIG. 18;

FIG. 20 is an elevational view of the hydraulic line coupling of FIG. 18 from the right side in FIG. 18;

FIG. 21 is an elevational view of the locking device of the hydraulic line coupling of FIG. 18, said view corresponding to the perspective of FIG. 20;

FIG. 22 is an elevational view of the locking device of FIG. 21, seen from the left side with respect to FIG. 21;

FIG. 66 is a cross-sectional view of a handlebar portion with a hydraulic line coupling according to an exemplary embodiment along lines LXVI-LXVI of FIG. 68;

FIG. 67 is a side elevational view of the handlebar portion with the hydraulic line coupling of FIG. 66;

FIG. 68 is an elevational view of the handlebar portion with the hydraulic line coupling of FIG. 66 from the lower side in FIG. 66;

FIG. 69 is a cross-sectional view of a handlebar portion with a hydraulic line coupling according to an exemplary embodiment along lines LXIX-LXIX of FIG. 72;

FIG. 70 is a side elevational view of the handlebar portion with the hydraulic line coupling of FIG. 69;

FIG. 71 is an elevational view of the handlebar portion with the hydraulic line coupling of FIG. 69 from the left side in FIG. 69;

FIG. 72 is an elevational view of the handlebar portion with the hydraulic line coupling of FIG. 69 from the lower side in FIG. 69;

FIG. 73 is a cross-sectional view of a handlebar portion with a hydraulic line coupling according to an exemplary embodiment along the lines LXXIII-LXXIII of FIG. 76;

FIG. 74 is a side elevational view of the handlebar portion with the hydraulic line coupling of FIG. 73;

FIG. 75 is an elevational view of the handlebar portion with the hydraulic line coupling of FIG. 73 from the left side in FIG. 73;

FIG. 76 is an elevational view of the handlebar portion with the hydraulic line coupling of FIG. 73 from the lower side in FIG. 73;

FIG. 79 is a cross-sectional view of a handlebar portion with a hydraulic line coupling according to an exemplary embodiment along lines LXXIX-LXXIX of FIG. 81;

FIG. 80 is a side elevational view of the handlebar portion with the hydraulic line coupling of FIG. 79;

FIG. 81 is an elevational view of the handlebar portion with the hydraulic line coupling of FIG. 79 from the lower side in FIG. 79;

FIG. 85 is a cross-sectional view of a handlebar portion with a hydraulic line coupling according to an exemplary embodiment along lines LXXXV-LXXXV of FIG. 87;

FIG. 86 is a cross-sectional view of the handlebar portion with the hydraulic line coupling of FIG. 85 along lines LXXXVI-LXXXVI of FIG. 85;

FIG. 87 is an elevational view of the handlebar portion with the hydraulic line coupling of FIG. 85 from the lower side in FIG. 85;

FIG. 112 is a cross-sectional view of a hydraulic master apparatus with a hydraulic line coupling according to an exemplary embodiment along lines CXII-CXII of FIG. 114;

FIG. 113 is a side elevational view of the hydraulic line separated from the hydraulic master apparatus of FIG. 112;

FIG. 114 is an elevational view of the hydraulic master apparatus of FIG. 112 from above with respect to FIG. 112;

FIG. 115 is an elevational view of the hydraulic master apparatus of FIG. 112 from the left with respect to FIG. 112;

FIG. 116 is a cross-sectional view of the hydraulic master apparatus of FIG. 112 along lines CXVI-CXVI of FIG. 112;

FIG. 117 is a cross-sectional view of a hydraulic master apparatus with a hydraulic line coupling according to an exemplary embodiment along lines CXVII-CXVII of FIG. 118;

FIG. 118 is an elevational view of the hydraulic master apparatus of FIG. 117 from the right with respect to FIG. 117;

FIG. 119 is an elevational view of the hydraulic master apparatus of FIG. 117 from the front with respect to FIG. 117;

FIG. 120 is a cross-sectional view of a line connection piece for a hydraulic line coupling according to an exemplary embodiment along lines CXX-CXX of FIG. 121;

FIG. 121 is an elevational view of the line connection piece of FIG. 120 from below with respect to FIG. 120;

FIG. 122 is an elevational view of the line connection piece of FIG. 120 from the right with respect to FIG. 120;

FIG. 123 is a cross-sectional view of a pressure chamber housing or a valve sleeve for a hydraulic line coupling according to an exemplary embodiment along lines CXXIII-CXXIII of FIG. 124;

FIG. 124 is an elevational view of the pressure chamber housing or the valve sleeve of FIG. 123 from below with respect to FIG. 123;

FIG. 125 is an elevational view of the pressure chamber housing or the valve sleeve of FIG. 123 from the right with respect to FIG. 123;

FIG. 126 is a perspective view of the pressure chamber housing or the valve sleeve of FIG. 123, diagonally from the top front;

FIG. 127 is a perspective view of a pressure chamber housing or a valve sleeve for a hydraulic line coupling according to an exemplary embodiment, diagonally from the top front;

FIG. 128 is a cross-sectional view of the pressure chamber housing or the valve sleeve of FIG. 127 along lines CXXVIII-CXXVIII of FIG. 129;

FIG. 129 is an elevational view of the pressure chamber housing or the valve sleeve of FIG. 127 from below with respect to FIG. 128

FIG. 130 is an elevational view of the pressure chamber housing or the valve sleeve of FIG. 127 from the right with respect to FIG. 128;

Figure 131:
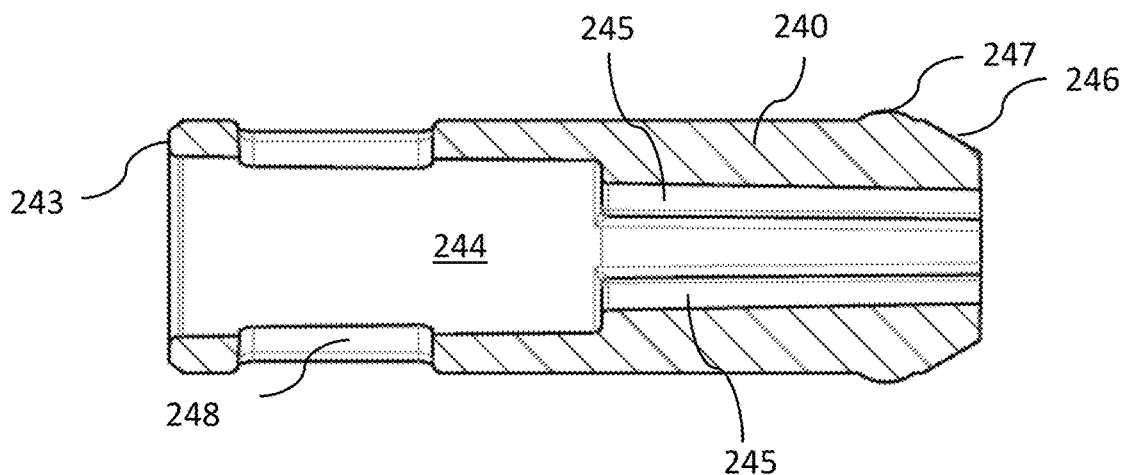
Figure 132:
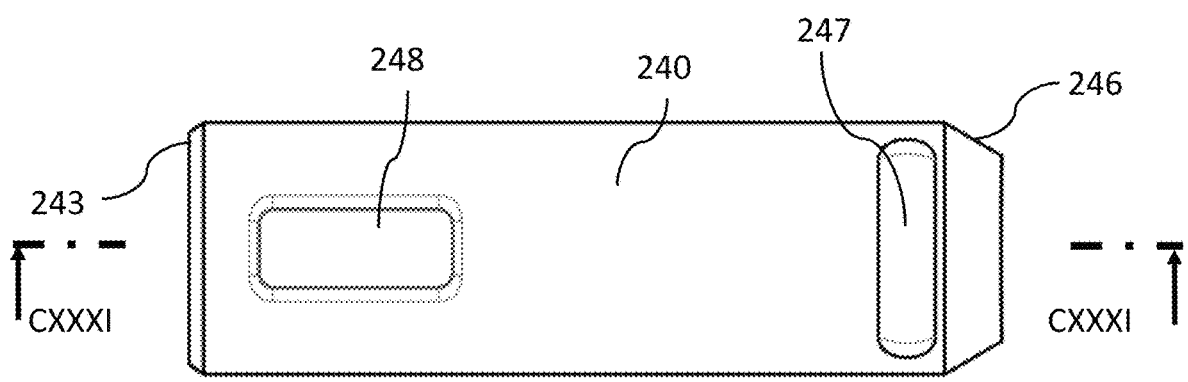
Figure 133:
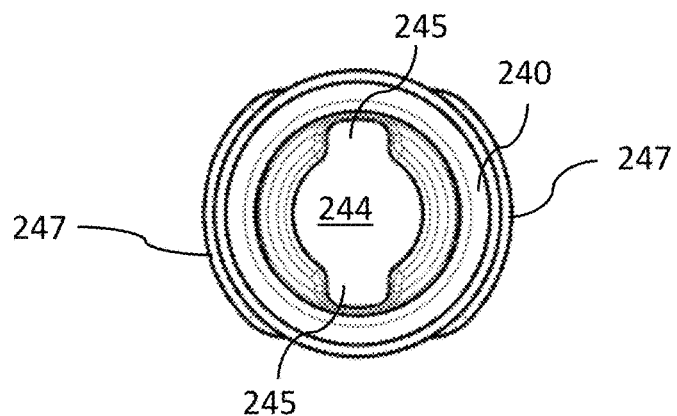
Figure 134:
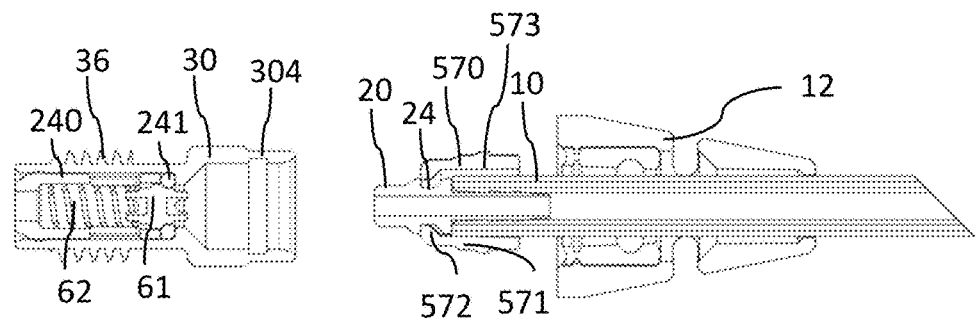
Figure 135:
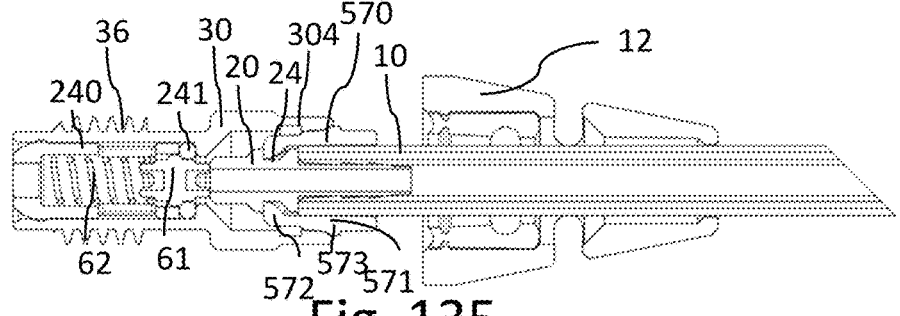
Figure 136:
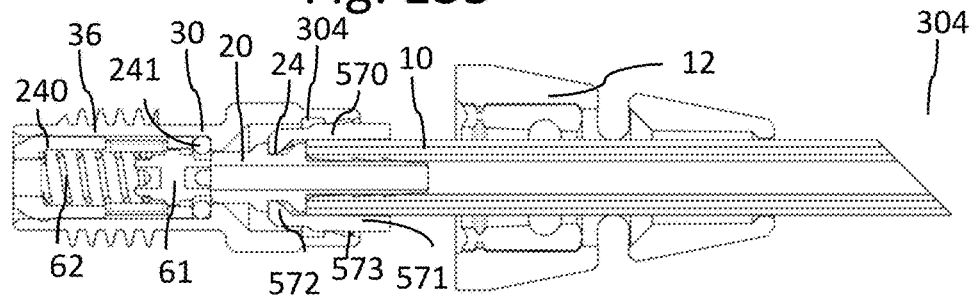
Figure 137:
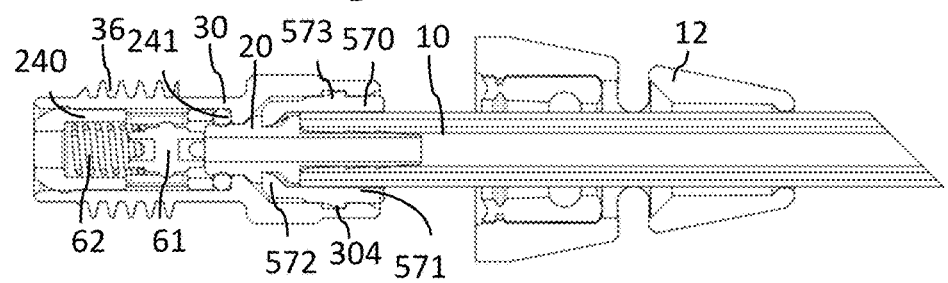
Figure 138:
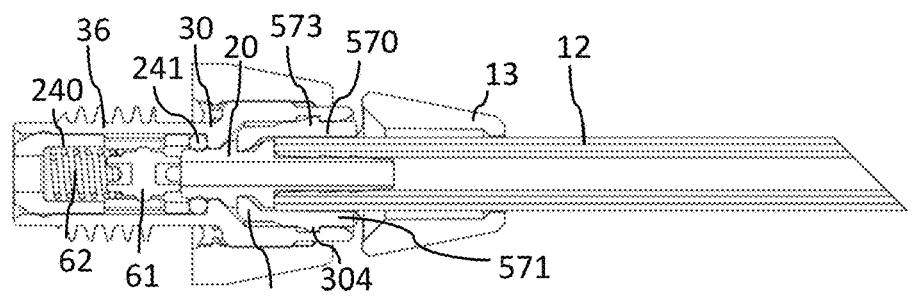

FIG. 131 is a cross-sectional view of a pressure chamber housing or a valve sleeve for a hydraulic line coupling according to an exemplary embodiment along lines CXXXI-CXXXI of FIG. 132;

FIG. 132 is an elevational view of the pressure chamber housing or the valve sleeve of FIG. 131 from below with respect to FIG. 131;

FIG. 133 is an elevational view of the pressure chamber housing or the valve sleeve of FIG. 131 from the right with respect to FIG. 131;

FIG. 134 is a cross-sectional view of a hydraulic line coupling according to an exemplary embodiment prior to the assembly of the hydraulic line;

FIG. 135 is a cross-sectional view of the hydraulic line coupling of FIG. 134, the cross-sectional view corresponding to FIG. 134 and the hydraulic line with the line connection piece being plugged in the housing and the valve device being not yet actuated;

FIG. 136 is a cross-sectional view of the hydraulic line coupling of FIG. 134, said cross-sectional view corresponding to FIG. 134 and the hydraulic line with the line connection piece being plugged in the housing and the valve device being actuated;

FIG. 137 is a cross-sectional view of the hydraulic line coupling of FIG. 134, said cross-sectional view corresponding to FIG. 134 and the hydraulic line with the line connection piece being fully inserted in the housing and the valve device being actuated; and FIG. 138 is a cross-sectional view of the hydraulic line coupling of FIG. 134, said cross-sectional view corresponding to FIG. 134 and the hydraulic line with the line connection piece being completely inserted in the housing, the valve device being actuated and the cover device or protective cap being disposed on the housing.

DETAILED DESCRIPTION OF THE EMBODIMENTS

Described now are exemplary embodiments. Referring now to the figures of the drawings in detail and first, particularly to FIGS. 1 to 8, there is shown a first exemplary embodiment of a hydraulic line coupling 1. The hydraulic line coupling 1 comprises a housing 30, in which a line connection piece 20 is disposed on the left side and a line connection piece 50 is disposed on the right side. Within the housing 30, the two line connection pieces are connected to each other in a pressure-tight manner through the pressure chamber 44 with a pressure chamber housing 40 defining a pressure chamber 44. This has the advantage that the housing 30 does not have to be pressure-tight. Therefore, it can be manufactured in a simpler and more cost-effective way. For example, it can have a lower strength. Furthermore, it is also possible to use for the housing 30 materials, which are not necessarily corrosion-resistant to the hydraulic fluid.

The line connection piece 20 has an extension 22, to which a hydraulic line 10 can be attached. The line connection piece 50 has an extension 52, to which a hydraulic line 10 can be attached.

The hydraulic line coupling 1 connects the two hydraulic lines 10 attached to the extensions 22 and 52, respectively.

The line connection piece 20 has a fastening portion 23 and the line connection piece 50 has a fastening portion 53, each of which can be provided with a sleeve 11 to secure the relevant hydraulic line. The sleeve 11 or the sleeves 11 can, for example, have an internal thread, which is screwed onto an external thread provided on the fastening portion 23 or 53. Other fastening options are conceivable, such as crimping, wherein the sleeve or the sleeves 11 can have or obtain an undercut through the crimping operation, which engages/engage in a groove on the fastening portion 23 or 53.

The line connection piece 20 has a passage 21, which extends through the line connection piece 20 from the extension 22 to the sealing area 26 provided at the opposite end. The extension 22 is disposed in the hydraulic line 10 where it forms a pressure-tight connection with the hydraulic line 10. On the other side, the line connection piece 20 forms at the sealing area 26 with the seal 41 a pressure-tight connection with the pressure chamber 44, which is enclosed by the pressure chamber housing 40.

On its outer side, the line connection piece 20 has a support 24 for receiving the locking device 70.

The line connection piece 50 has a passage 51, which extends through the line connection piece 50 from the extension 52 to the sealing area 56 provided at the opposite end. The extension 52 is disposed in the hydraulic line 10 where it forms a pressure-tight connection to the hydraulic line 10. On the other side, the line connection piece 50 forms at the sealing area 56 with the seal 42 a pressure-tight connection with the pressure chamber 44. This design creates a pressure line comprising the hydraulic line 10, the line connection piece 20, the pressure chamber 44, the line connection piece 50 and the hydraulic line 10, which runs inside the housing 30, which itself does not have to be pressure-tight because a pressure chamber housing 40 is provided inside the housing. The housing 30 is used to secure the line connection pieces 20, 50 in the direction of the line run, i.e., the line connection pieces 20, 50 are secured in the housing 30 against being pulled out.

The line connection piece 50 has supports 54, into which locking devices 80 are pressed to secure the line connection piece 50 in the housing 30 against being pulled out. The housing 30 has corresponding passages 38, into which the locking devices 80 are pressed. Alternative fastening options with respect to the press fit are conceivable.

FIGS. 4 to 8 show a locking device 70. On its outer side, the line connection piece 20 has a support 24 to receive the locking device 70. The housing 30 has corresponding passages 37 and a support 39 for the locking device 70.

The line connection piece 20 can be secured or locked after insertion into the housing 30 by the locking device 70. The locking device 70 has two legs 71, 72, which can be inserted through passages 37 provided in the housing 30 and can be disposed in the corresponding supports 24 provided on the line connecting piece 20. The leg 71 is provided with an arcuate receiving portion 73 and the leg 72 is provided with an arcuate support portion 74 for receiving the line connection piece 20 in the area of the support 24 such that, after inserting the legs 71, 72 of the locking device 70 in the passage 37 of the housing 30 and in the support 24 of the line connection piece 20, an interlocking connection (in the direction of the line) is formed between the line connection piece 20 and the locking device 70 (support 24/legs 71, 72) and an interlocking connection (in the direction of the line) is formed between the housing 30 and the locking device 70 (passage 37/legs 71, 72), which prevents the line connection piece 20 from slipping or being pulled out of the housing. The ends of the legs 71 and 72 are provided with a securing portion 75 and 76, respectively, which after insertion engages behind the line connection piece 20 such that the locking device 70 is secured against being pulled out of the support 24 and the passages.

The line connection piece 20 has a transition area 25 in which the outer diameter of the line connection piece 20 decreases from the edge of the support 24 to the sealing area 26. When the line connection piece 20 is inserted into the housing 30, with the legs 71, 72 of the locking device 70 having previously been inserted through passages 37, the line connection piece 20 with the sealing area 26 is placed between the legs 71, 72 in the area of the supports 74, 75. If the line connection piece 20 is pushed further into the housing, the transition area will spread the legs 71, 72 apart, similar to a ramp. As soon as the legs 71, 72 reach the area of the support 24 of the line connection piece 20 as it is pushed further into the housing, the legs 71, 72 will jump into the support 24 due to the elasticity of the locking device 70 because they have been spread by inserting the widening transition area 25, such that the line connection piece 20 is secured in the housing 30.

The locking device 70 has an extension portion 77 extending from the leg 71 approximately at right angles along the surface of the housing 30 and an extension portion 78 extending from the leg 71 approximately at right angles along the surface of the housing 30, which are connected to each other by a connecting portion 79. This embodiment has the advantage that, despite the relatively short legs 71, 72, the clamping force of the locking device 70 can be increased by a quasi-extension, so that a better and more reliable securing of the locking device 70 can be achieved.

The support 39 is configured and disposed such that the extension portions 77, 78 and the connecting portion 79 can be disposed in the support.

Figure 1:
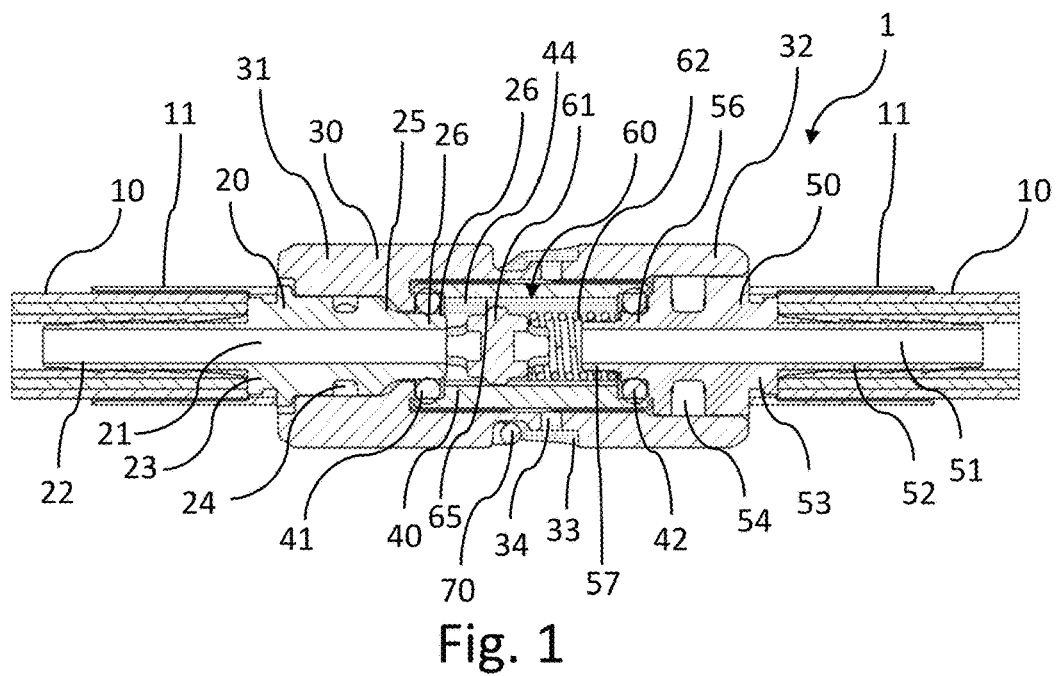
FIG. 1 is a cross-sectional view through a hydraulic line coupling according to an exemplary embodiment along lines I-I of FIG. 2.
Figure 3:
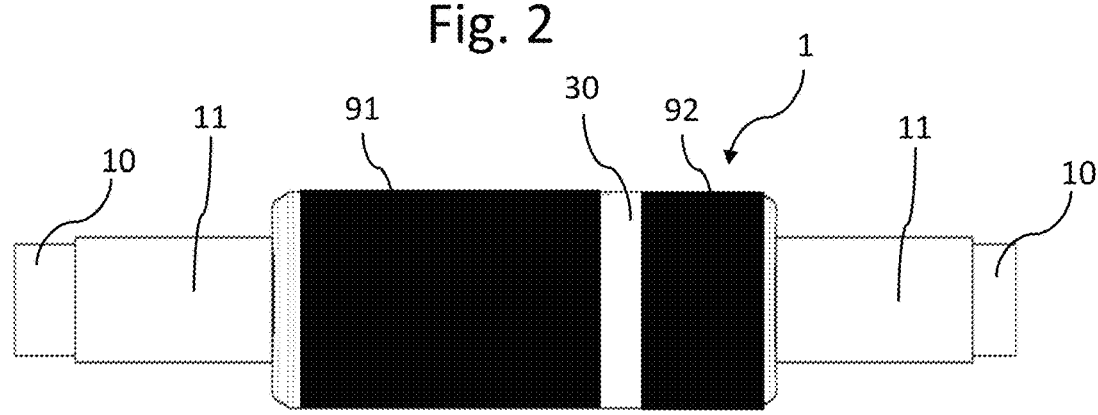
FIG. 3 is a top plan view of the hydraulic line coupling of FIG. 1 with safety devices, said top view corresponding to FIG. 2.
Figure 4:
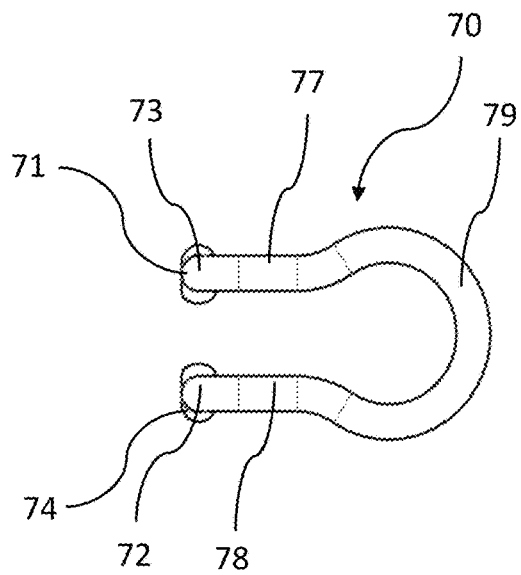
FIG. 4 is a top plan view of the locking device of the hydraulic line coupling of FIG. 1, said top view corresponding to the perspective of FIG. 2.
Figure 5:
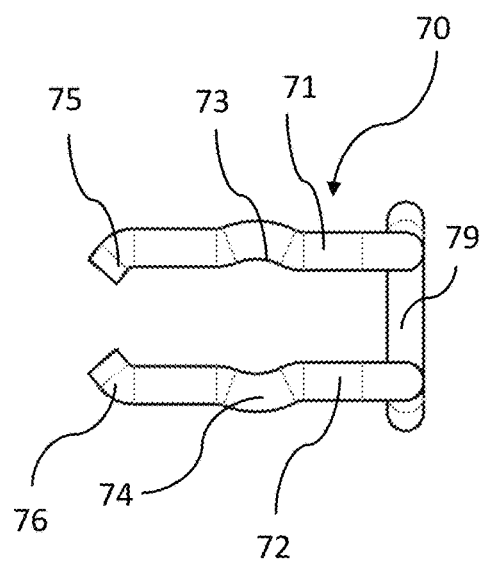
FIG. 5 is an elevational view of the locking device of FIG. 4, seen from the left side with respect to FIG. 4.
Figure 6:
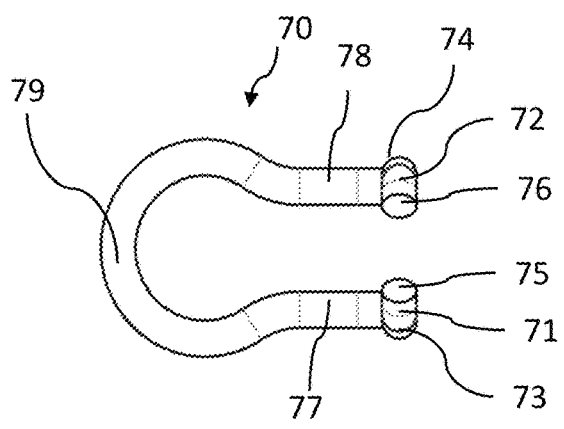
FIG. 6 is an elevational view of the locking device of FIG. 4, seen from the left side with respect to FIG. 5.
Figure 7:
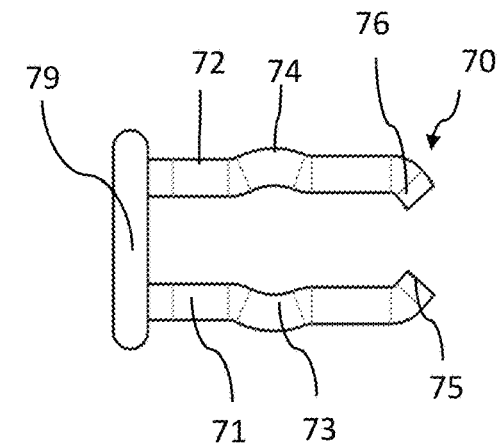
FIG. 7 is an elevational view of the locking device of FIG. 4, seen from the left side with respect to FIG. 6.
Figure 8:
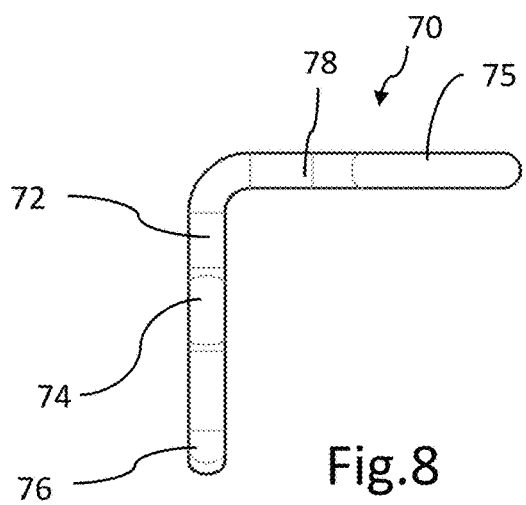
FIG. 8 is an elevational view of the locking device of FIG. 4, seen from the lower side with respect to FIG. 4.

FIG. 3 shows a variant of the hydraulic line coupling 1 of FIG. 1, in which the locking device 70 is covered with an optional safety device 91, which can be formed, for example, by a seal and/or a protective film and/or a spray-coating in order to prove or indicate manipulation of the locking device 70 if the safety device 91 has been damaged. A corresponding optional safety device 92 can be provided for the two locking devices 80.

Figure 2:
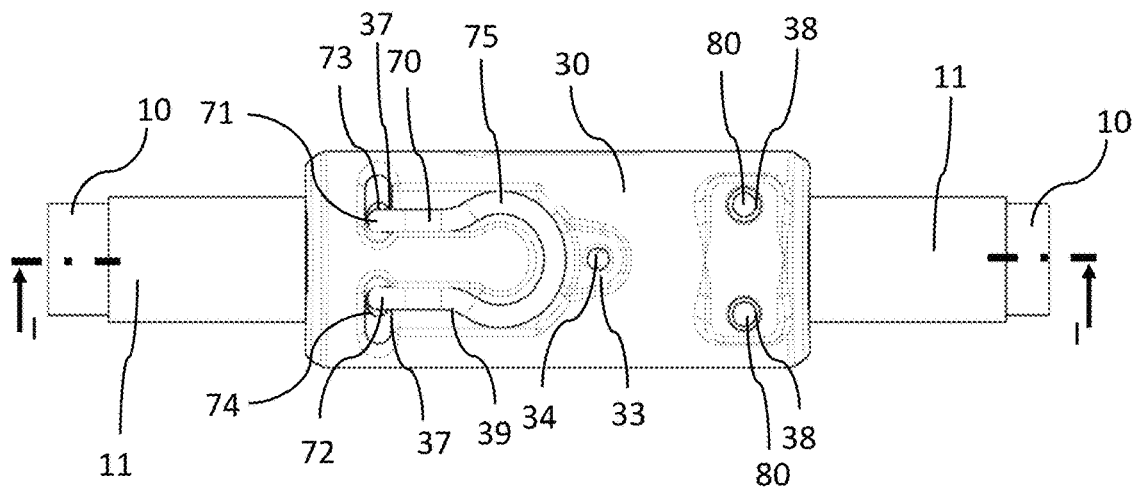
FIG. 2 is a top plan view of the hydraulic line coupling of FIG. 1.

The housing 30 can be made of one piece as shown in FIG. 1. It can here have a first housing portion 31, in which the line connection piece 20 is disposed, and a second housing portion 32, in which the line connection piece 50 is disposed. Because the separate pressure chamber housing 40 is provided within the housing 30, the first housing portion 31 and the second housing portion 32 do not have to be connected to each other in a pressure-tight or fluid-tight manner but can also be connected to each other with a screw connection, for example. For this purpose, in the area in which the embodiment shown in FIG. 1 has a recess 33 in which the inspection opening 34 is provided, a sleeve can be accommodated, which connects a first housing part comprising the housing portion 31 to a second housing part comprising the second housing portion 31. The sleeve can here be disposed in a groove and screwed onto an external thread on the second housing part. The sleeve can be secured against turning and, thus, loosening by a securing member and can be, e.g., spray-coated after the parts have been connected in order to create a smooth surface as shown in FIG. 2.

The hydraulic line coupling 1 can have an inspection opening 34 with which the tightness of the hydraulic line coupling 1 can be checked. An oil leakage from the inspection opening 34 indicates a leakage, for example, of the seal 41 or 42. In addition, a compressed air test can be carried out by applying compressed air to inspection opening 34. A pressure drop would indicate a leakage of one of the two seals 41, 42, which might be caused by a defect or an incorrect position, for example.

A valve device 60 is provided in the pressure chamber housing 40 and closes the pressure chamber housing 40 or the pressure chamber 44 to the left side if the line connection piece 20 is not yet inserted. The valve device 60 has a closing member 61 and a closing spring 62. The line connection piece has a spring support 57, in which the closing spring 62 is accommodated. The closing spring 62 pretensions the closing member 61 against the seal 41 disposed in the pressure chamber housing 40, so that the pressure chamber 44 is closed pressure-tight to the outside if the line connection piece 20 is not yet inserted in the housing 30. When inserting the line connection piece 20 into the housing 30, the sealing area 26 is inserted into the seal 41 and pushes the valve closing member 61 in the direction of the line connection piece 50, so that the valve device 60 opens. In this case, the seal 41 seals the passage 21 of the line connection piece 20 to create a pressure-resistant connection to the pressure chamber 44 of the pressure chamber housing 40. Overflow channels 65 can be provided in the valve-closing member 61 so that the hydraulic fluid can flow past the valve closing member 61.

For the removal of the line connection piece 20 from the housing 30, an engagement can be provided in the support 39 such that the operator can use a tool or fingernail to engage under the connection portion 79 or an extension 77 or 78 to pull the locking device 70 upwards and out of the supports 24. In order to prevent unwanted release, the locking device 70 can be sealed with the safety device 91.

For example, the pressure chamber housing 40 can be configured as shown in FIGS. 123 to 126. Reference is made to the description in FIGS. 123 to 126.

FIGS. 9 to 14 show a further exemplary embodiment that substantially corresponds to the exemplary embodiment shown in FIGS. 1 to 8. Equal reference signs denote equal or corresponding components or features. Reference is made to the description of the other exemplary embodiments. In the following, the focus is laid on the differences to the other exemplary embodiments.

The embodiment has a valve chamber housing 140, in which the valve device 60 is disposed. In this embodiment, the valve chamber housing 140 is not configured as a pressure chamber housing as in FIGS. 1 to 8 and 123 to 126, i.e., the hydraulic fluid can also flow past the outer side of the valve chamber housing 140 when valve device 60 is open. On its side facing the seal 141, the valve chamber housing 140 has a contact area 143 with which the seal 141 can be compressed such that the seal 141 is pressed against the inner wall of the housing 30 where it exerts a sealing impact. When the line connection piece 20 is inserted, the seal 141 is also pressed radially inwards onto the sealing area 26, so that the seal 141 simultaneously seals outwards and inwards. For example, the valve chamber housing 140 can be configured as shown in FIGS. 127 to 130. Reference is made to the description in FIGS. 127 to 130.

Alternatively, the valve chamber housing can additionally be configured as a pressure chamber housing.

The line connection piece 20 is attached to the hydraulic line 10 with a press sleeve 111. Alternatively, the line connection piece 20 can also be fastened to the hydraulic line as in the embodiment shown in FIG. 1.

Figure 9:
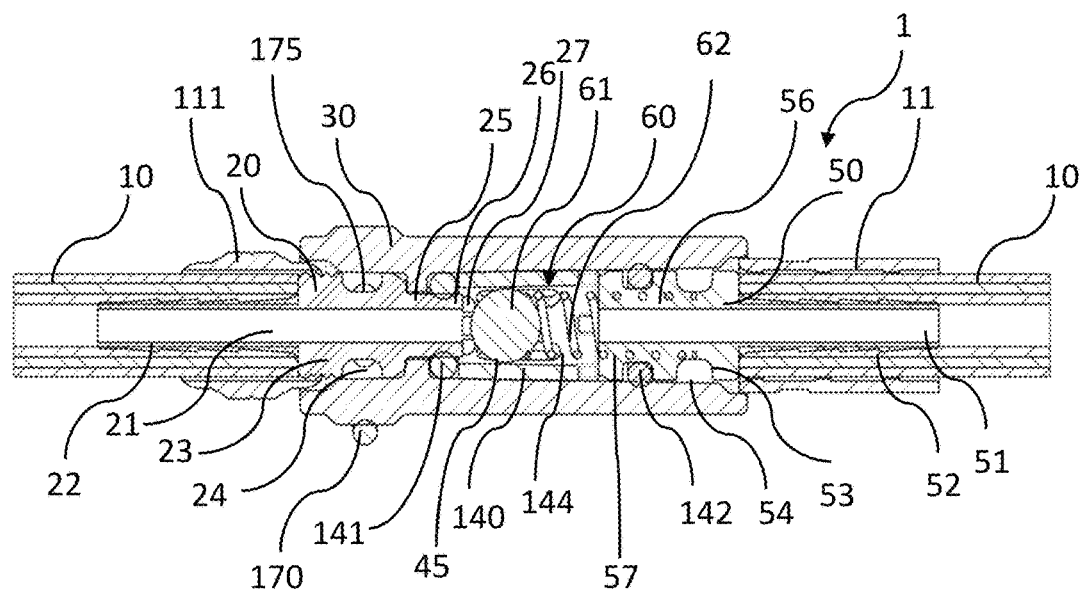
FIG. 9 is a cross-sectional view through a hydraulic line coupling according to an exemplary embodiment along lines X-X of FIG. 10, said cross-sectional view corresponding to FIG. 1.
Figure 10:
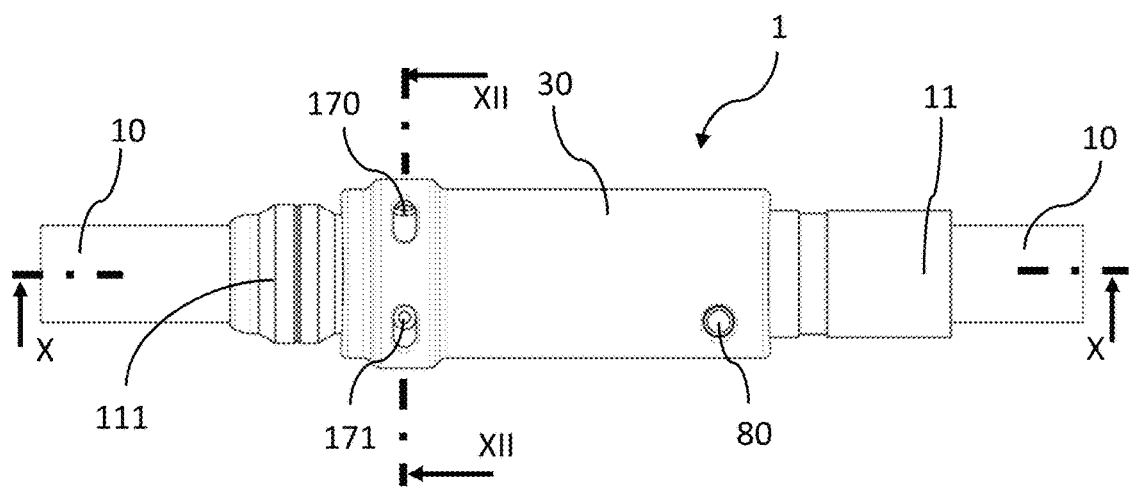
FIG. 10 is a top plan view of the hydraulic line coupling of FIG. 9.
Figure 11:
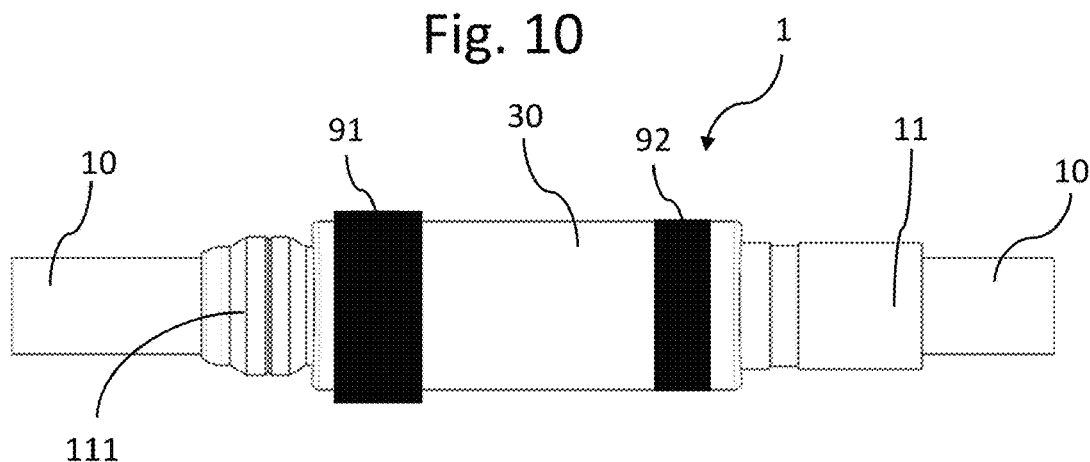
FIG. 11 is a top plan view of the hydraulic line coupling of FIG. 9 with safety devices, said top view corresponding to FIG. 10.

According to a non-illustrated embodiment, the line connection piece 50 of the embodiment of FIG. 1 or FIG. 9 can also be attached according to the line connection piece 20 to the hydraulic line 10 by a press sleeve 111, as shown in FIG. 9.

The valve device 60 comprises a closing member 61, which has a spherical shape. In order to create a connection around the closing member 61 when the line connection piece 20 is inserted in the housing 30 and presses the closing member 61 away from the seal 141, overflow channels 145 are provided on the inner wall of the valve chamber housing 140.

Because the locking device 170 has no extensions and is, therefore, shorter axially, i.e., in the direction of the line, the optional safety device 91 can be made smaller.

The line connection piece is axially secured in the housing with only one locking device 80. Alternatively, two locking devices 80 or one locking device for fastening or axially securing the line connection piece 50 can be provided, which corresponds to the locking device 70 of FIG. 1 or the locking device 170 of FIG. 9.

Figure 12:
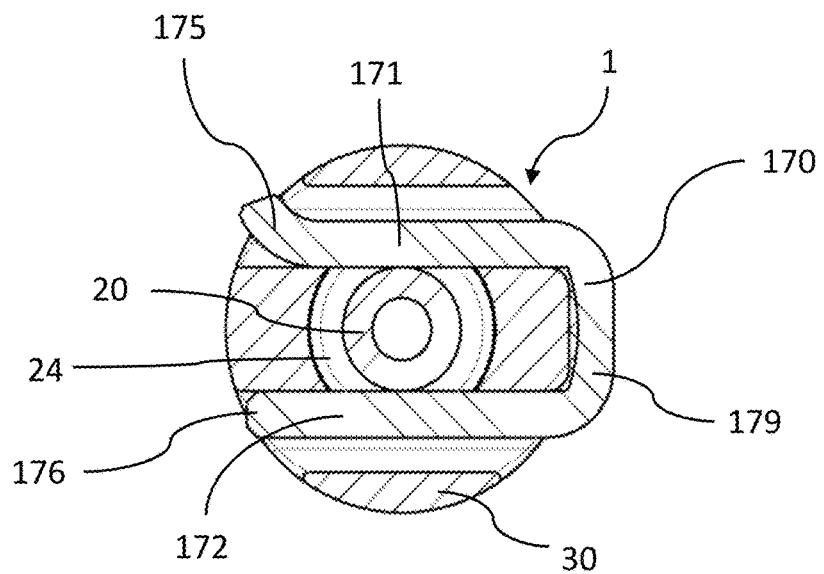
FIG. 12 is a cross-sectional view of the hydraulic line coupling of FIG. 9 along lines XII-XII of FIG. 10.
Figure 13:
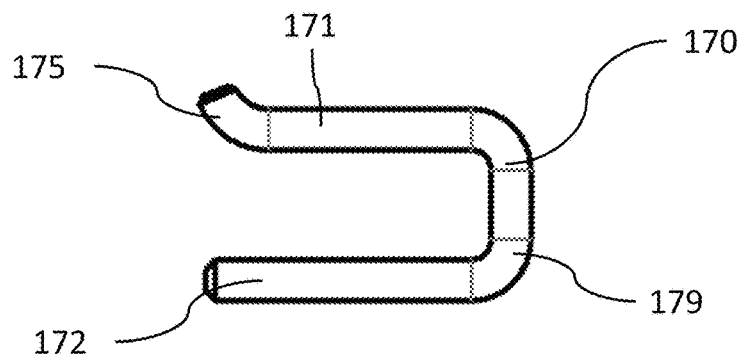
FIG. 13 is an elevational view of the locking device of the hydraulic line coupling of FIG. 9 said view corresponding to the perspective of FIG. 12.
Figure 14:
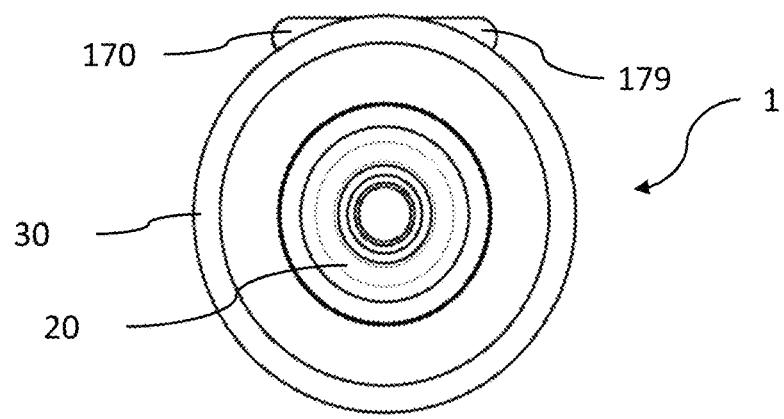
FIG. 14 is an elevational view of the hydraulic line coupling of FIG. 9 from the left side in FIG. 9.

FIGS. 12 to 14 show the locking device 170 of the hydraulic line coupling of FIG. 9. The locking device 170 comprises a leg 171, which at its end comprises a securing portion 175, which secures the locking device 170 against being pulled out unintentionally. The other leg 172 of the locking device 170 is straight. The two legs 171 and 172 are connected by a connecting portion 179.

Alternatively, the leg 172 of the locking device 170 can also be configured to correspond to the leg 171 and comprise a securing portion corresponding to the outwardly bent securing portion 175. The securing portion or portions 175 can also be configured to correspond to the inwardly bent locking device 70. On one leg or both legs, supports 73, 74 configured in accordance with the locking device 70 can be provided.

Figure 15:
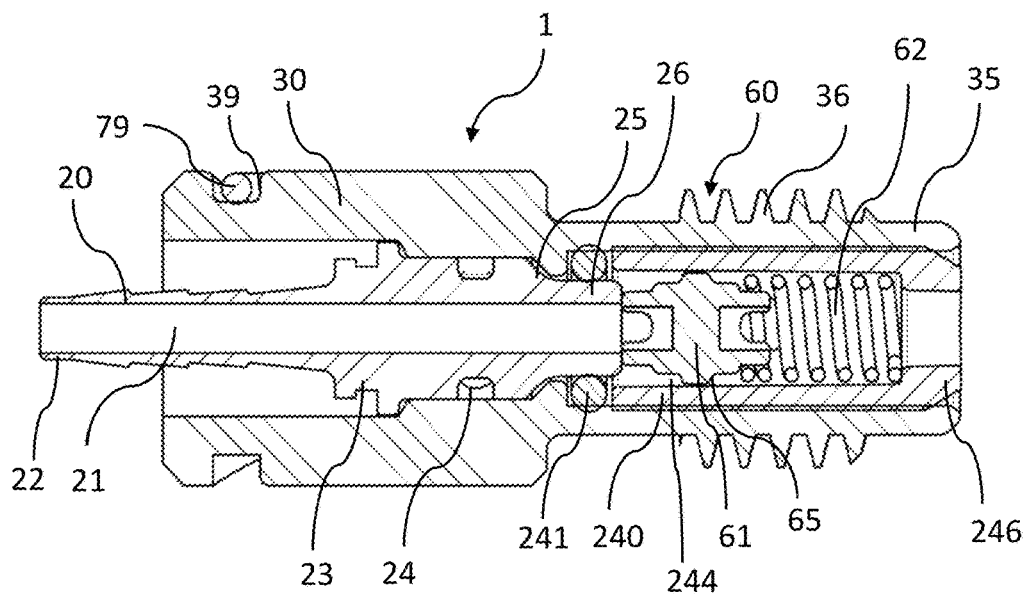
FIG. 15 is a cross-sectional view through a hydraulic line coupling according to an exemplary embodiment along lines XV-XV of FIG. 16, said cross-sectional view corresponding to FIGS. 1 and 9.
Figure 16:
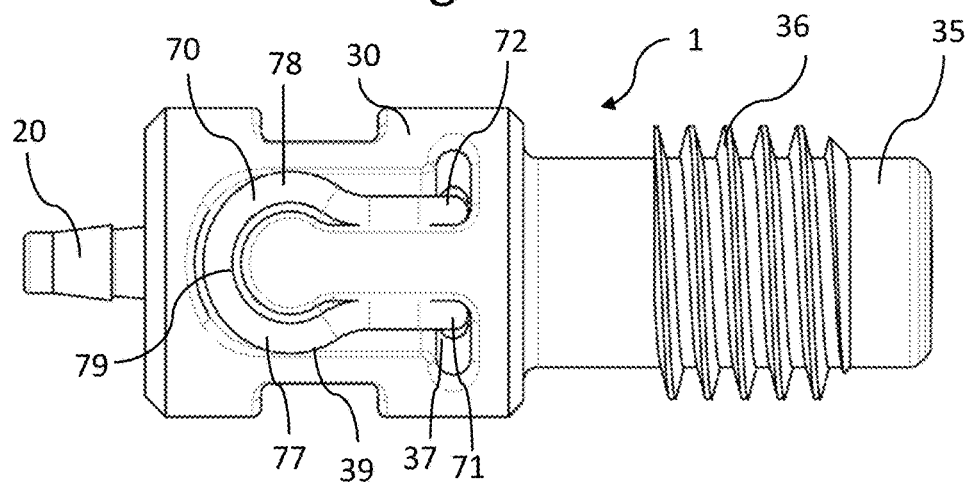
FIG. 16 is a top plan view of the hydraulic line coupling of FIG. 15.
Figure 17:
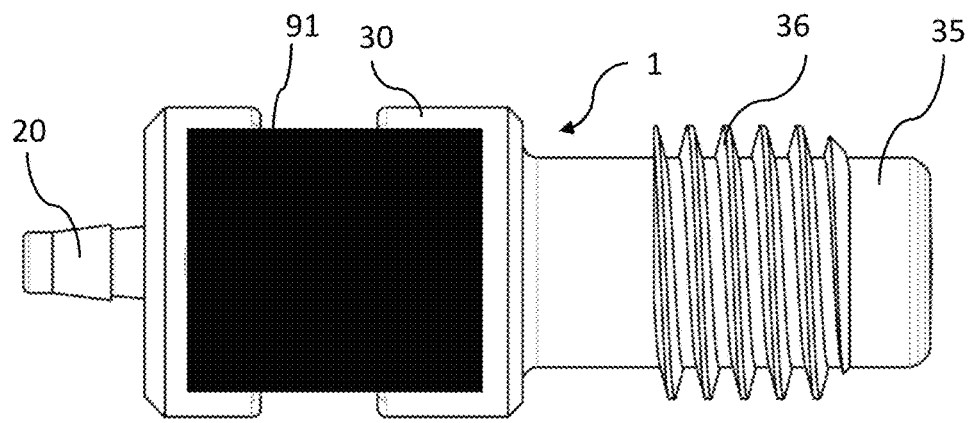
FIG. 17 is a top plan view of the hydraulic line coupling of FIG. 11 with a safety device, said top view corresponding to FIG. 16.

FIGS. 15 to 17 show a further exemplary embodiment, which substantially corresponds to the exemplary embodiments shown in FIGS. 1 to 8 and 9 to 14. Equal reference signs denote equal or corresponding components or features. Reference is made to the description of the other exemplary embodiments. In the following, the focus is laid on the differences to the other exemplary embodiments.

This embodiment has a valve chamber housing 240, which has a chamfer or flattening 246 on its side opposite the valve device 60. In front of the flattening 246, a web 247 interrupted in the circumferential direction can be provided, which ensures a free cross-section for hydraulic fluid flowing on the outer side of the valve chamber housing. Overflow channels 245 are provided on the inner side. Passages 248 create a connection between the outer side and the inner side of the valve chamber housing 240. The valve chamber housing 240 can, for example, be configured as shown in FIGS. 131 to 133. Reference is made to the description of FIGS. 131 to 133.

Alternatively, the valve chamber housing can additionally be configured as a pressure chamber housing.

The housing 30 is made of one piece and includes a fastening portion 35 that has an external thread 36 for fastening the hydraulic line coupling 1 to the housing of a hydraulic component, such as the master of a hydraulic coupling or hydraulic brake. The pressure chamber housing 40 disposed in the housing 30 has a sealing portion 43, with which the pressure chamber housing 40 can be disposed against a seal in the housing of the hydraulic component. As with the other exemplary embodiments, the housing 30 does not need to be pressure-resistant because the pressure of the system is conducted through the pressure chamber 44 of the pressure chamber housing 40 directly into the line connection piece 20.

The locking device 70 is configured to be rotated by one-hundred eighty degrees (180°) compared to the embodiment of FIG. 1 such that the connecting portion 79 is disposed away from the pressure chamber housing or the master. Correspondingly, the support 39 is disposed to the left of the passages 37.

The closing member 61 of the valve device 60 is configured similarly to the closing member 61 of the embodiment of FIG. 1. Alternatively, the closing member 61 can be configured according to the embodiment of FIG. 9. In this case, the pressure chamber housing 40 should have corresponding overflow channels 45.

Alternatively, the locking device 70 might be configured according to the locking device 170 shown in FIGS. 9 to 14.

FIGS. 18 to 22 show a further exemplary embodiment that substantially corresponds to the embodiments shown in FIGS. 1 to 8 or 9 to 14 or, in particular, to the exemplary embodiment shown in FIGS. 15 to 17. Equal reference signs denote equal or corresponding components or features. Reference is made to the description of the other exemplary embodiments. In the following, the focus is laid on the differences to the other exemplary embodiments.

The housing 130 is made of one piece and, on the side opposite the line connection piece 320, has a linking device 132, which comprises a passage 131 and a ring head 132, which can be fastened in a manner known to a person skilled in the art, for example, to a slave of a hydraulic bicycle disk brake with a banjo bolt or a fastening bolt with external hydraulic channels. The other side of the linking device 132 has a support for receiving the valve device 60, which comprises a valve closing member 61 and a valve closing spring 62. The line connection piece 320 corresponds substantially to the line connection piece 20 of FIG. 1 and has a support 324 for the locking device 170, a transition area 325 for spreading the locking device 170 when inserted into the housing 30 and a sealing area 326 for the seal 341 for sealing with the pressure chamber housing 340.

Figure 120:
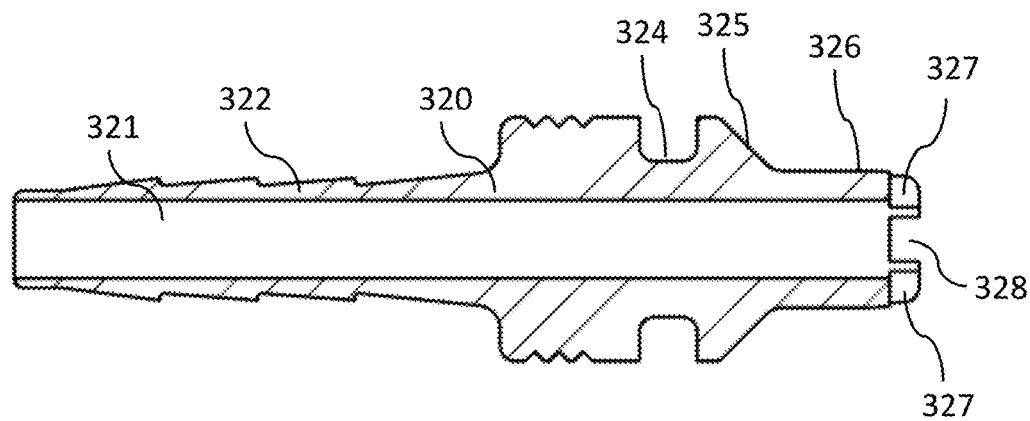
Figure 121:
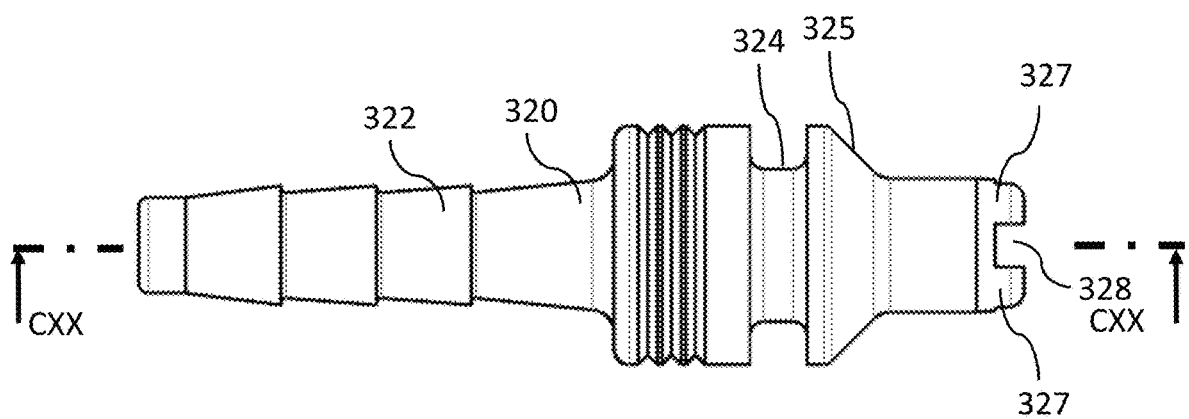
Figure 122:
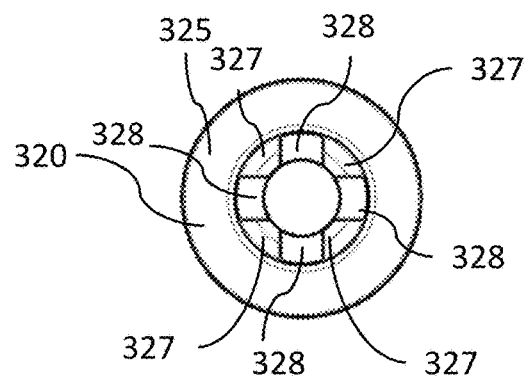
Figure 123:
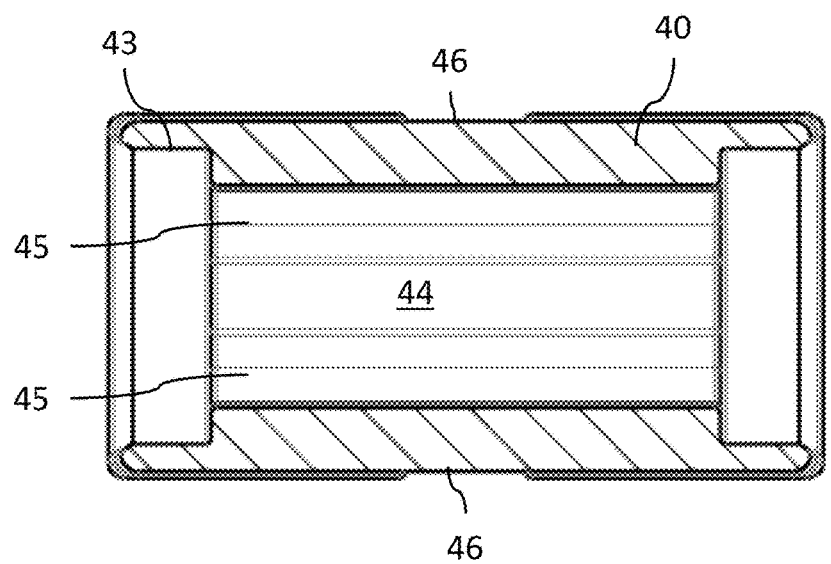
Figure 124:
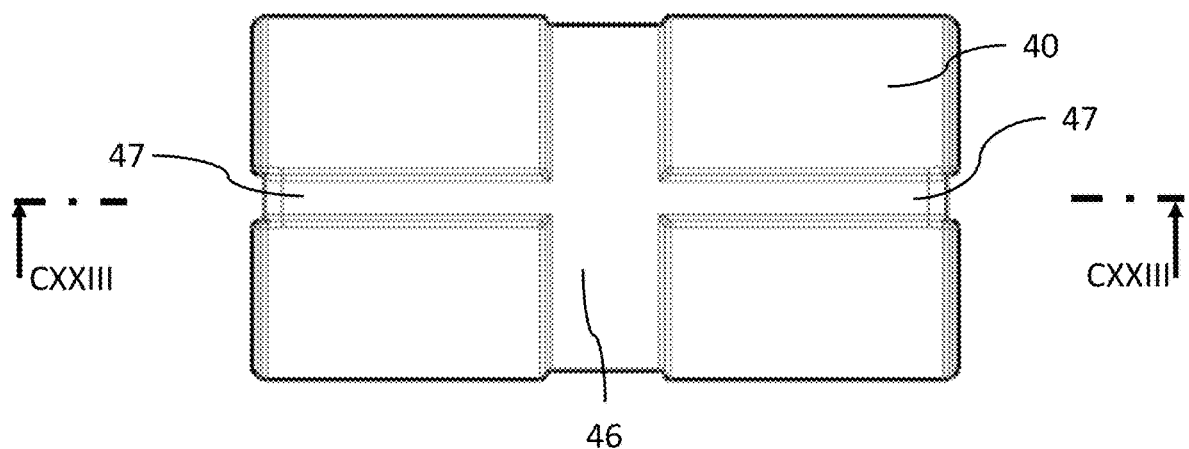
Figure 125:
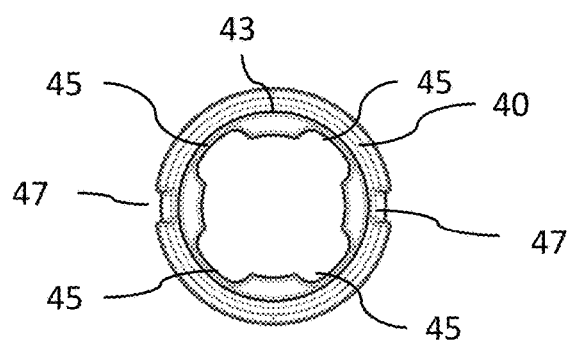
Figure 126:
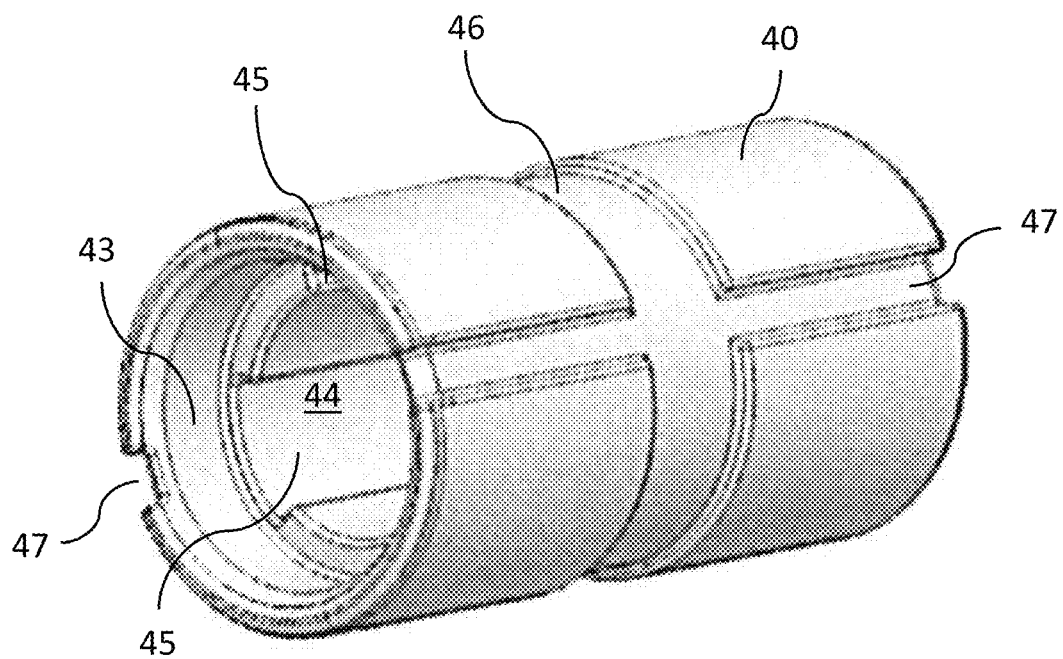
Figure 127:
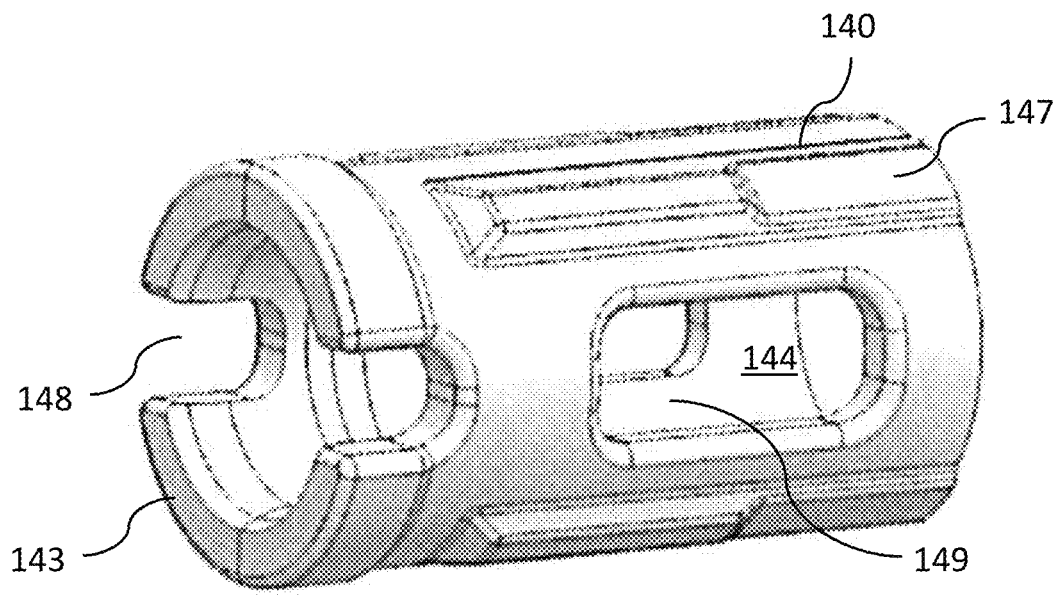
Figure 128:
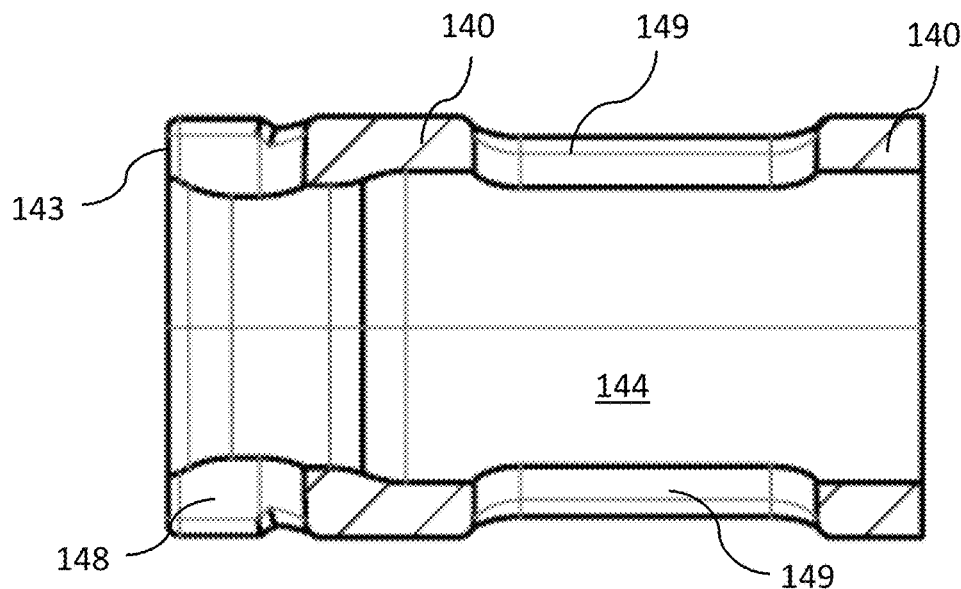
Figure 129:
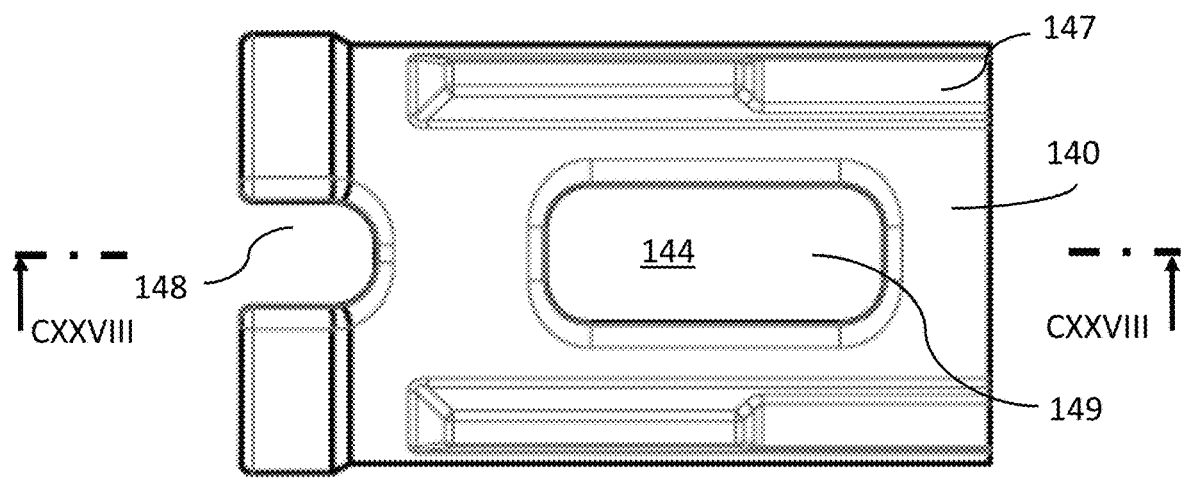
Figure 130:
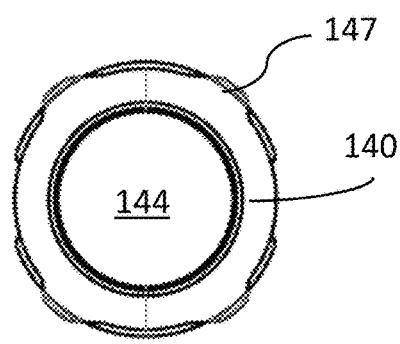

The line connection piece 320 is preferably configured according to the line connection piece 320 shown and described in FIGS. 120 to 122 and has, on its side facing the valve closing member 61, recesses 328 and webs 327 in between, with which the line connection piece 320, when inserted, moves the valve closing member 61 out of its closed position into contact with the seal 341 in the direction of the linking device 132. In this process, the sealing area 326 comes into contact with the seal 61, so that very quickly after opening the sealing device 60, the hydraulic system or the hydraulic line coupling 1 is closed again, so that as little air as possible is introduced or hydraulic fluid can escape. Since the actuation is parallel to the closing direction during the insertion or removal, a very fast actuation and thus a very short time in which the hydraulic system is open can be achieved.

A sealing portion 348 is disposed between the valve chamber 344 and the line connection piece 320 and defines the position of the seal 341 such that the seal 341 seals between the sealing portion 326 of the line connection piece 320 and the valve chamber housing 340. Alternatively, the valve chamber housing 340 and the sealing portion 348 can be configured in two parts, a groove being preferably provided in all embodiments to accommodate the seal 341.

The valve chamber housing 340 can also be configured similar to the pressure chamber housing 40 of FIG. 1 such that overflow channels are formed on the inner wall and channels for a leak test are disposed on the outer side. At its end facing the linking device 132, the valve chamber housing can have a chamfer 346 corresponding to the valve chamber housing 240 shown in FIGS. 131 to 133.

The locking device 170 is configured to correspond to the locking device 170 shown in FIGS. 9 to 14. Alternatively, the locking device 170 could be configured to correspond to the locking device 70 shown in FIGS. 1 to 8.

Figure 23:
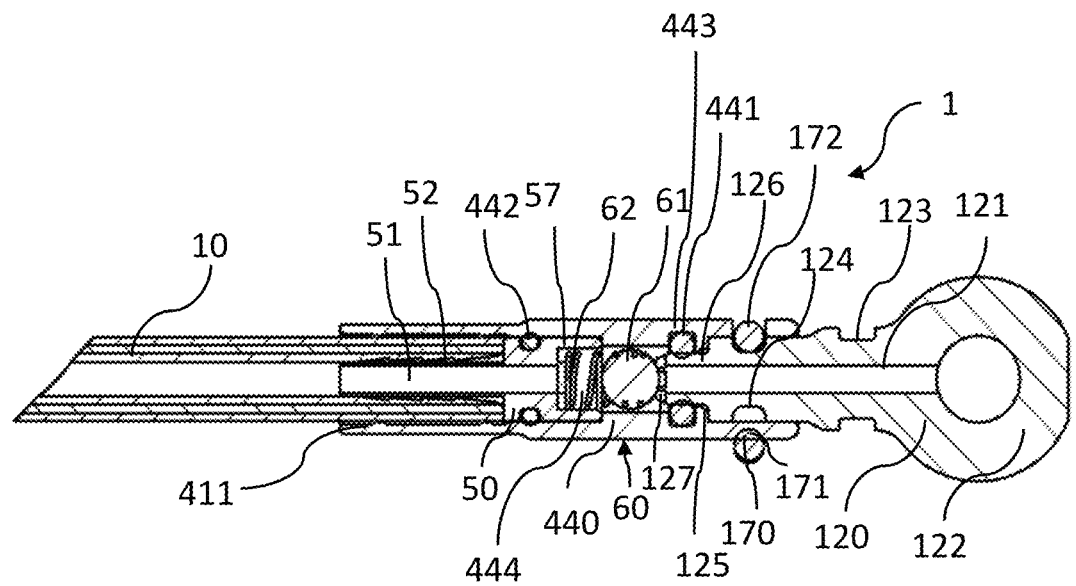
FIG. 23 is a cross-sectional view through a hydraulic line coupling according to an exemplary embodiment, said cross-sectional view corresponding to FIGS. 1, 9, 15 and 18.
Figure 24:
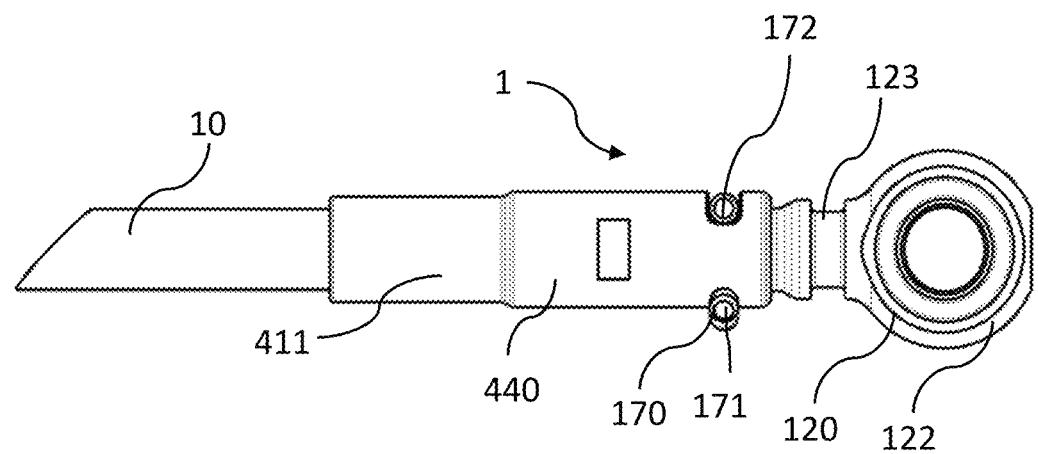
FIG. 24 is a top plan view of the hydraulic line coupling of FIG. 23, said top view corresponding to FIG. 20.

FIGS. 23 to 24 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 23 and 24 is shown without housing. In another exemplary embodiment, it can be configured in the same way as the other embodiments, wherein it can be attached to the fastening portion 123 of the line connection piece 120. Alternatively, the housing can also be omitted because the pressure chamber housing 440 is configured such that the seal 441 closes the hydraulic line 10 by contact of the valve closing member 61 when the line connection piece 120 is not mounted or inserted, and the seal 441 also closes the hydraulic line coupling 1 to the outside when the line connection piece 120 is inserted and the valve device 60 is open.

The line connection piece 120 comprises a passage 121 and a ring head 122, which can, for example, be attached in a manner known to a person skilled in the art to a slave of a hydraulic bicycle disk brake with a banjo bolt or a fastening bolt having external hydraulic channels. The other side of the linking device 122 is configured according to the line connection piece 20 of FIG. 1 and has a support 124 for the locking device 170, a transition area 125 for spreading the locking device 170 when inserting it into the pressure chamber housing 440 and a sealing area 126 for the seal 441 for sealing with the pressure chamber housing 440.

The pressure chamber housing 440 has an extension with a pressing portion 411, to which the hydraulic line 10 is attached.

FIGS. 25 to 28 show further exemplary embodiments, which substantially correspond to the other exemplary embodiments. Equal reference signs denote equal or corresponding components or features. Reference is made to the description of the other exemplary embodiments. In the following, the focus is laid on the differences to the other exemplary embodiments.

In the embodiments shown in FIGS. 25 to 28, the two line connection pieces 20 are configured according to the left-hand line connection piece 20 shown in FIG. 1 and have a transition area 25, with which the locking device 170 can be spread when the line connection piece 20 is inserted.

The two locking devices 170 are configured according to the locking device 170 of the embodiment shown in FIG. 9. The two locking devices 170 or one of the two locking devices 170 can alternatively also be configured according to the locking device 70 of FIG. 1 or one of the other locking devices.

Figure 25:
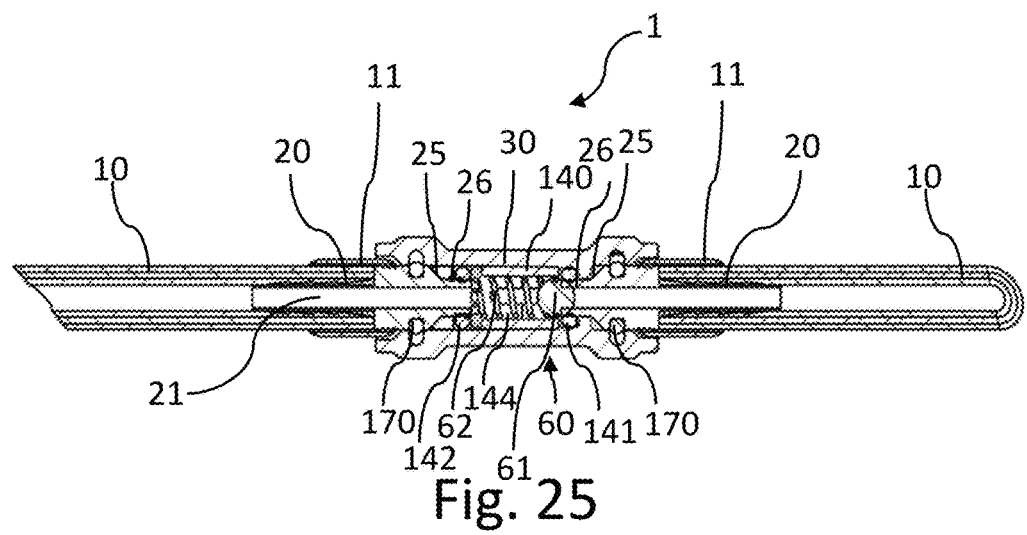
FIG. 25 is a cross-sectional view through a hydraulic line coupling according to an exemplary embodiment, said cross-sectional view corresponding to FIGS. 1, 9, 15, 18 and 23.
Figure 26:
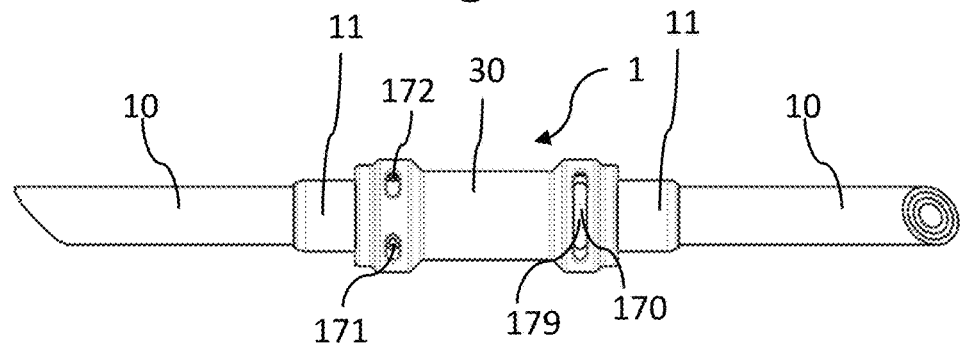
FIG. 26 is a top plan view of the hydraulic line coupling of FIG. 25, said top view corresponding to FIG. 24.

The embodiment shown in FIGS. 25 to 26 has a valve device 60 with a spherical closing member 61 as shown in FIG. 9, wherein overflow channels can be provided on the pressure chamber housing 140 or, as in FIG. 9, webs 27 can be provided on the line connection piece 20.

Figure 27:
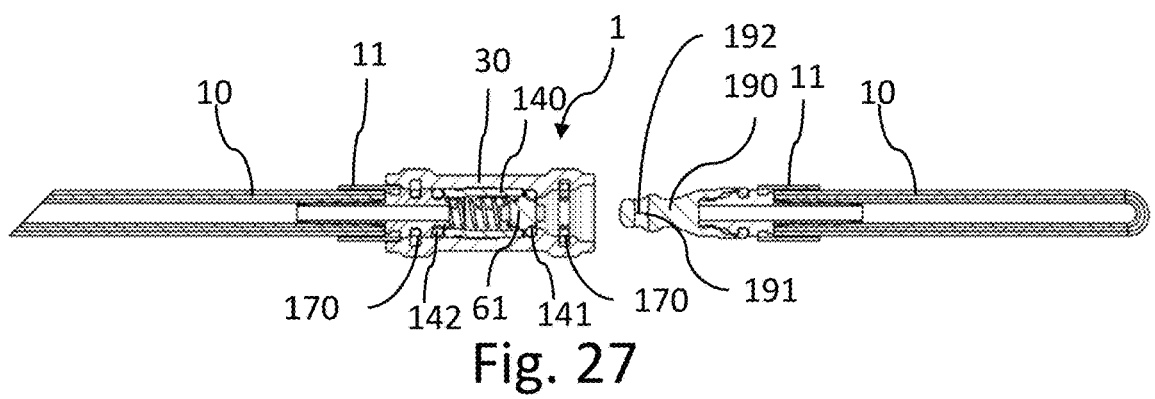
FIG. 27 is a cross-sectional view prior to the insertion of the line connection piece that has a closure device, said view corresponding to FIG. 25.
Figure 28:
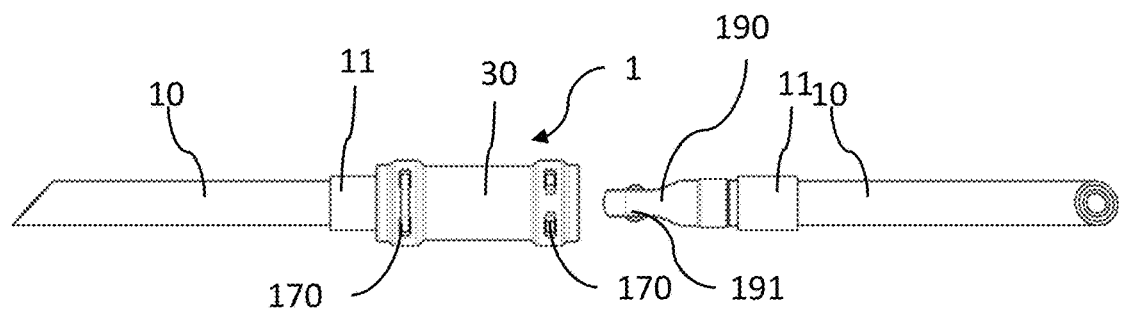
FIG. 28 is a top plan view of the hydraulic line coupling of FIG. 25 in the condition of FIG. 27, said top view corresponding to FIG. 26.

The embodiment shown in FIGS. 27 to 28 has a valve device 60 with a closing member 61, which is configured according to the embodiment in FIG. 1, wherein the overflow channels are formed in the closing member 61.

In the embodiment shown in FIGS. 27 to 28, a closure device 190 is provided on the right-hand line connection piece 20, which can, for example, be configured as a protective cap that can be removed before the line connection piece 20 is inserted into the housing. The closure device 190 prevents the escape of hydraulic fluid, for example, during transport or storage. A locking device 191 is provided on the closure device 190 to prevent incorrect insertion of the line connection piece 20 with the closure device 190 in place. The locking device 191 can, for example, be configured as a bead, the dimension or cross-section of which is so large that it cannot be inserted into the housing 30.

In the area of the locking device 191, a support 192 is provided into which, e.g., a wire or another tool can be inserted, with which the hydraulic line can be guided, e.g., through a frame part for the purpose of laying or mounting.

Figure 29:
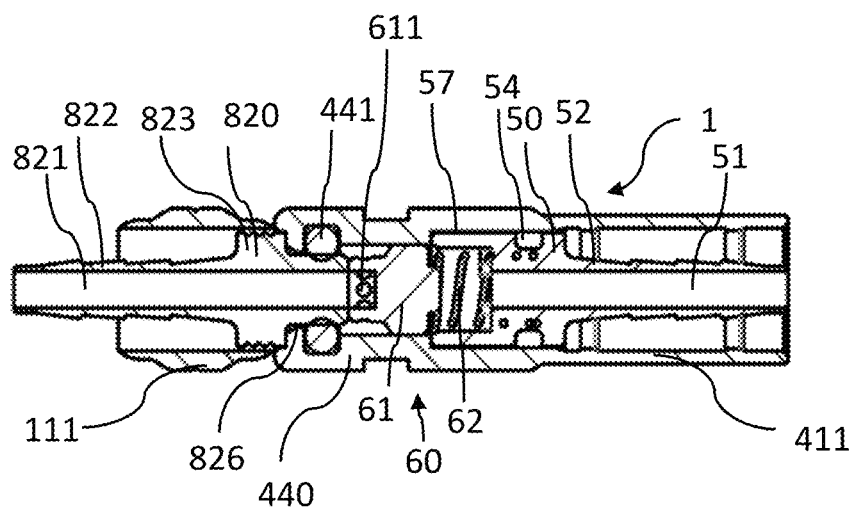
FIG. 29 is a cross-sectional view through a hydraulic line coupling according to an exemplary embodiment, said cross-sectional view corresponding to FIGS. 1, 9, 15, 18, 23 and 25.
Figure 30:
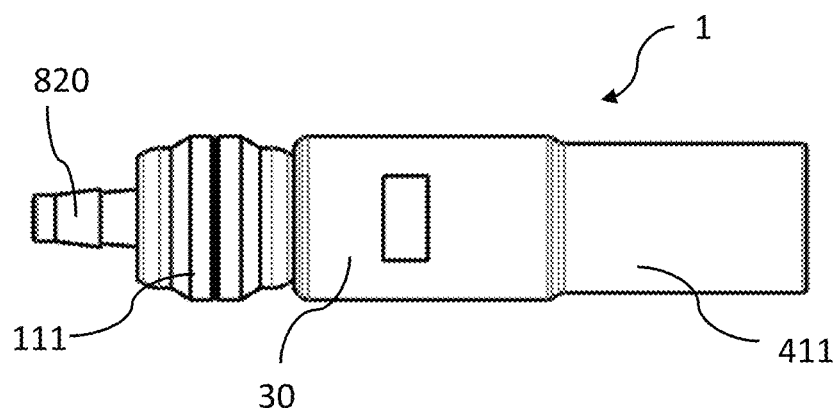
FIG. 30 is a top plan view of the hydraulic line coupling of FIG. 29, said top view corresponding to FIG. 26.
Figure 31:
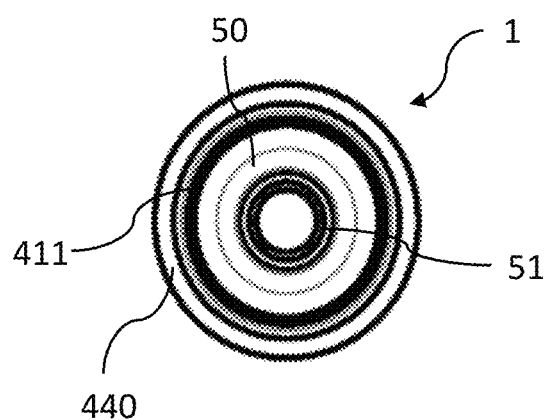
FIG. 31 is an elevational view of the hydraulic line coupling of FIG. 29 from the right side in FIG. 29.

FIGS. 29 to 31 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

In the embodiment of FIGS. 29 to 31, a pressure chamber housing 440 is provided, which can be configured according to the embodiment of FIGS. 23 and 24. In the recess 54 of the right-hand line connection piece 50, a locking device can be disposed according to the locking device 80 of FIG. 1 and/or a seal 442 can be disposed according to the embodiment of FIG. 23.

The left hydraulic line (not shown) can be fastened with a press sleeve 111 to the left line connection piece 820 on the fastening portion 823, which is disposed between the sealing portion 826 and the extension 822.

The valve closing member 61 can have passages 611 as shown to ensure a hydraulic connection between the two line connection pieces 50 and 820 when the valve device 60 is open.

As with all embodiments, a housing 30 can be disposed around the pressure chamber housing 440 and can, for example, engage in the recesses provided in the area of the valve device 60 on the pressure housing 440.

FIGS. 32 to 35 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

Figures 34, 35:
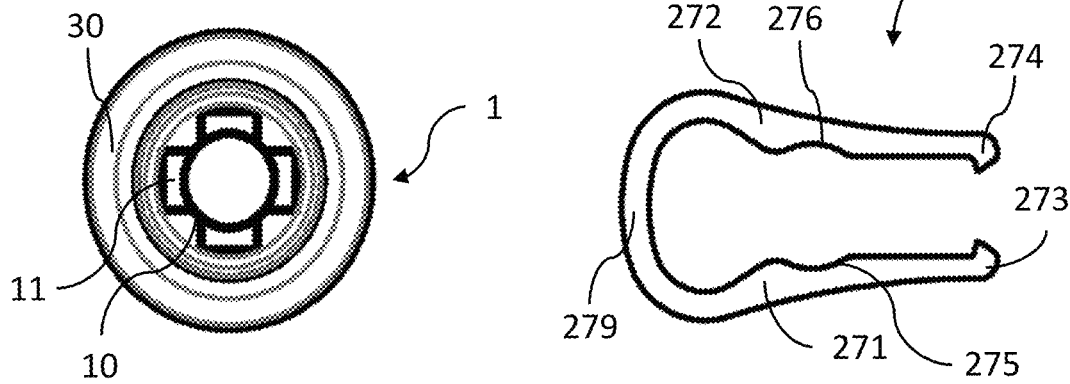
FIG. 34 is an elevational view of the hydraulic line coupling of FIG. 32 from the right side in FIG. 32.
FIG. 35 is an elevational view of the locking device of the hydraulic line coupling of FIG. 32.

The embodiment shown in FIGS. 32 to 35 corresponds substantially to the embodiment in FIG. 1, with an alternative locking device 270 being provided. As shown in FIG. 35, the locking device 270 comprises two legs 271 and 272 connected by a connecting portion 279. The ends of the legs 271 and 272 are provided with securing portions 275 and 276, respectively, which engage behind the respective line connection piece 20, 50 after the insertion, so that the locking device is secured against removal. The legs 271, 272 have, in the middle, support portions 273, 274 for receiving the line connection pieces 20, 50 in the area of the supports 24, 54, in which the legs 271, 272 are disposed.

Figure 32:
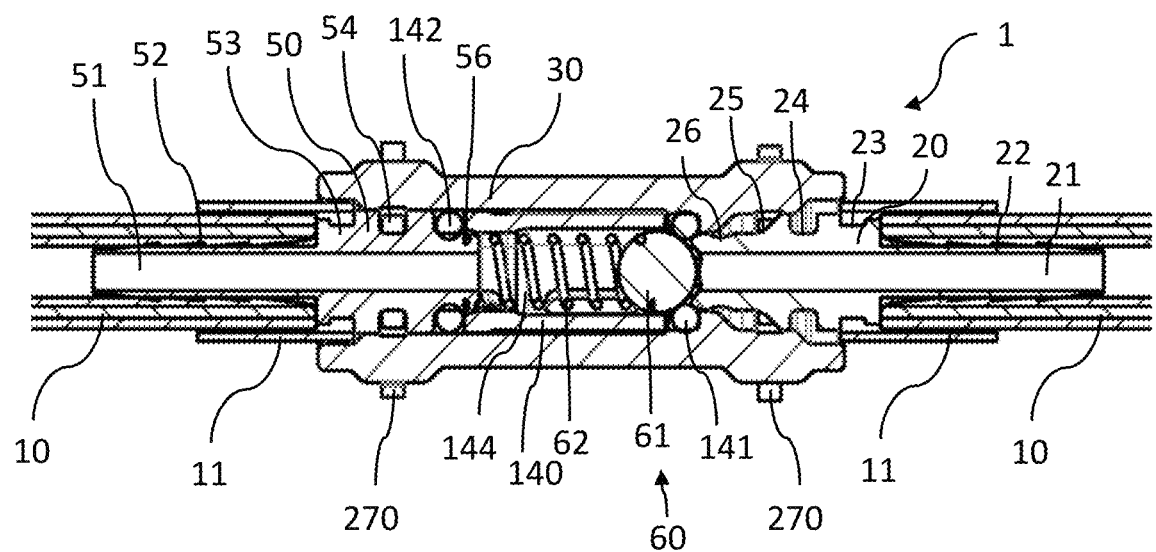
FIG. 32 is a cross-sectional view through a hydraulic line coupling according to an exemplary embodiment, said cross-sectional view corresponding to FIGS. 1, 9, 15, 18, 23, 25 and 29.
Figure 33:
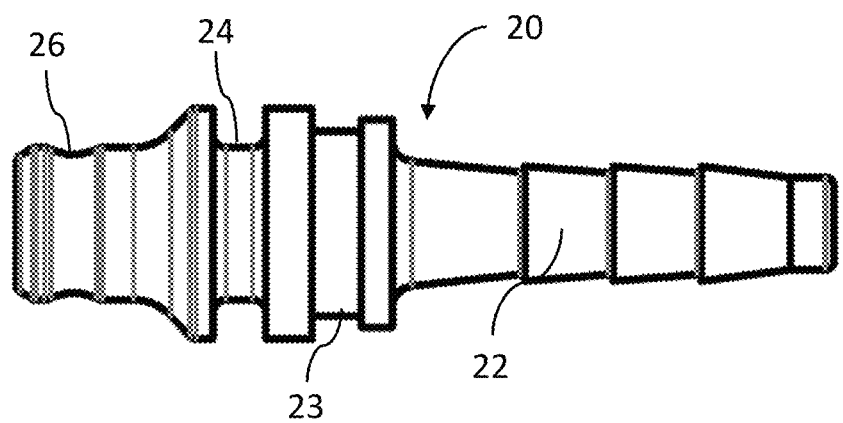
FIG. 33 is an elevational view of the line connection piece of the embodiment of FIG. 32.

FIG. 32 shows the hydraulic line coupling in a state in which the line connection piece is only partially inserted into the housing 140 such that the valve device 60 is not yet actuated, so that the valve closing member rests against the seal 141.

Figure 36:
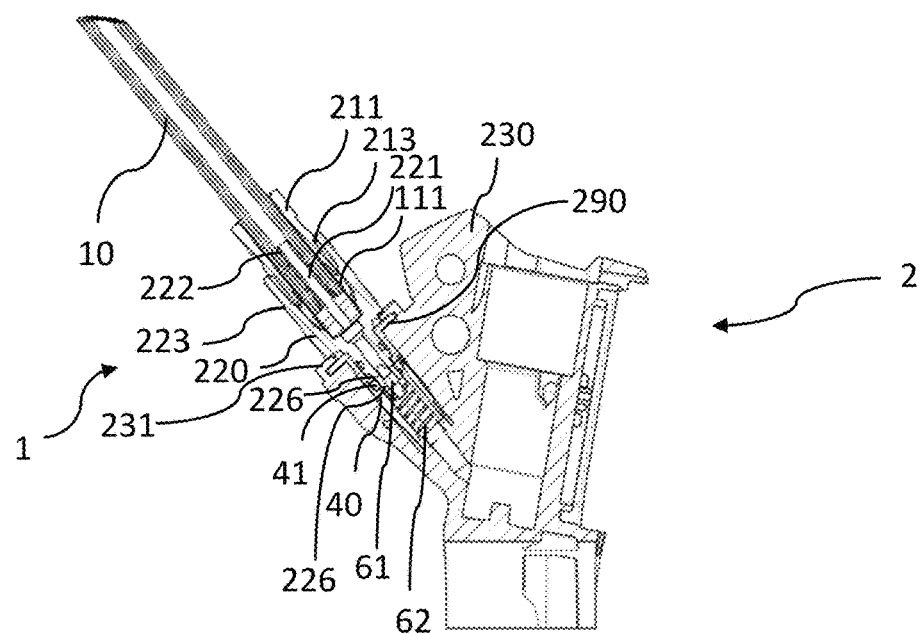
FIG. 36 is a cross-sectional view of a hydraulic master apparatus with a hydraulic line coupling according to an exemplary embodiment.
Figure 37:
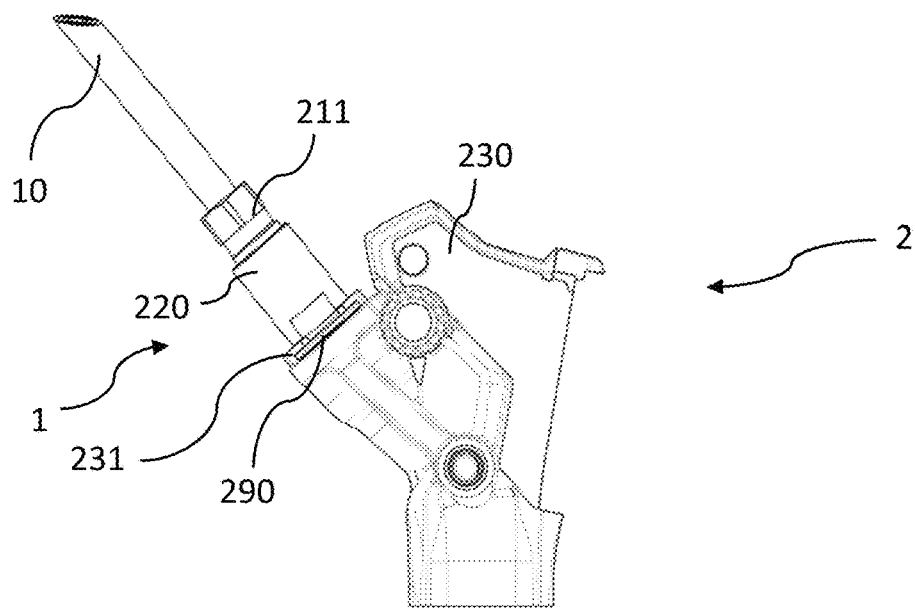
FIG. 37 is a side elevational view of the hydraulic master apparatus of FIG. 36.

FIGS. 36 to 37 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

In the embodiment of FIG. 36, the hydraulic line coupling 1 is disposed in a master apparatus 2, which can be the master apparatus of a hydraulic bicycle brake, for example. The components of the master apparatus known to a person skilled in the art, such as the components of the pressure cylinder, are not shown. The master apparatus 2 comprises a housing 230, in which a pressure chamber housing 40 is disposed, which is sealed with a seal 41 from the line connection piece 220.

The line connection piece 220 is secured in interlocking fashion to the housing 230 with a locking device 70 according to the embodiment of FIG. 1. The line connection piece 220 is made in two parts and comprises one part with the extension 222, which is fastened to the line connection piece 220 with a press sleeve 111. The line connection piece comprises a fastening portion 223 with an internal thread into which a press sleeve 211 is screwed, which has a corresponding external thread on a fastening portion 213.

The hydraulic line coupling also includes a closure device 290, with which the line connection piece 220 can be secured in the housing. For example, the closure device 290 can be configured as a twist lock similar to a bayonet lock, which, for example, has two extensions that can be turned under a corresponding clamping device 231 to secure or lock the closure device 240 to the housing 230 to prevent unintended release.

The closure device 290 is disposed and formed such that it is simultaneously used as a support or securing member for the seal 41, for example, in that the end of the closure device 290 defines one side of a groove in which the seal 41 is received.

The locking device 290 is rotatably mounted in the housing such that it can be rotated by about 90 degrees to a release position in which the locking device 70 can be removed from the line connection piece or the line connection piece 220 can be removed from the housing 230 so that the hydraulic line 10 can be disconnected from or connected to the housing 230.

Figure 90:
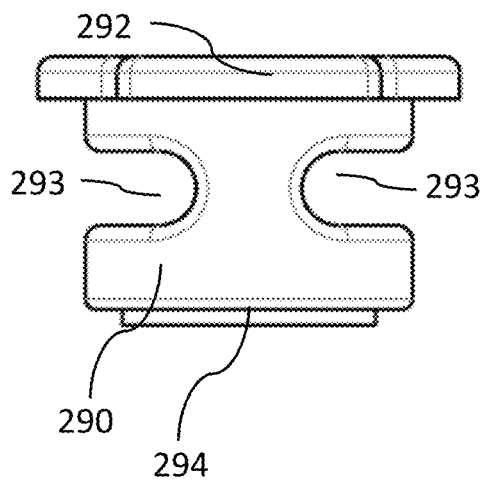
FIG. 90 is a side elevational view of the closure device of FIG. 88.
Figure 91:
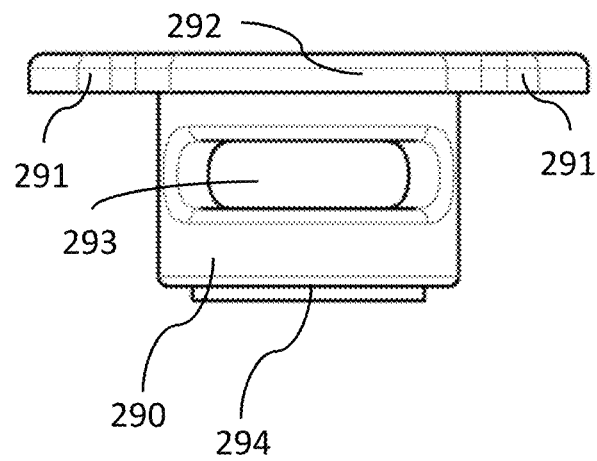
FIG. 91 is a side elevational view of the closure device of FIG. 90, said side view being turned by 90 degrees.
Figure 92:
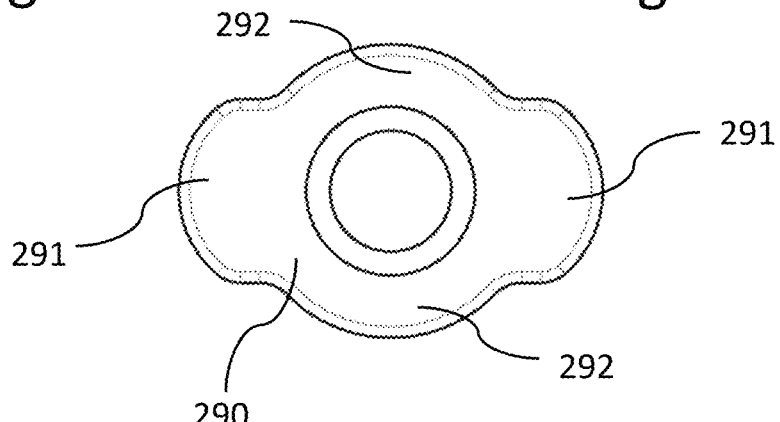
FIG. 92 is a top plan view of the closure device of FIG. 90.
Figure 93:
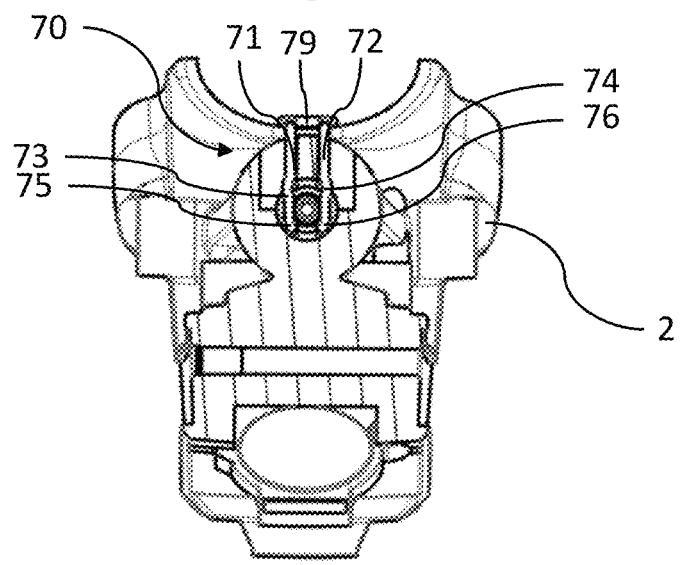
FIG. 93 is a cross-sectional view of the hydraulic master apparatus of FIG. 88 along lines XCIII-XCIII of FIG. 88.
Figure 94:
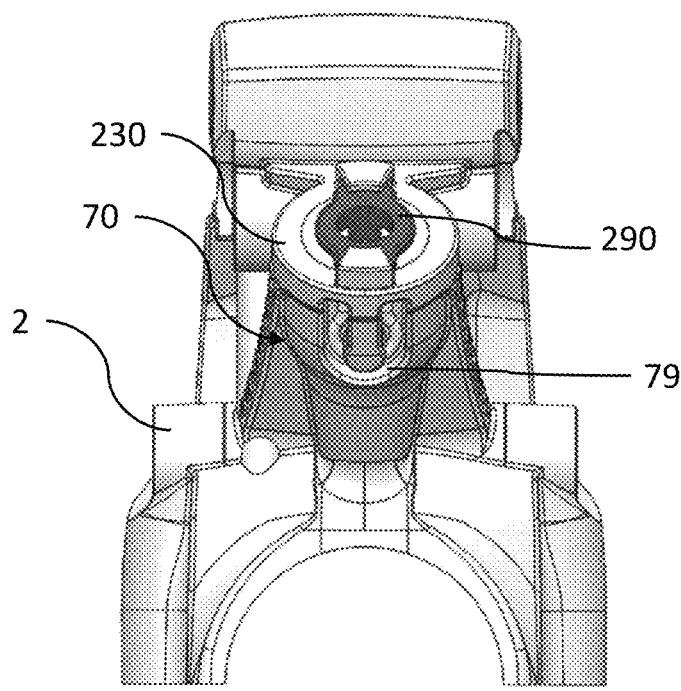
FIG. 94 is a perspective view of the hydraulic master apparatus of FIG. 88 diagonally from below.
Figure 95:
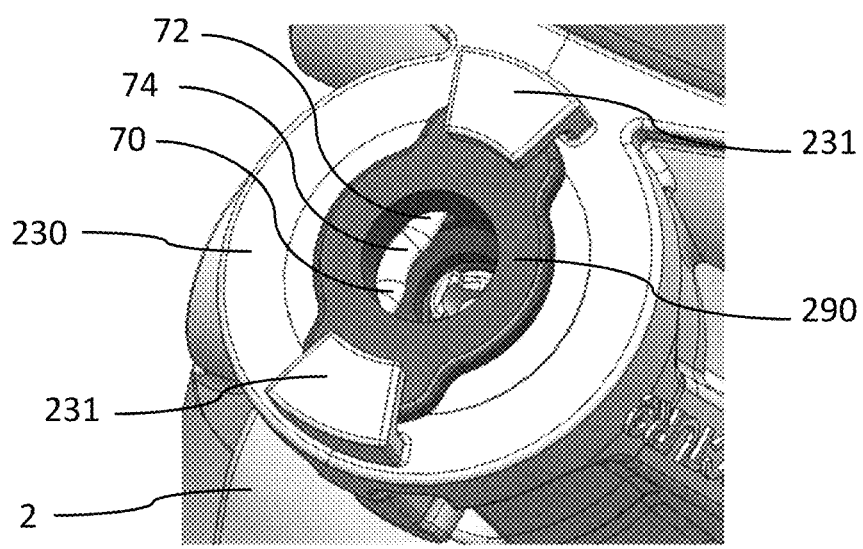
FIG. 95 is a perspective view of the hydraulic master apparatus of FIG. 88 diagonally from above.
Figure 96:
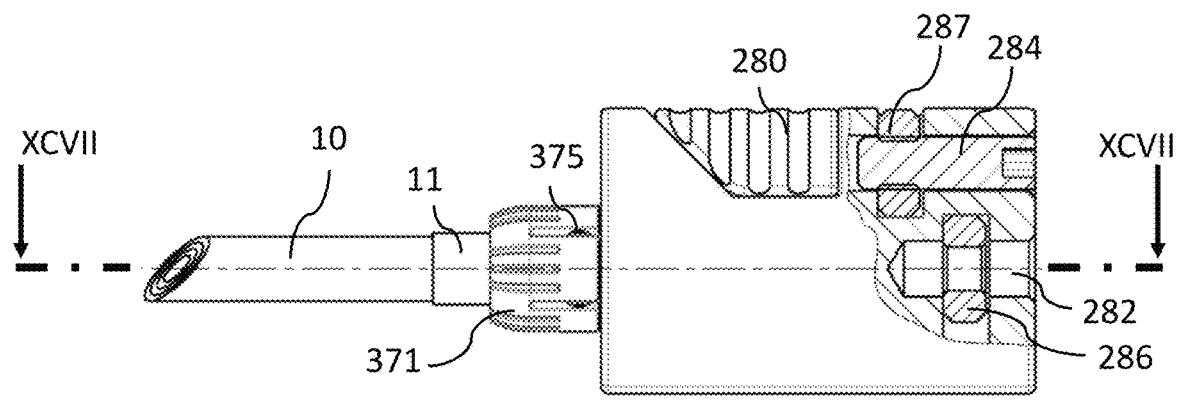
FIG. 96 is a side elevational view of a hydraulic line coupling according to an exemplary embodiment.
Figure 97:
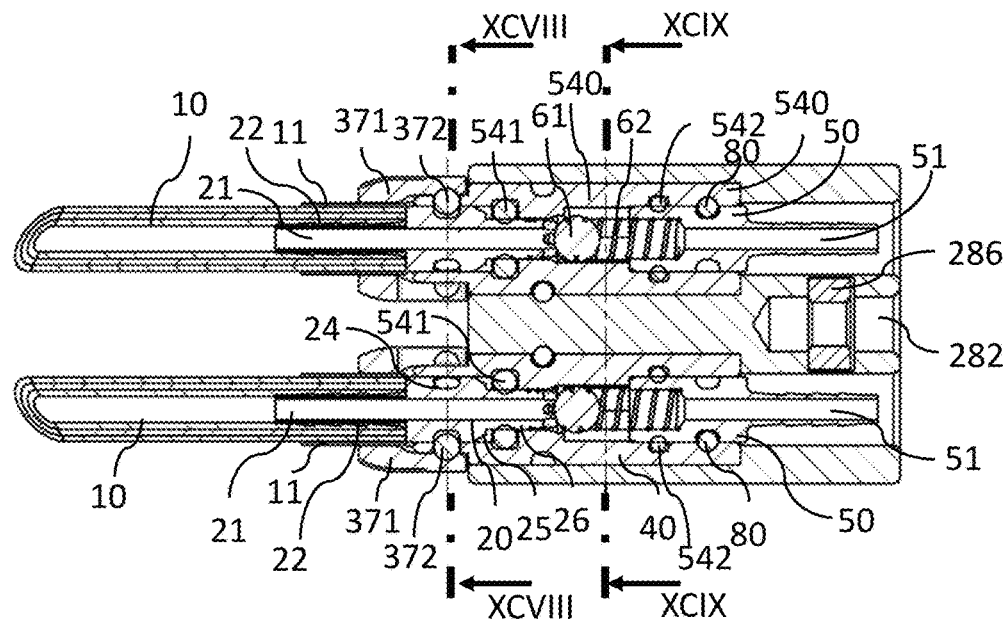
FIG. 97 is a cross-sectional view of the hydraulic line coupling of FIG. 96 along the lines XCVII-XCVII of FIG. 96.

The locking device 290 can be configured according to the locking device 290 shown in FIGS. 90 to 92.

FIGS. 38 to 41 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment shown in FIGS. 38 to 41 has two hydraulic line couplings 1, which are configured according to the embodiment in FIG. 1. The respective line connection pieces 20 can be secured against the housing 30 by disposing locking devices 70 in the supports 24, i.e., by an indirect interlocking connection, which is made as described above. Likewise, the respective line connection pieces 50 can be secured through locking devices 80, which engage in the supports 54.

In contrast to the embodiment of FIG. 1, the two hydraulic line couplings are disposed in a shared housing 30. The housing 230 has a clamping device 280, which is secured to the housing with a safety device 281 that can, for example, include a safety clip. The clamping device 280 has a wedge that can be tightened with a clamping device 282 such that the housing can be clamped with the clamping device in a tube.

Here, the clamping device 280 or the housing 30 with the clamping device 280 can have a double function if the housing 30 is disposed in a handlebar shaft tube 4, which is to be clamped with respect to a frame tube of the vehicle. The clamping device 280 can clamp the handlebar shaft tube 4 against the frame tube and at the same time clamp the housing 30 or the hydraulic line couplings 1 with respect to the handlebar shaft tube 4. The clamping device 282 can comprise a threaded hole 283 in the housing 30, into which a threaded screw 285 can be screwed to be fastened in a handlebar shaft tube 4. When screwed into the threaded hole, the clamping device 280 slips radially outwards due to the wedge-shaped ramp and clamps the housing 30 in the handlebar shaft tube 4.

In the housing 30, an adjusting device 284 is provided, with which the clamping device 280 can be fastened in the tube in order to be able to adapt the claw function of the clamping device 280 to different diameters of the handlebar shaft tube. By turning the adjusting device 284, the clamping device, which is configured as a wedge in the embodiment shown, can be adjusted radially outwards or inwards so that it can be adapted to the diameter of the tube in which the housing 30 is clamped. After the adjustment, the clamping device 282 can be tightened, for example, by a clamping screw 285, which is inserted into the threaded bore 283.

Figure 38:
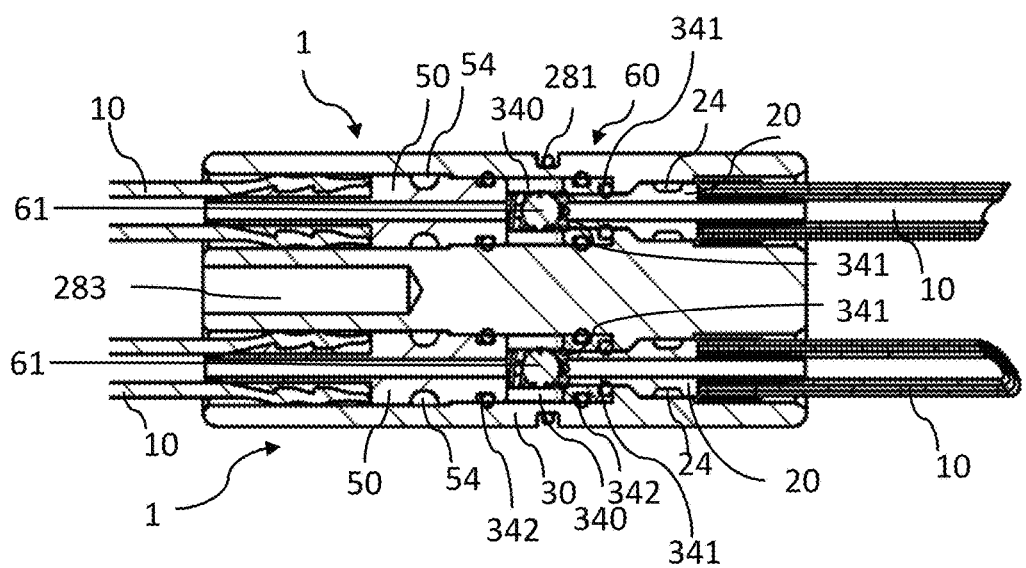
FIG. 38 is a cross-sectional view of a hydraulic line coupling according to an exemplary embodiment along lines XXXVIII-XXXVIII of FIG. 40.
Figure 39:
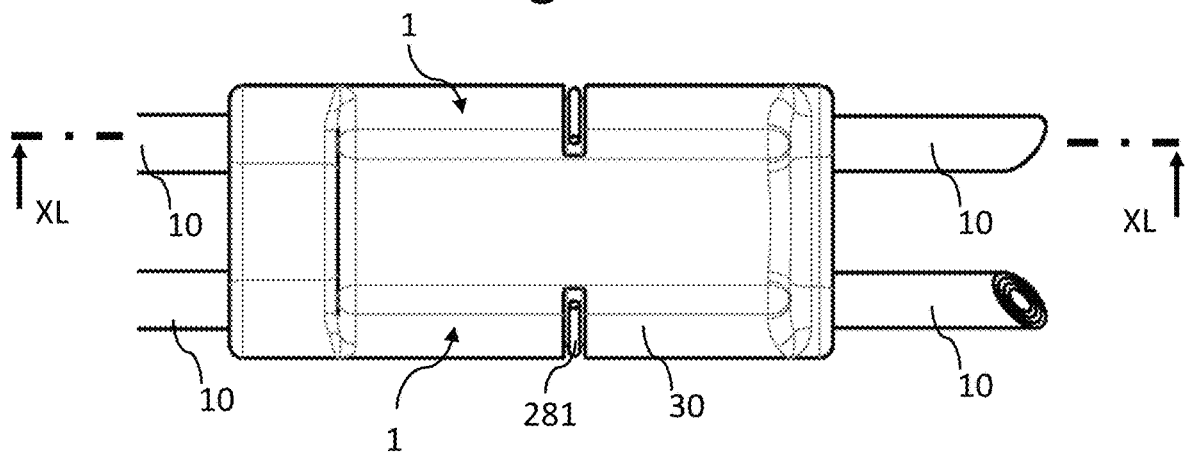
FIG. 39 is a top plan view of the hydraulic line coupling of FIG. 38.
Figure 40:
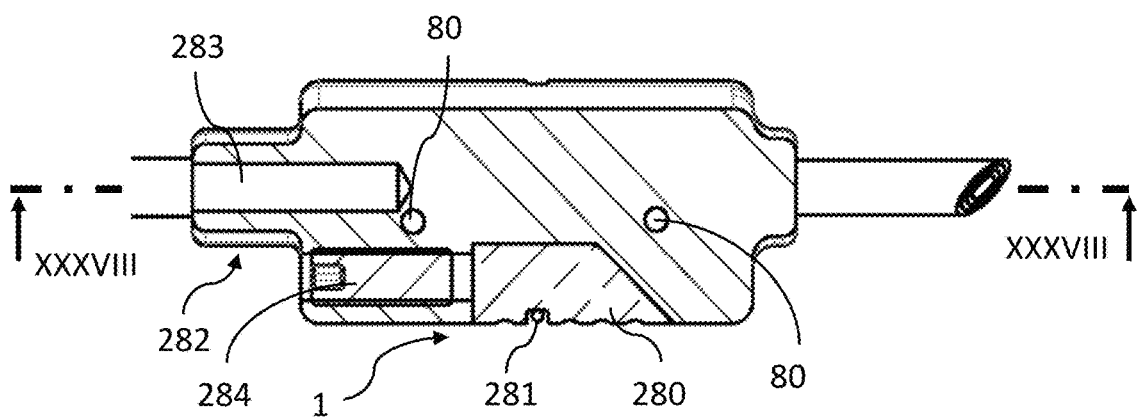
FIG. 40 is a cross-sectional view of the hydraulic line coupling of FIG. 38 along lines XL-XL of FIG. 39.
Figure 41:
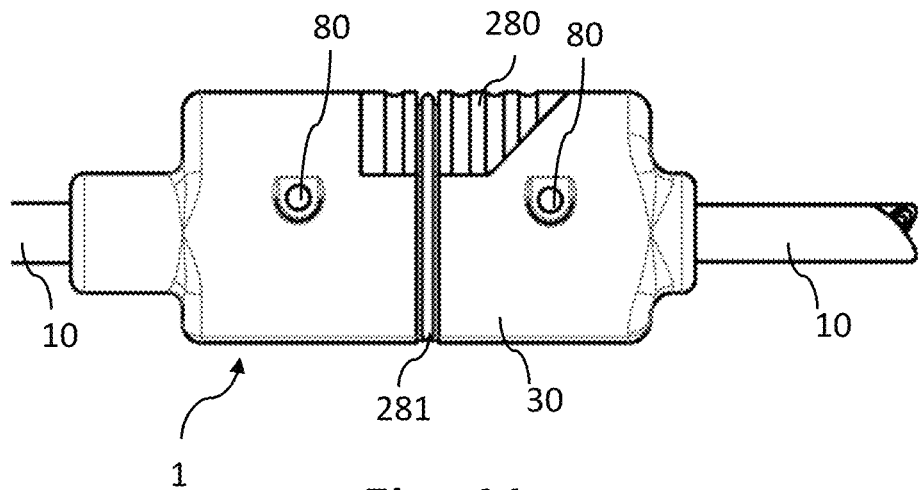
FIG. 41 is a side elevational view of a hydraulic line coupling according to an exemplary embodiment.
Figure 42:
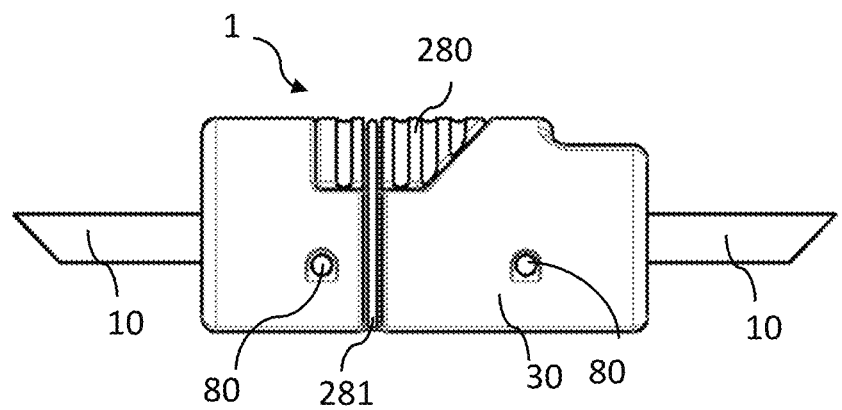
FIG. 42 is a side elevational view of a hydraulic line coupling according to an exemplary embodiment.
Figure 43:
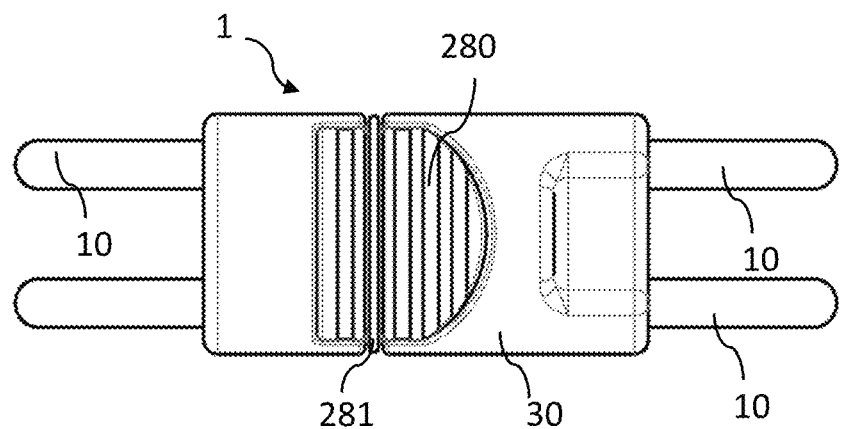
FIG. 43 is a top plan view of the hydraulic line coupling of FIG. 42.
Figure 44:
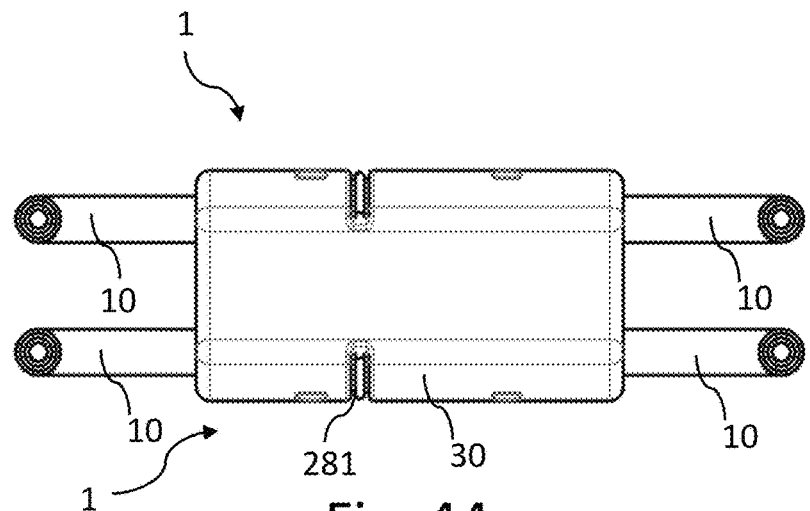
FIG. 44 is an elevational view of the hydraulic line coupling of FIG. 42 from below.
Figure 45:
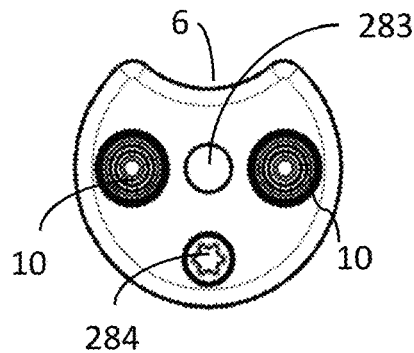
FIG. 45 is an elevational view of the hydraulic line coupling of FIG. 42 from the left side in FIG. 42.

In FIG. 38, the right-hand line connection pieces 20 substantially correspond to the line connection pieces 20 of FIG. 1 while the left-hand line connection pieces 50 substantially correspond to the line connection pieces 50 of FIG. 1. The valve chamber housing 340 substantially corresponds to the valve chamber housing of FIG. 18, wherein it can be sealed against the housing 30 by a further seal 341 corresponding to the seal 342.

FIGS. 42 to 45 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 42 to 45 corresponds to the embodiment of FIGS. 38 to 41 except for a shorter housing 30, which can accommodate other or shorter locking devices 170 instead of the longer locking devices 70.

FIGS. 46 to 50 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 46 to 50 substantially corresponds to the embodiments of FIGS. 38 to 41 and 42 to 45, but has different locking devices 370. The locking devices 370 comprise locking members 372, which can, for example, be in the form of balls disposed in a twist cap 371 such that the balls move between radially inner and radially outer positions when the twist cap 371 is rotated. This means that, when the twist cap 371 is rotated, the balls can be brought into a position in which they clamp the line connection pieces 20 by inserting them into corresponding supports. For the purpose of release, the twist caps 371 can be turned in the other direction so that the balls are positioned radially further out so that the corresponding line connection piece 20 can be removed from the housing 30.

Figures 98, 99:
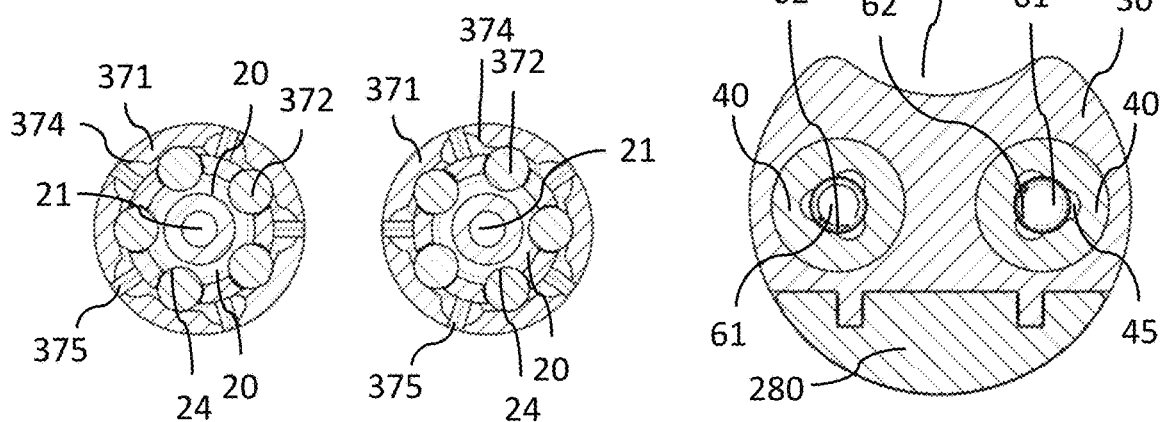
FIG. 98 is a cross-sectional view of the hydraulic line coupling of FIG. 96 along lines XCVIII-XCVIII of FIG. 97.
FIG. 99 is a cross-sectional view of the hydraulic line coupling of FIG. 96 along lines XCIX-XCIX of FIG. 97.
Figure 100:
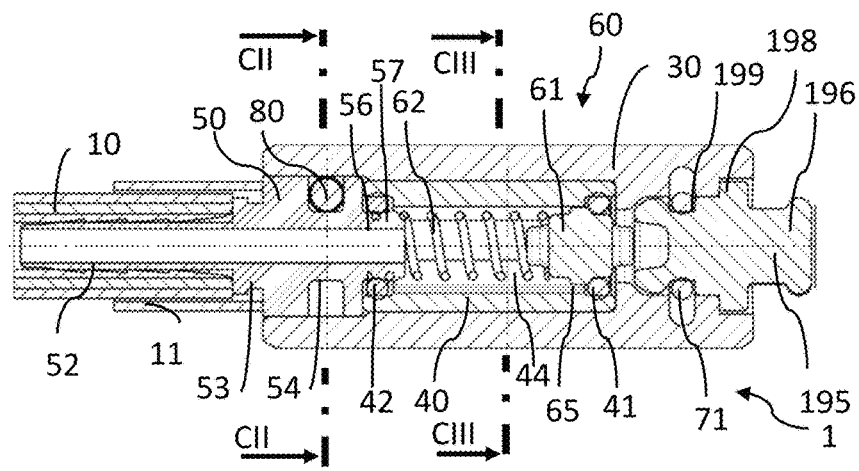
FIG. 100 is a cross-sectional view of a hydraulic line coupling according to an exemplary embodiment, said cross-sectional view corresponding to FIG. 97.
Figure 101:
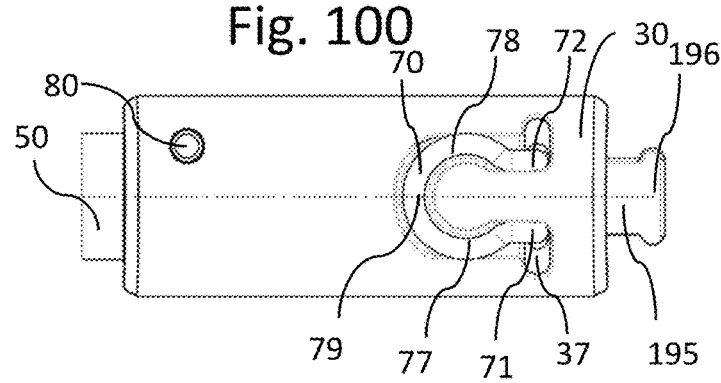
FIG. 101 is a side elevational view of the hydraulic line coupling of FIG. 100.
Figure 102:
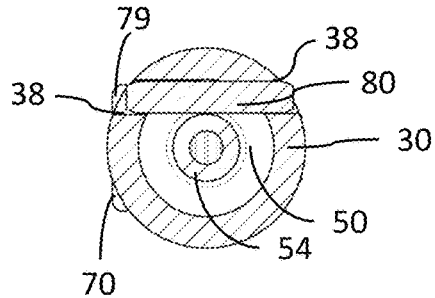
FIG. 102 is a cross-sectional view of the hydraulic line coupling of FIG. 100 along lines CII-CII of FIG. 100.
Figure 103:
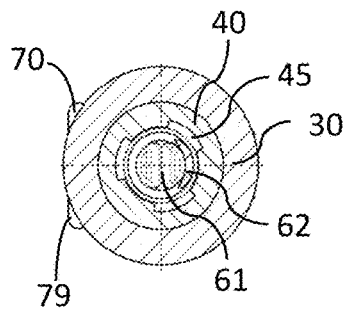
FIG. 103 is a cross-sectional view of the hydraulic line coupling of FIG. 100 along lines CIII-CIII of FIG. 100.
Figure 104:
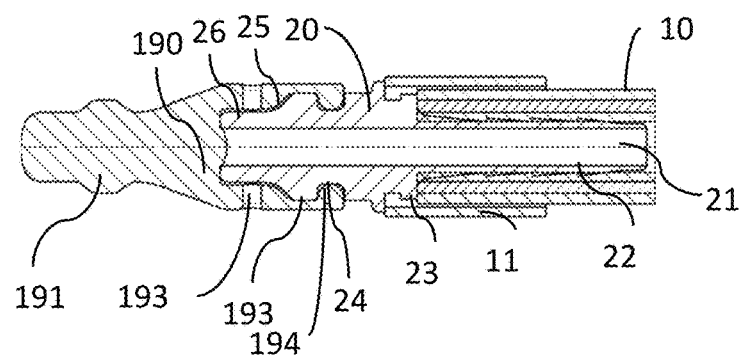
FIG. 104 is a cross-sectional view of the hydraulic line coupling of FIG. 100 along lines CII-CII of FIG. 100.
Figures 110, 111:
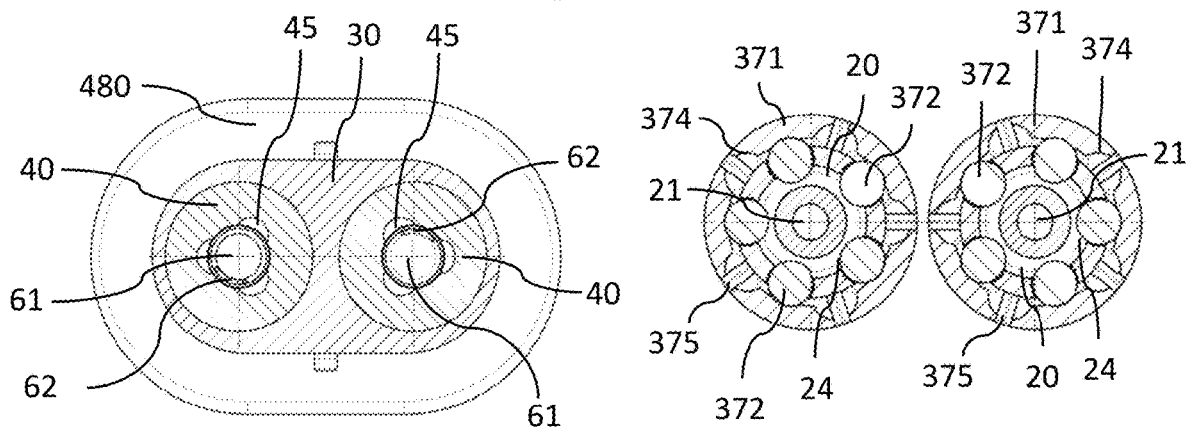
FIG. 110 is a cross-sectional view of the hydraulic line coupling of FIG. 108 along lines CX-CX of FIG. 108.
FIG. 111 is a cross-sectional view of the hydraulic line coupling of FIG. 108 along lines CXI-CXI of FIG. 108.

The locking devices 370 can, for example, be configured according to the locking devices 370 shown in FIG. 98 or in FIG. 111.

Figure 51:
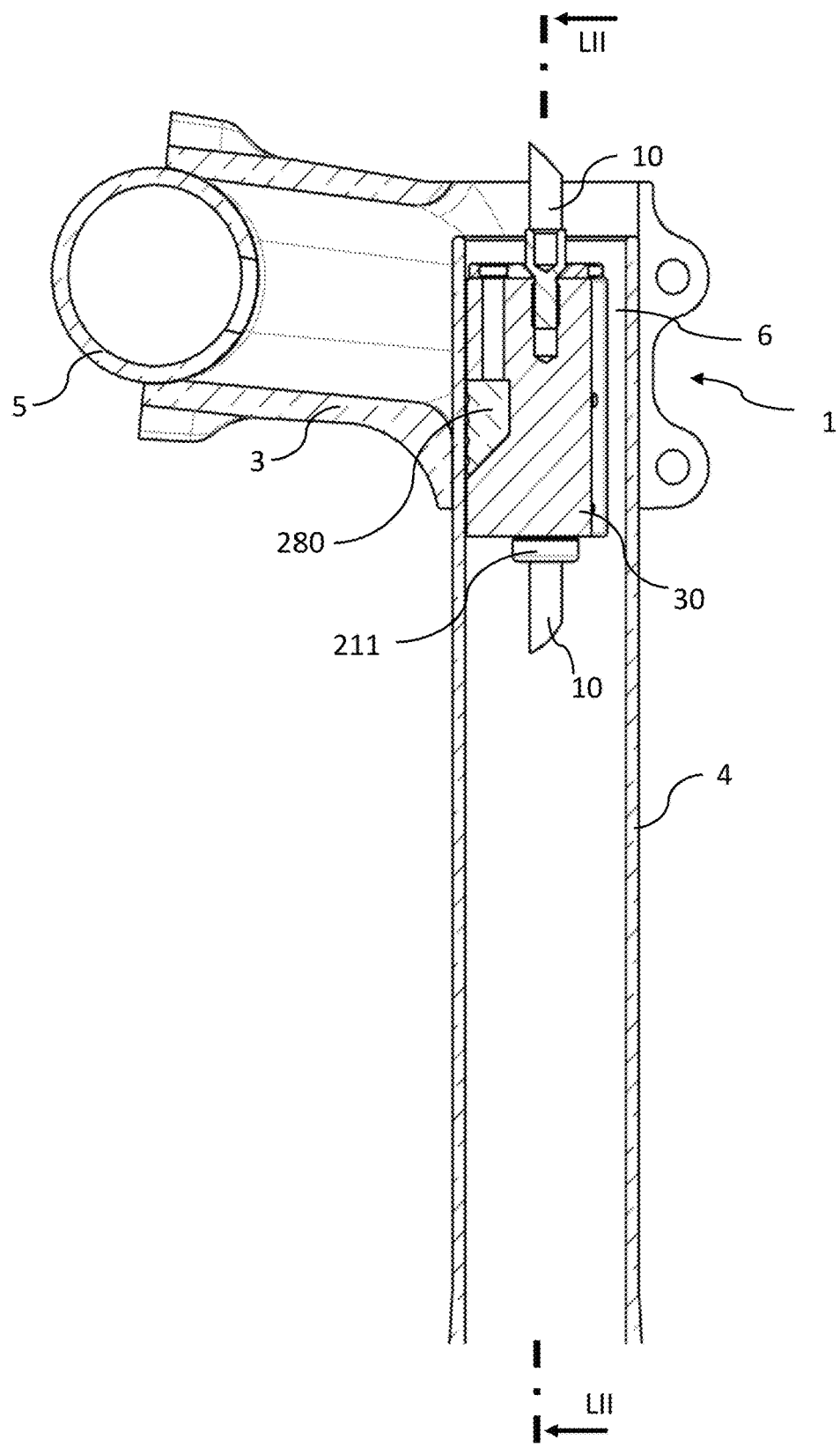
FIG. 51 is a cross-sectional view through a handlebar stem with a hydraulic line coupling according to an exemplary embodiment along lines LI-LI of FIG. 52.
Figure 52:
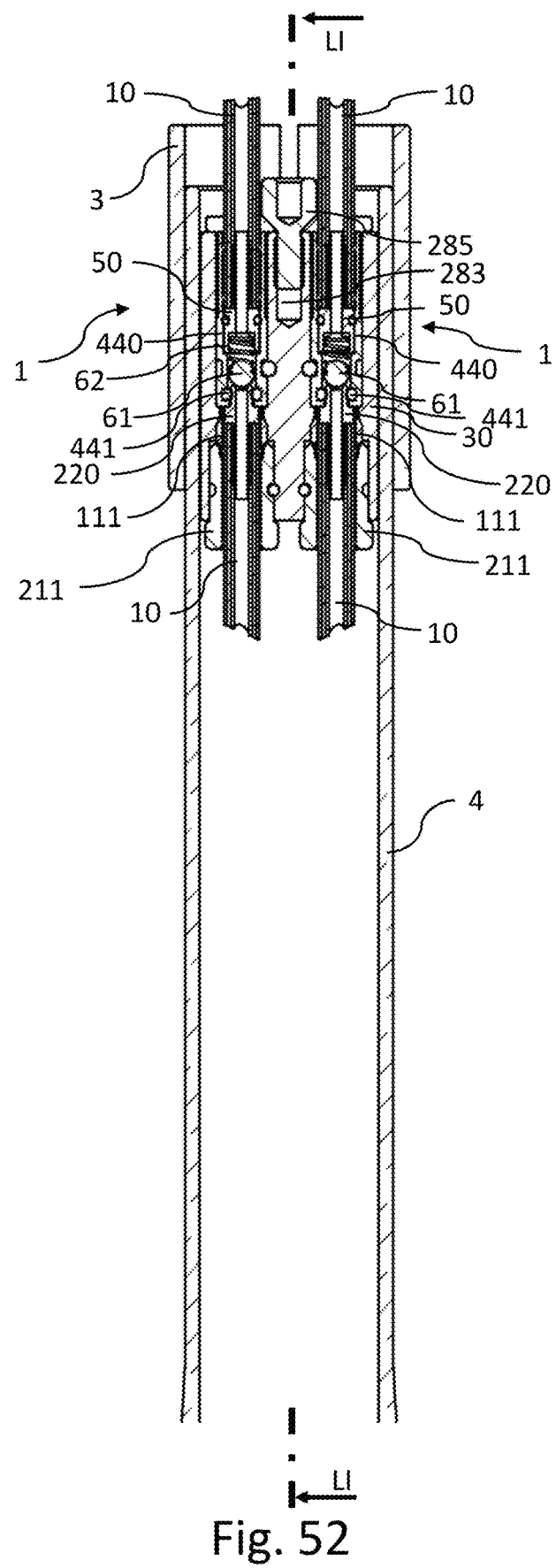
FIG. 52 is a cross-sectional view of the handlebar stem with the hydraulic line coupling of FIG. 51 along lines LII-LII of FIG. 51.
Figure 53:
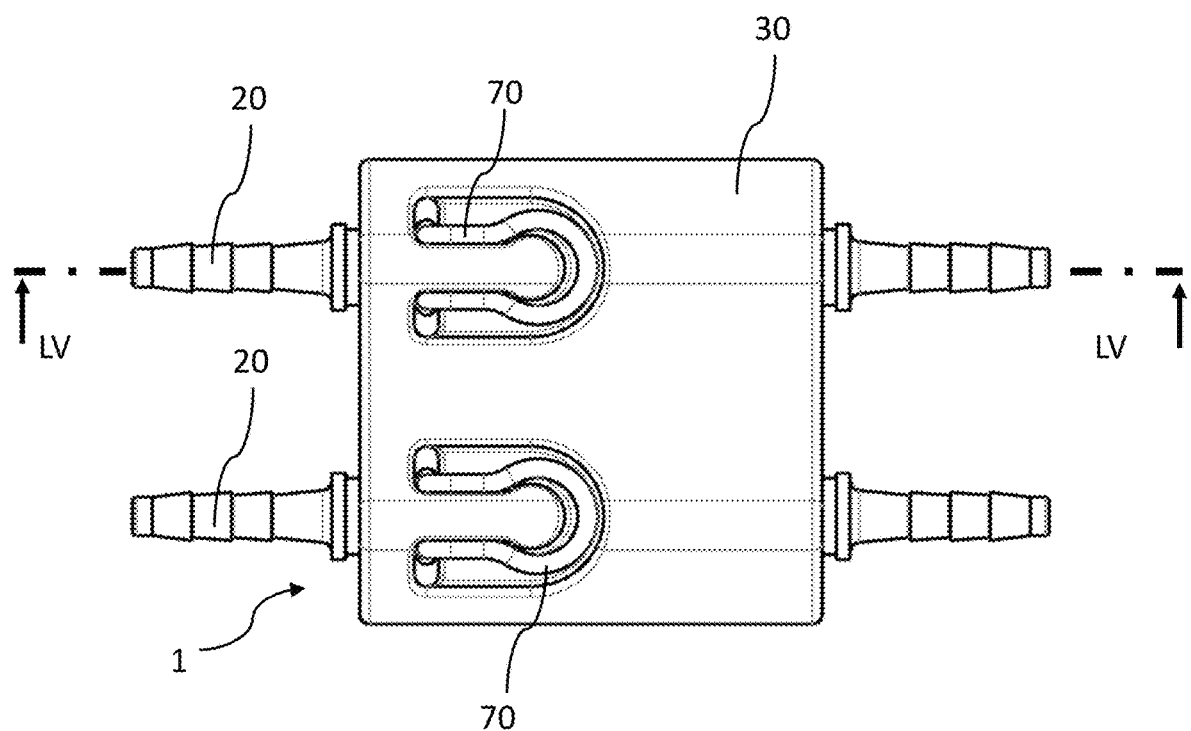
FIG. 53 is a cross-sectional view of a hydraulic line coupling according to an exemplary embodiment.
Figure 54:
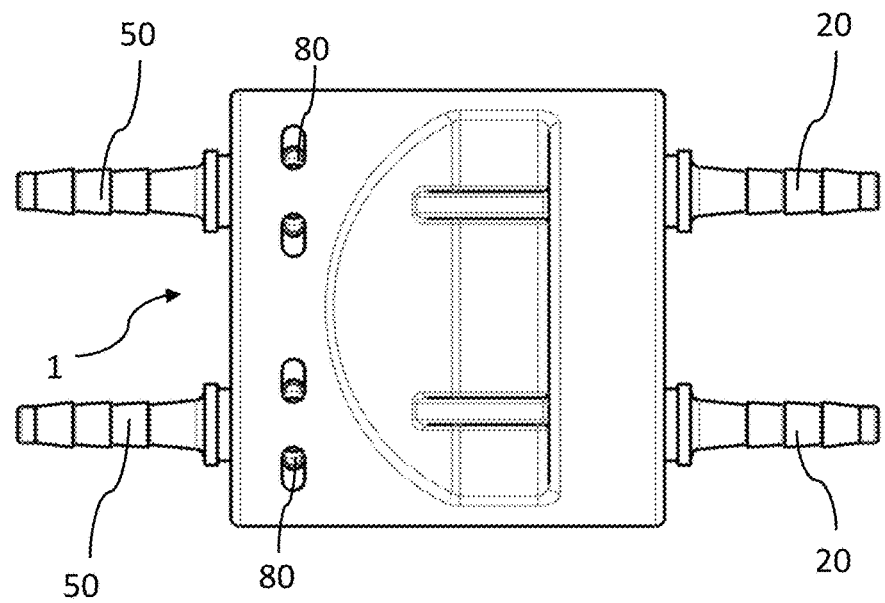
FIG. 54 is an elevational view of the hydraulic line coupling of FIG. 53 from the lower side in FIG. 53.
Figure 55:
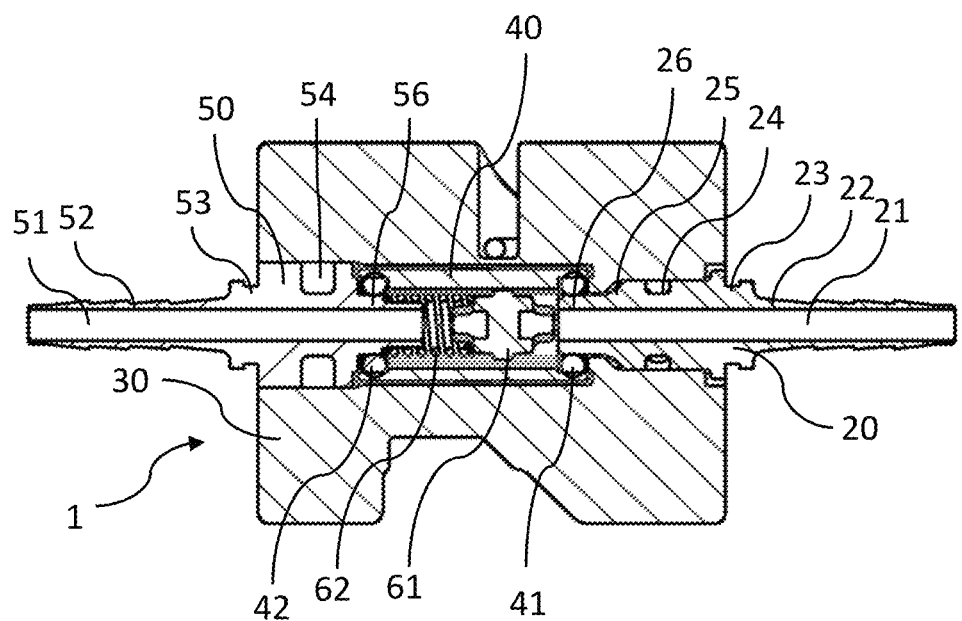
FIG. 55 is a cross-sectional view of the handlebar stem with the hydraulic line coupling of FIG. 53 along lines LV-LV of FIG. 53.
Figure 56:
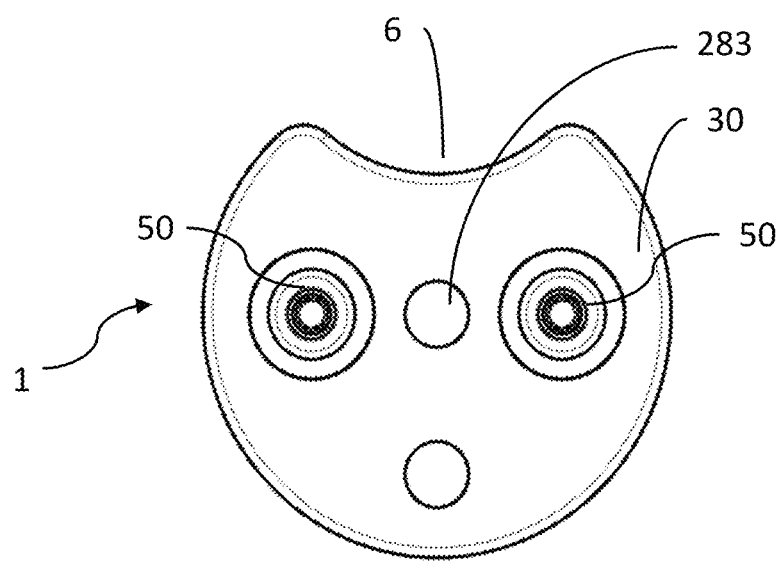
FIG. 56 is an elevational view of the hydraulic line coupling of FIG. 53 from the left side in FIG. 55.
Figure 57:
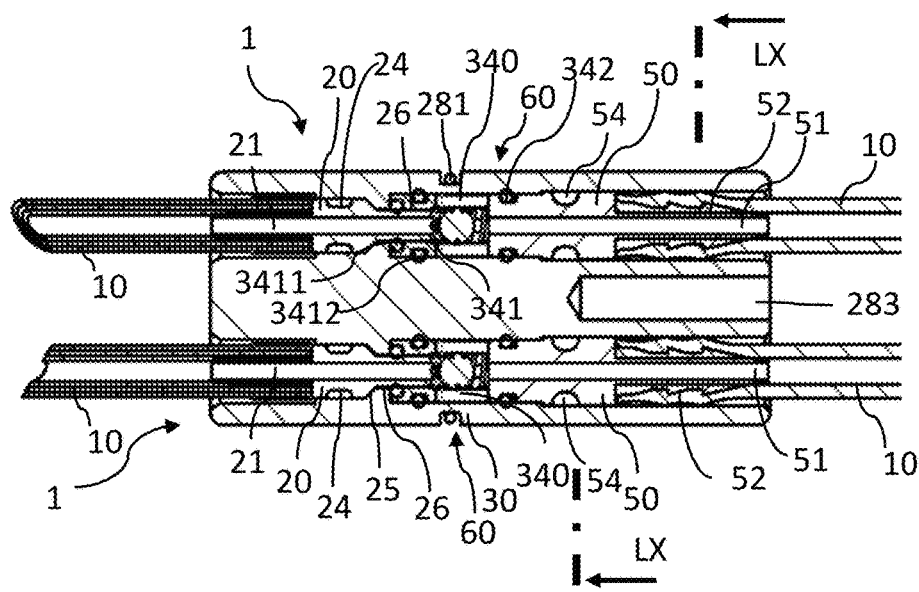
FIG. 57 is a cross-sectional view of a hydraulic line coupling according to an exemplary embodiment along lines LVII-LVII of FIG. 58.
Figure 58:
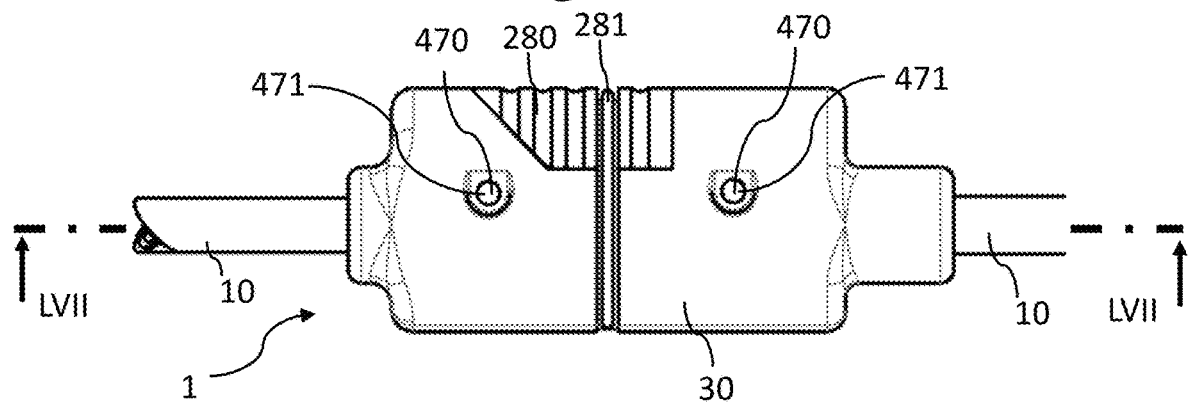
FIG. 58 is a side elevational view of the hydraulic line coupling of FIG. 57.
Figure 59:
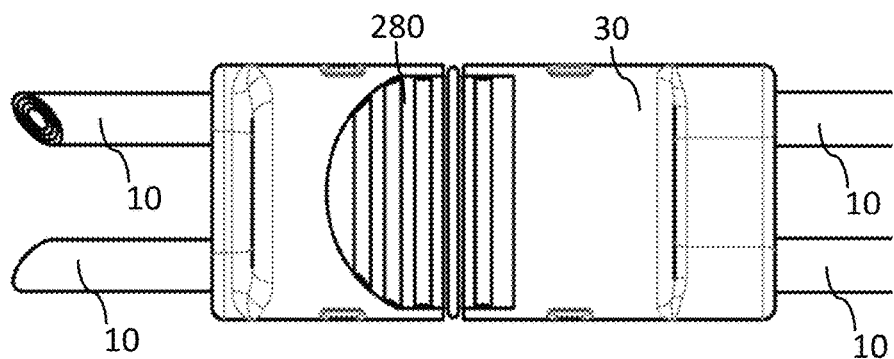
FIG. 59 is an elevational view of the hydraulic line coupling of FIG. 57 from the top side in FIG. 58.
Figure 60:
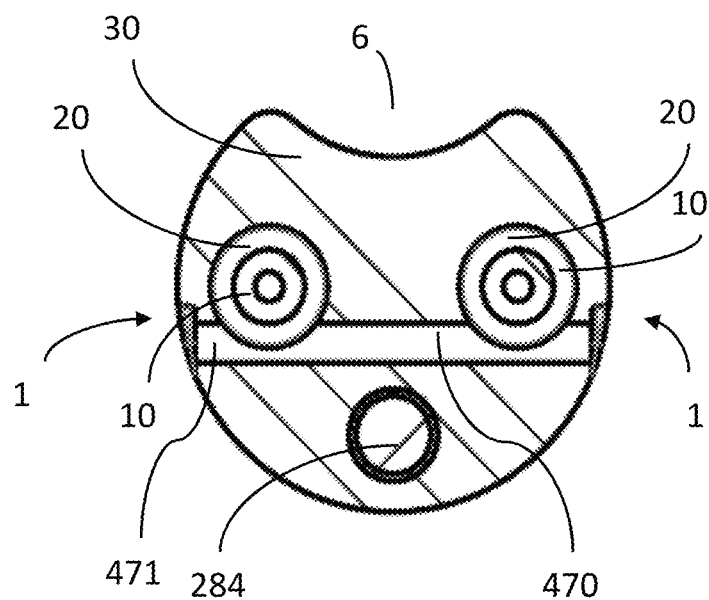
FIG. 60 is a cross-sectional view of the hydraulic line coupling of FIG. 57 along lines LX-LX of FIG. 57.
Figure 61:
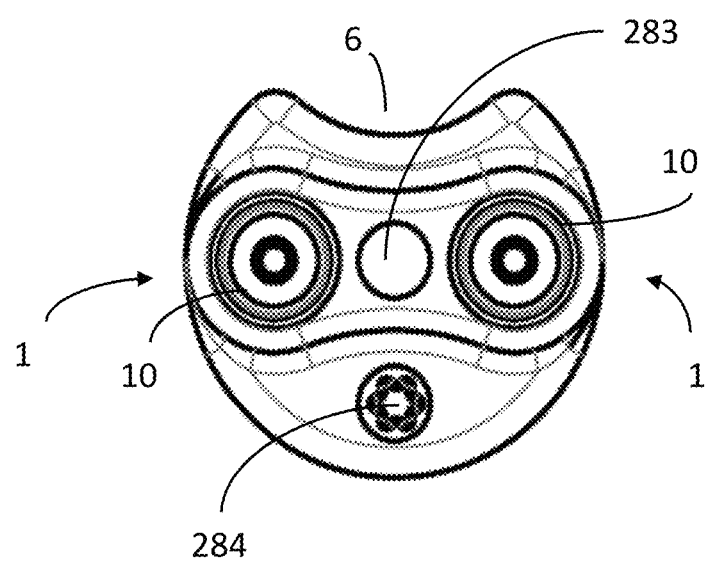
FIG. 61 is an elevational view of the hydraulic line coupling of FIG. 57 from the right side in FIG. 58.

FIGS. 51 to 52 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The line connection piece 220 of the embodiment of FIGS. 51 to 52 corresponds substantially to the line connection piece 220 of the embodiment of FIGS. 36 to 37. The housing 30 with two hydraulic line couplings 1 is disposed in the handlebar shaft tube 4. With the clamping screw 285 shown in FIG. 52 the clamping device 280 can be actuated to clamp the housing 30 against the inner wall of the handlebar shaft tube 4. On the housing 30, a passage 6 is provided, as in the above embodiments, through which, for example, cables for signal transmission or for lamps can be passed.

The two pressure chamber housings 440 of the two hydraulic line couplings 1 can, for example, be configured according to the embodiment of FIG. 29.

FIGS. 53 to 56 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 53 to 56 has a shared housing 30, in which two hydraulic line couplings 1 are provided. Each of them has a line connection piece 20, which is secured in the housing with a locking device 70 as shown in FIGS. 4 to 8, and a line connection piece 50, which is secured in the housing with locking devices 80. The housing can be wedged in a handlebar shaft tube 4 and has a passage 6 for the laying of electrical cables. A pressure chamber 44 is provided between the line connection pieces 20 and 50 and is enclosed by a pressure chamber housing 40.

The two pressure chamber housings 40 of the two hydraulic line couplings 1 can be, for example, configured according to the embodiment of FIG. 1.

FIGS. 57 to 61 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 57 to 61 substantially corresponds to the embodiments of FIGS. 38 to 41 and 42 to 45, but has different locking devices 470. The locking device 470 comprises a pin 471 that simultaneously secures the two line connection pieces 20 of the two hydraulic line couplings 1, which are disposed in a shared housing 30. The pin 471 is disposed in corresponding supports 24 on the line connection pieces 20 and is also disposed in a passage 37 in the housing 30.

The two line connection pieces 50 of the two hydraulic line couplings 1 are also secured with a corresponding shared locking device 470, which includes a pin 471. The pin 471 is disposed in corresponding supports 54 on the line connection pieces 50 and is also disposed in a passage 37 in the housing 30.

The two pressure chamber housings 340 of the two hydraulic line couplings 1 can, for example, be configured according to the embodiment of FIG. 18.

FIGS. 62 to 65 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 62 to 65 does not have a clamping device 280. The two line connection pieces 50 of the two hydraulic line couplings 1, which are provided in a shared housing 30, are secured in the housing 30 with a shared locking device 470, which comprises a pin 471. The two line connection pieces 20 can be secured by a locking device that can be disposed in a support 472 provided in the housing 30.

Figure 62:
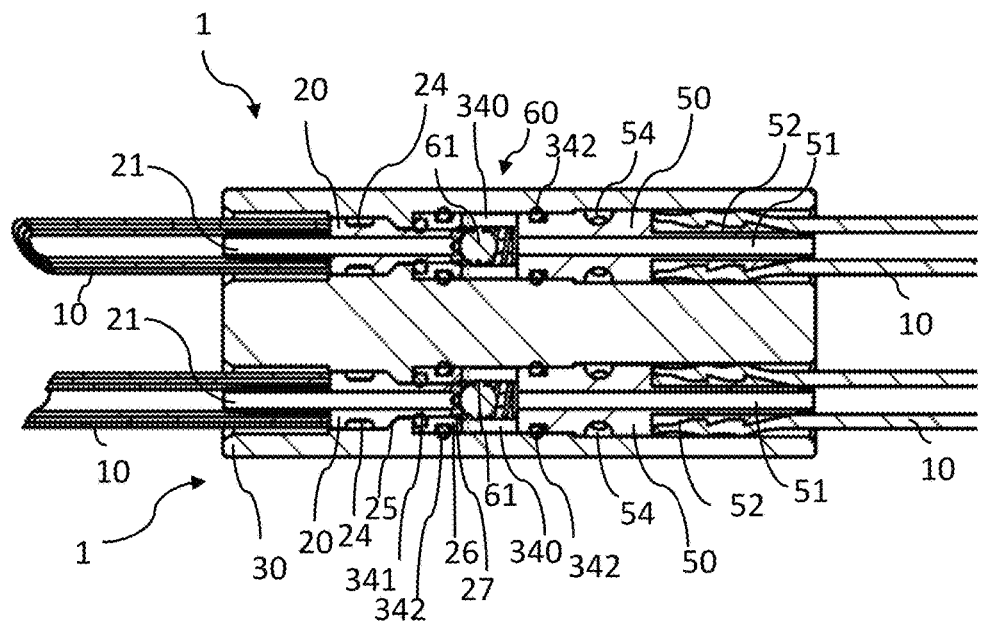
FIG. 62 is a cross-sectional view of a hydraulic line coupling according to an exemplary embodiment along lines LXII-LXII of FIG. 63.
Figure 63:
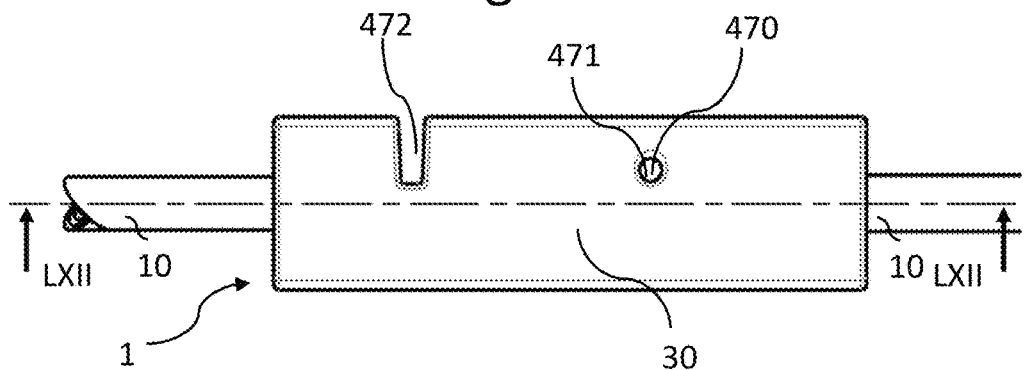
FIG. 63 is a side elevational view of the hydraulic line coupling of FIG. 62.
Figure 64:
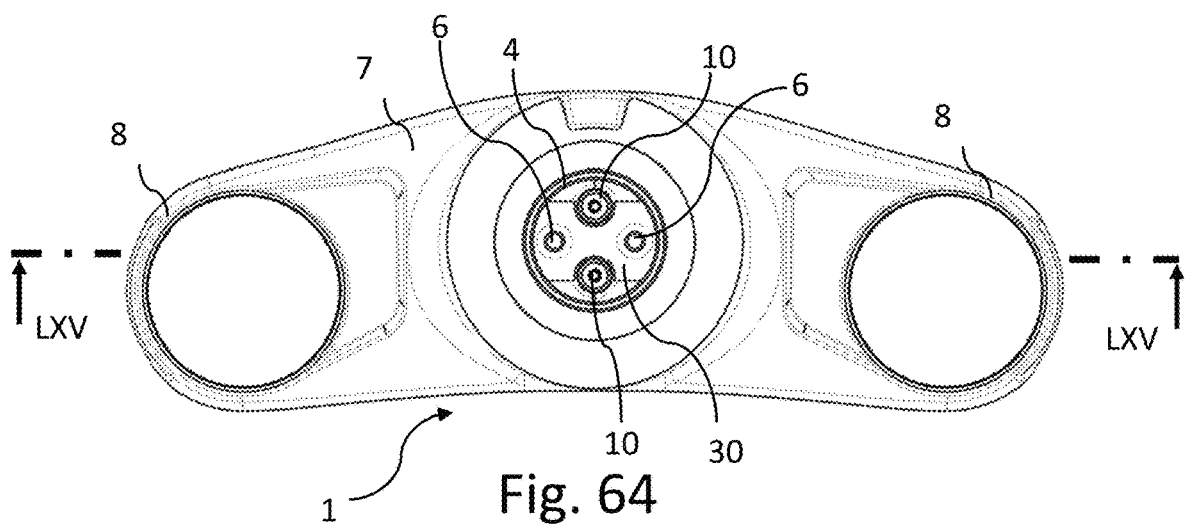
FIG. 64 is a top plan view of a fork crown with a hydraulic line coupling of FIG. 62.
Figure 65:
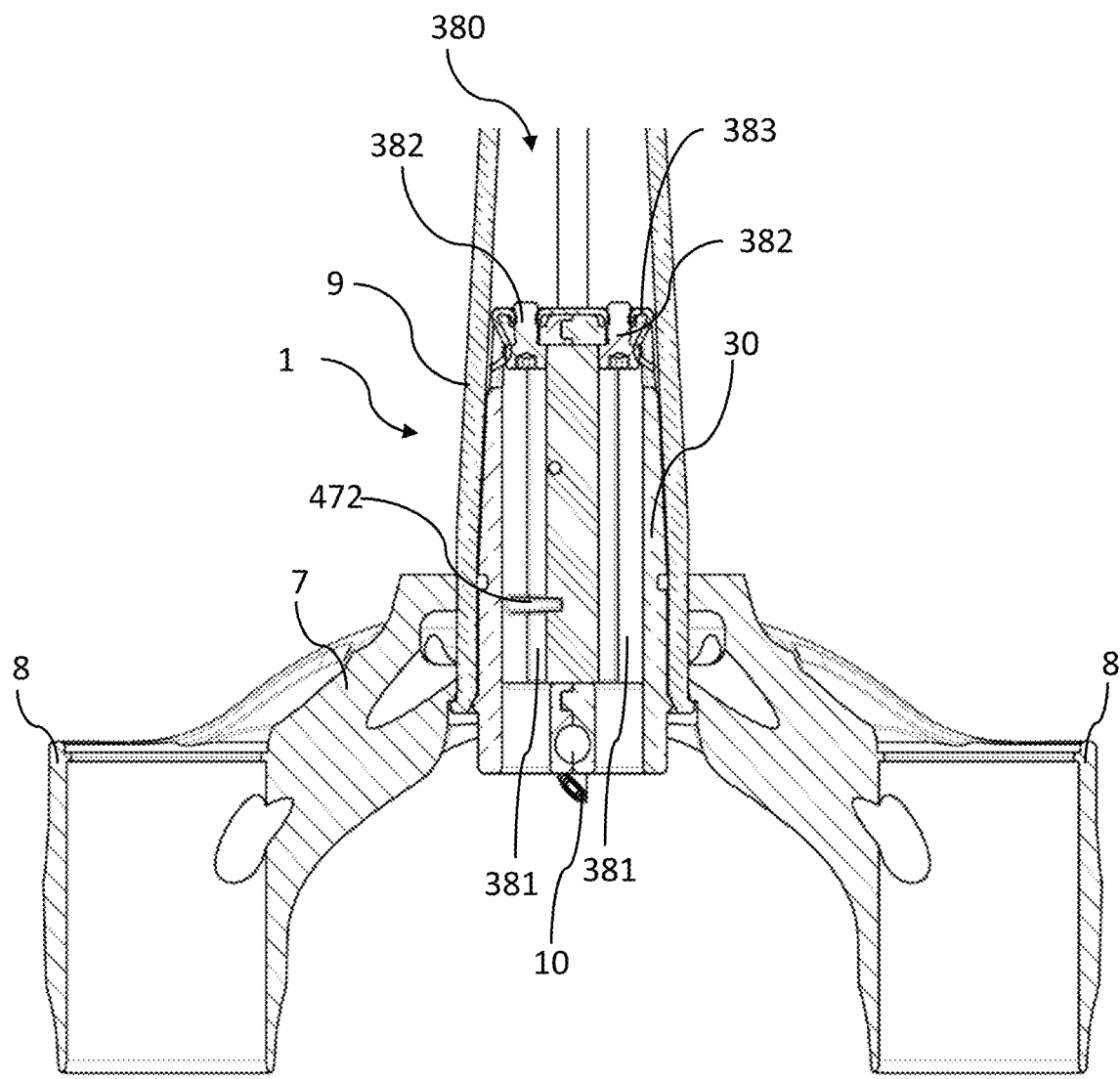
FIG. 65 is a cross-sectional view of the fork crown with the hydraulic line coupling of FIG. 62 along lines LXV-LXV of FIG. 64.

FIG. 65 shows how the hydraulic line coupling of FIG. 62 can be disposed in a fork crown 7, which connects two fork legs 8, or in the shaft 9, which extends from the fork crown 7 towards the handlebar and can be connected to the handlebar shaft tube 6. A clamping device 380 is provided that comprises two clamping bolts 382 that can clamp a spring device 383 against the inner wall of the shaft 9. In order to actuate the clamping screws 382, the housing is provided with passages 381, in which a suitable tool can engage.

The two pressure chamber housings 340 of the two hydraulic line couplings 1 can, for example, be configured according to the embodiment of FIG. 18.

FIGS. 66 to 68 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 66 to 68 corresponds substantially to the embodiment of FIGS. 46 to 50, which is disposed in a handlebar tube 5. The housing 30 is attached to the handlebar tube 5. Two hydraulic line couplings 1 are provided in the housing 30. Each of these hydraulic line couplings has an angular line connector 150 with an angular portion 151 that changes the direction of the hydraulic line by about 90 degrees so that the hydraulic line can run in the handlebar tube 5. The end of the angular line connector 150 is provided with a line connection piece support 152 to which a line connection piece for connection to a hydraulic line 10 can be attached.

Figure 46:
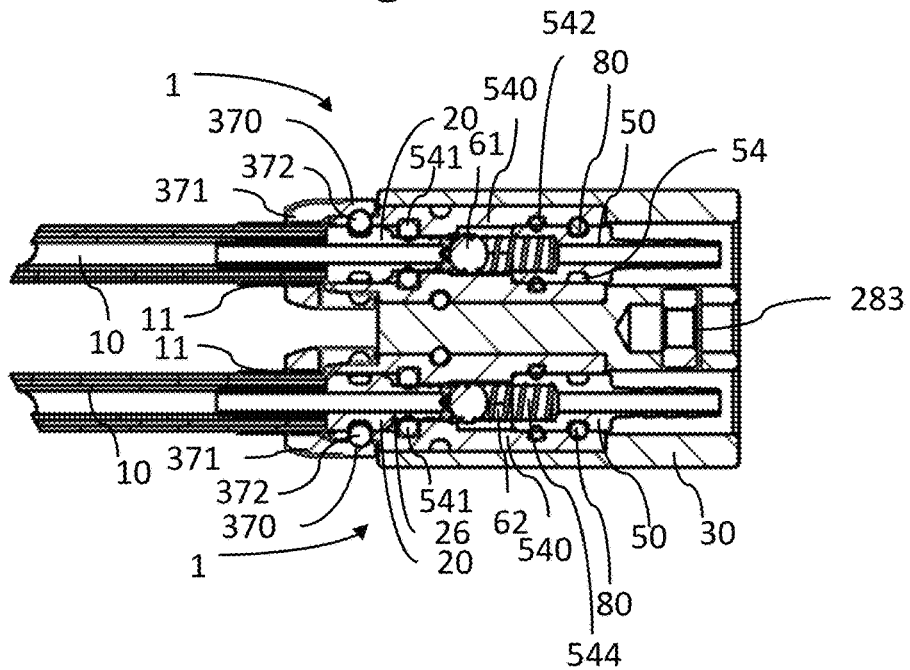
FIG. 46 is a cross-sectional view of a hydraulic line coupling according to an exemplary embodiment along lines XLVI-XLVI of FIG. 47.
Figure 47:
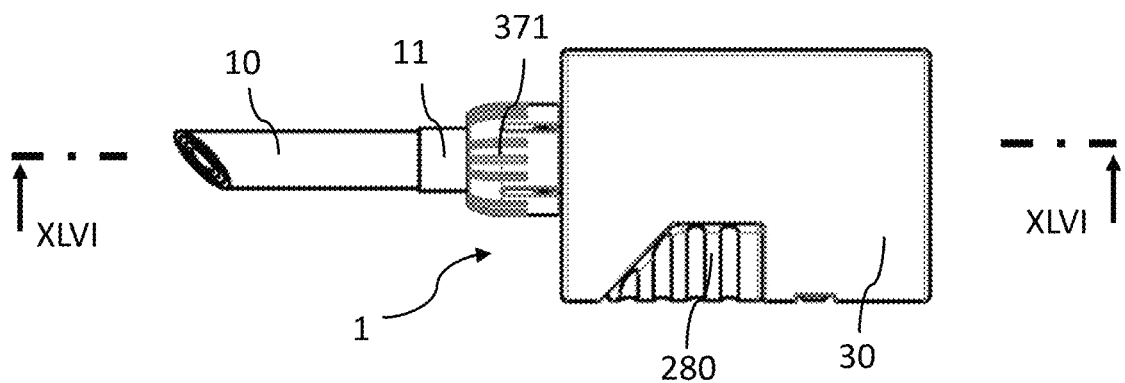
FIG. 47 is a side elevational view of the hydraulic line coupling of FIG. 46.
Figure 48:
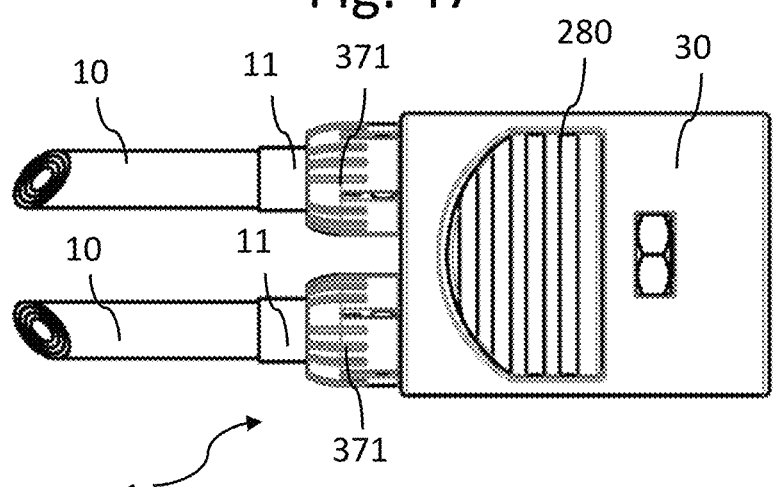
FIG. 48 is a top plan view of the hydraulic line coupling of FIG. 46.
Figures 49, 50:
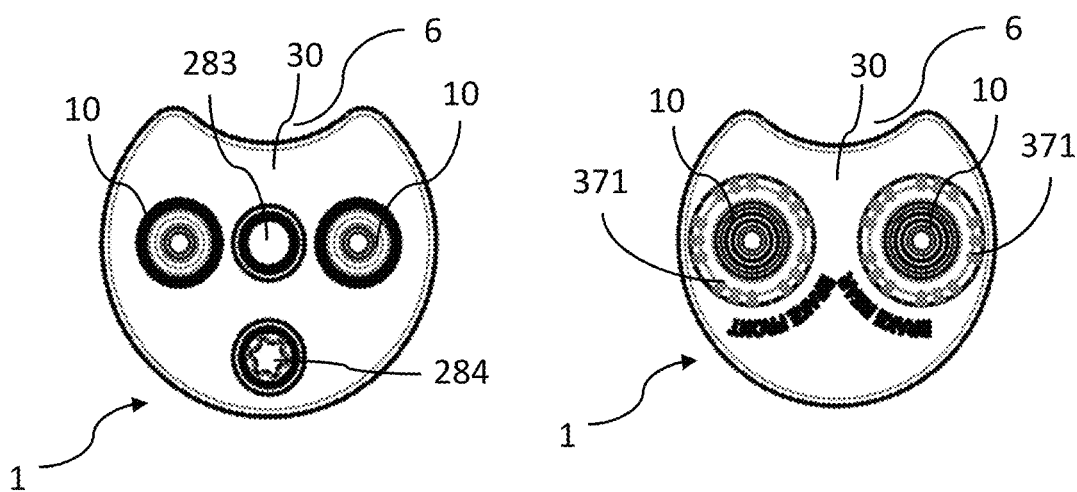
FIG. 49 is an elevational view of the hydraulic line coupling of FIG. 46 from the right side in FIG. 46.
FIG. 50 is an elevational view of the hydraulic line coupling of FIG. 46 from the left side in FIG. 46.

The two pressure chamber housings 640 of the two hydraulic line couplings 1 can, for example, be configured according to the pressure chamber housings 540 of FIG. 46.

The housing 30 has a flange 480 with which it can be flanged to the handlebar tube 5 in the manner known to a person skilled in the art.

The locking devices 370 can, for example, be configured according to the locking devices 370 shown in FIG. 98 or in FIG. 111.

FIGS. 69 to 72 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 69 to 72 corresponds substantially to the embodiment of FIGS. 1 to 8, wherein two hydraulic line couplings 1 are provided in a shared housing 30, which is disposed on a handlebar tube 5. The hydraulic lines 10 are here inserted into the handlebar tube 5 and can be led out of the handlebar tube 5 on the other side or laid in the handlebar tube 5 by bending the hydraulic line. The housing 30 has a flange 480, with which it can be supported on the handlebar tube 5. The two line connection pieces 20 are secured to the housing 30 with a shared locking device 470, which includes a pin 471 which is guided through passages 37 in the housing 30. The two line connection pieces 50 are disposed in the respective pressure chamber housings 40 with an interference fit. As in the embodiment of FIG. 1, they can, alternatively, also be secured in the housing with a locking device 80 each and/or with a shared locking device.

The two pressure chamber housings 440 of the two hydraulic line couplings 1 can, for example, be configured according to the pressure chamber housings 440 of FIG. 23.

FIGS. 73 to 76 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 73 to 76 substantially corresponds to the embodiment of FIGS. 69 to 72. In contrast thereto, the housing 30 is substantially disposed outside the handlebar tube 5. In addition, a clamping screw 485 is provided, with which the housing 30 can be attached to the handlebar tube. In this embodiment, the lower lines 10 are attached to the line connection pieces 20 by press sleeves. Alternatively, the hydraulic lines can also be attached with a sleeve that engages with a fastening portion 23 of the line connection pieces 20, as in the embodiment shown in FIGS. 69 to 72. In this embodiment, the line connection pieces 20 are individually secured in the housing 30 with locking devices 80 as shown in the embodiment of FIG. 1. The other described variants with the locking devices 70, 170, etc., are also conceivable for securing the line connection pieces 20 in the housing 30.

The two pressure chamber housings 440 of the two hydraulic line couplings 1 can, for example, be configured according to the pressure chamber housings 440 of FIG. 23 or the pressure chamber housings 640 of FIG. 66.

Figure 77:
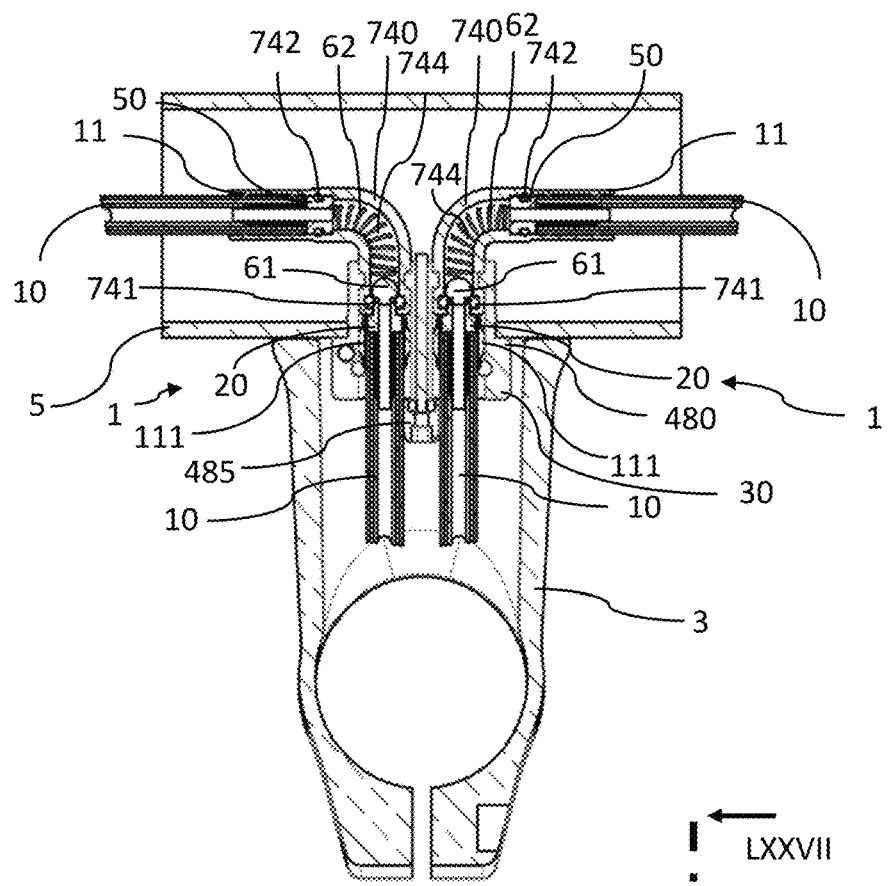
FIG. 77 is a cross-sectional view of a handlebar stem portion with a hydraulic line coupling according to an exemplary embodiment along lines LXXVII-LXXVII of FIG. 78.
Figure 78:
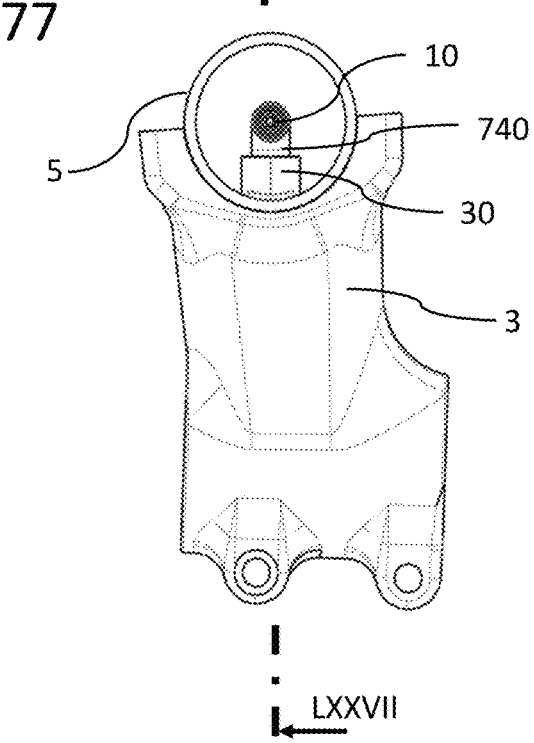
FIG. 78 is an elevational view of the handlebar stem portion with the hydraulic line coupling of FIG. 77 from the left side in FIG. 77.

FIGS. 77 to 78 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

In the embodiment of FIGS. 77 to 78, the two pressure chamber housings 740 are substantially configured in the same way as the pressure chamber housing 440 of FIG. 23, but, in contrast thereto, they are bent by 90 degrees. In the bent portion, a respective valve closing spring 62 of valve device 60 is disposed. This embodiment has the advantage that it is extremely short.

The housing 30 has a flange 480 and is attached to the handlebar tube 5 with a clamping screw 485 such that the hydraulic lines 10 are led into the handlebar stem 3.

The hydraulic lines 10, which enter into in the handlebar stem 3, are attached with press sleeves 111. Alternatively, line connection pieces 20 can be provided or configured for these hydraulic lines 10 according to the other embodiments.

FIGS. 79 to 81 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 79 to 81 substantially corresponds to the embodiment of FIGS. 66 to 68. In contrast thereto, the housing 30 is smaller so that the pressure chamber housings 40 extend to the outside of the housing 30, i.e., both outside and inside of the handlebar tube 5. The line connection pieces 20 are each secured outside the handlebar tube 5 with locking devices 170 in the pressure chamber housing 40. It would also be conceivable to use the locking devices 70 as shown in FIGS. 4 to 8, in which case, preferably, recesses should be provided on the pressure chamber housing 40 to accommodate the extensions 77, 78 and the connecting portion 79.

Figure 82:
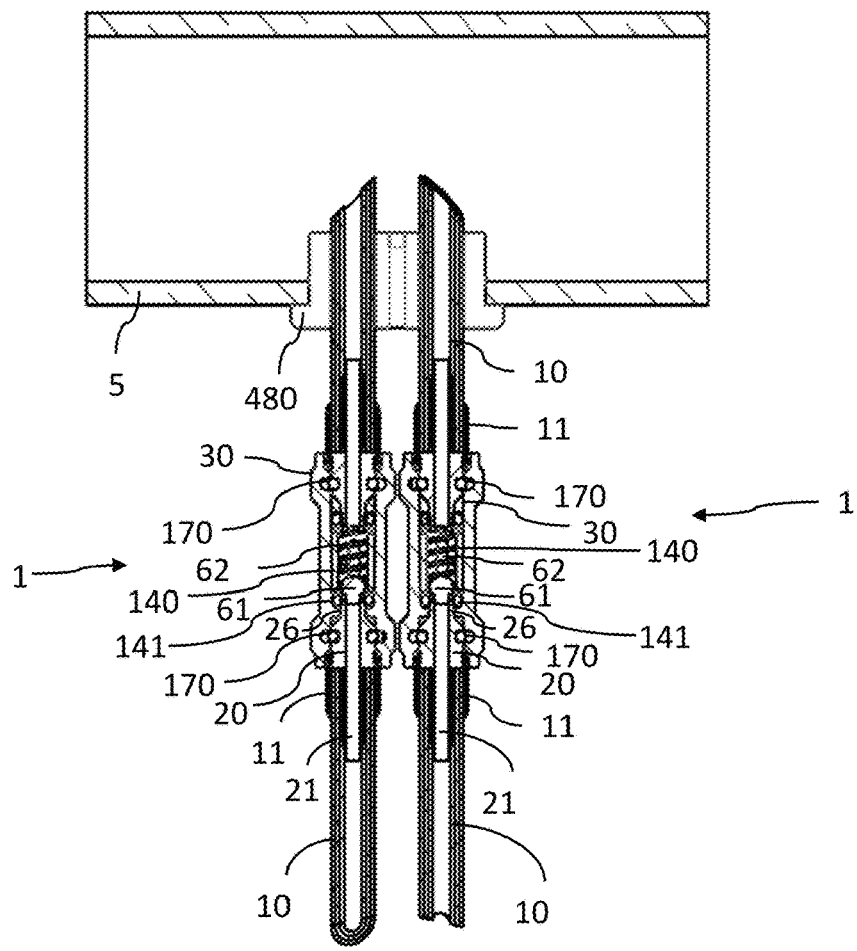
FIG. 82 is a cross-sectional view of a handlebar portion with a hydraulic line coupling according to an exemplary embodiment along lines LXXXII-LXXXII of FIG. 84.
Figures 83, 84:
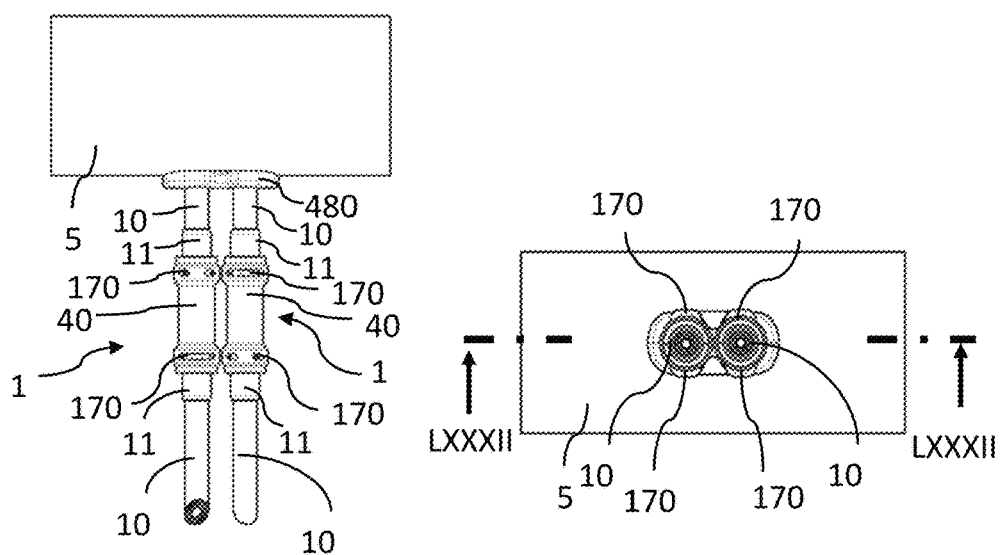
FIG. 83 is a side elevational view of the handlebar portion with the hydraulic line coupling of FIG. 82.
FIG. 84 is an elevational view of the handlebar portion with the hydraulic line coupling of FIG. 82 from the lower side in FIG. 82.
Figure 88:
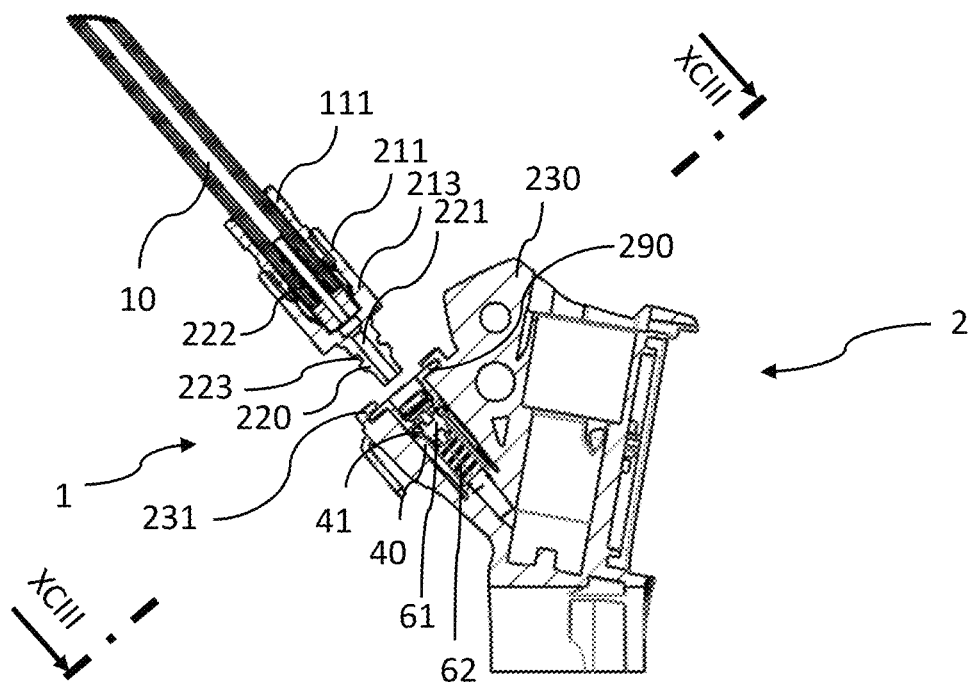
FIG. 88 is a cross-sectional view of a hydraulic master apparatus with a hydraulic line coupling according to an exemplary embodiment along lines LXXXVIII-LXXXVIII of FIG. 89, wherein the hydraulic line is separated from the hydraulic master apparatus.
Figure 89:
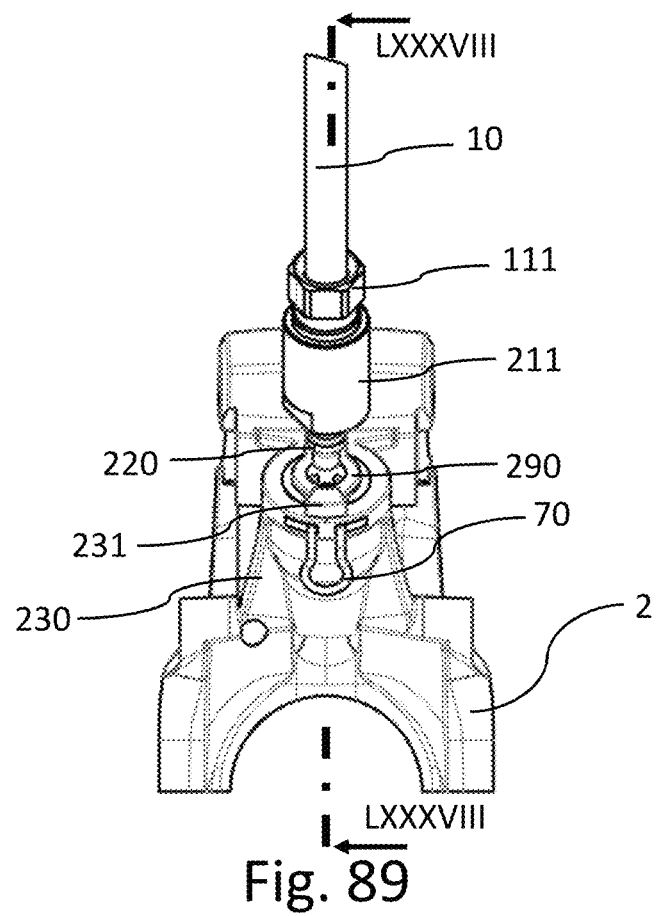
FIG. 89 is a perspective view of the hydraulic master apparatus of FIG. 88 diagonally from below.

FIGS. 82 to 84 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 82 to 84 comprises two hydraulic line couplings 1, which are configured according to the embodiment of FIG. 25. The lines 10 are inserted into a handlebar tube 5 through a shared flange 485. The two hydraulic line couplings 1 of the two valve chamber housings 140 can, for example, be configured as shown in FIGS. 127 to 130.

FIGS. 85 to 87 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 85 to 87 comprises two hydraulic line couplings 1, which are configured according to the embodiment of FIG. 1, but are disposed in a shared housing 30. The housing 30 comprises a flange 480 by which it is supported on the handlebar tube. The hydraulic lines 10 are not shown in FIGS. 85 to 87 and can be attached to the line connection pieces 20 or 50 according to the embodiment in FIG. 1.

FIGS. 88 to 95 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 88 to 95 substantially corresponds to the embodiment of FIGS. 36 to 37.

FIGS. 90 to 92 show a possible configuration of the closure device 290. The closure device 290 comprises a cylindrical area about which the closure device is rotatably mounted in the master apparatus 2. Two passages 293 are provided in the cylindrical area, wherein the locking device 70, when inserted into the locked closure device 290, is inserted with a respective leg 71, 72 in a respective passage such that the web lying in between is disposed between the two legs 71, 72 of the locking device 70. A stop 294, which faces the valve device 60, is provided, with which the valve device 60 or the pressure chamber housing 40 can be secured in the master device 2. Opposite the stop 294, the closure device 290 has a flange 292, which has two opposite extensions 291. By turning the extension or the two extensions 291 under the corresponding clamping device 231, the valve device 60 and, if necessary, the pressure chamber housing 40 is secured in the master apparatus 2.

The line connection piece 320 can be configured as shown in FIGS. 120 to 122, wherein the line connection piece 320 can have recesses 328 at its tip between webs 327 to ensure a safe hydraulic connection between the two line connection pieces of the hydraulic line coupling.

FIGS. 96 to 99 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 96 to 99 substantially corresponds to the embodiment of FIGS. 47 to 50.

FIGS. 100 to 104 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 100 to 104 substantially corresponds to the embodiment of FIGS. 1 to 8, with only one locking device 80 being provided.

Figure 105:
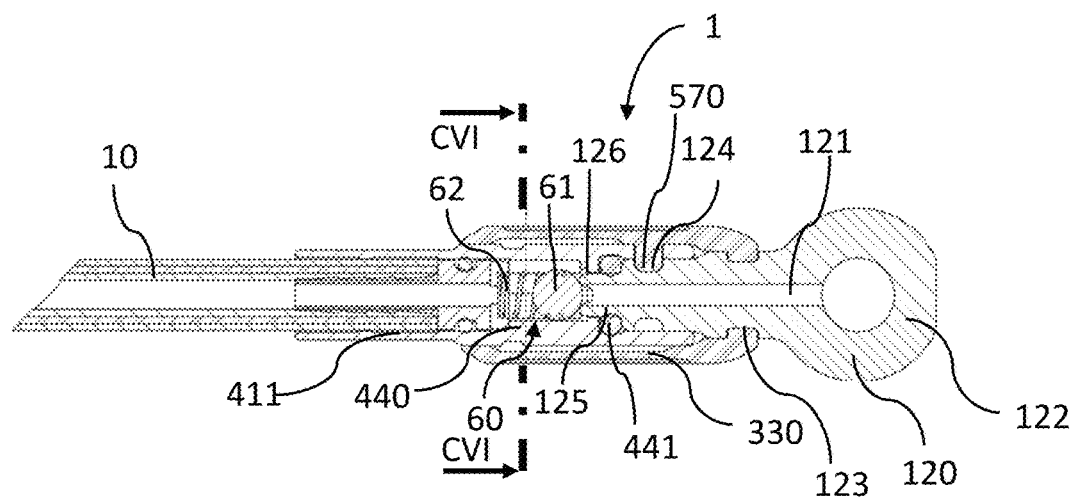
FIG. 105 is a cross-sectional view of a hydraulic line coupling according to an exemplary embodiment along lines CV-CV of FIG. 106.
Figure 106:
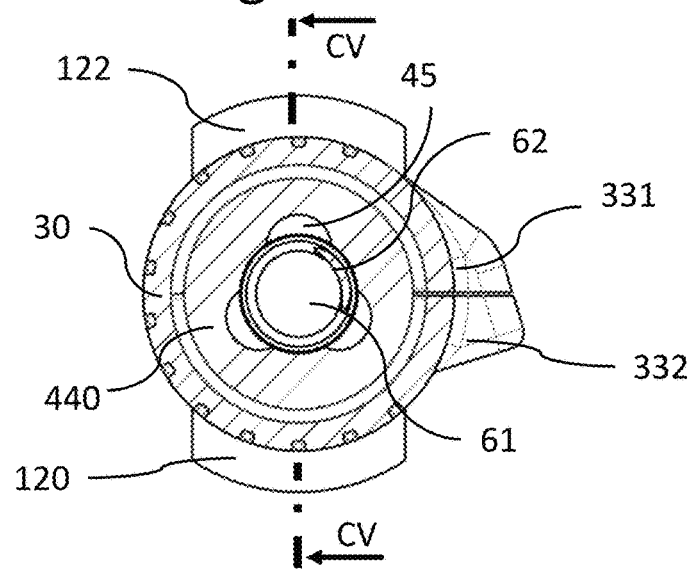
FIG. 106 is a cross-sectional view of the hydraulic line coupling of FIG. 105 along lines CVI-CVI of FIG. 105.
Figure 107:
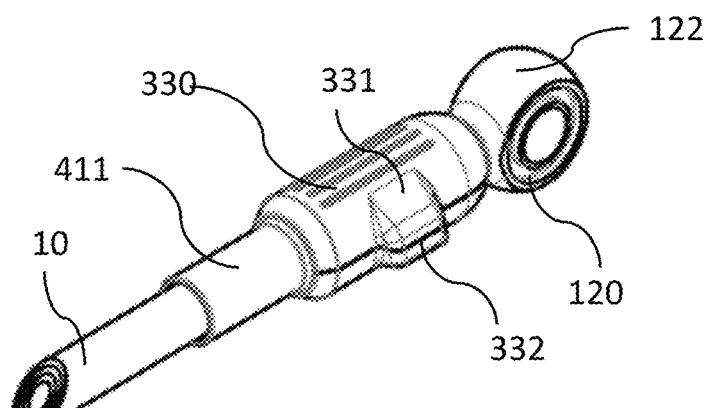
FIG. 107 is a perspective view of the hydraulic line coupling of FIG. 105 diagonally from above.
Figure 108:
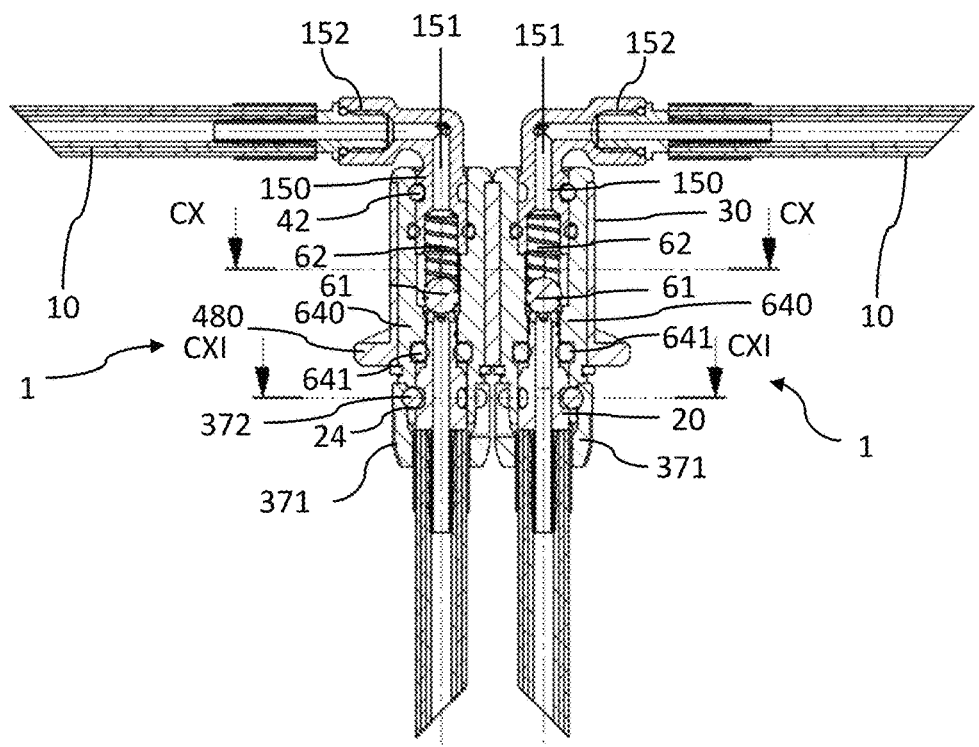
FIG. 108 is a cross-sectional view of a hydraulic line coupling according to an exemplary embodiment along lines CVIII-CVIII of FIG. 109.
Figure 109:
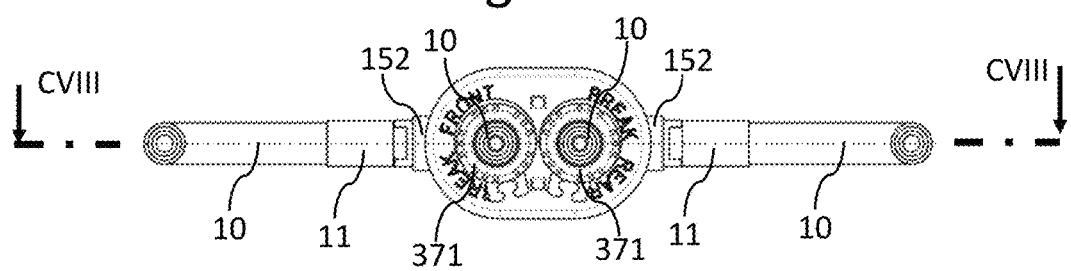
FIG. 109 is a bottom plan view of the hydraulic line coupling of FIG. 108.

FIGS. 105 to 107 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 105 to 107 substantially corresponds to the embodiment of FIGS. 23 to 24, wherein a housing 330 is also shown. The housing 330 has two closure portions 331, 332 where it can be connected to each other, for example, by a snap-in connection and/or a self-locking non-detachable connection.

The two hydraulic line couplings 1 of the two valve chamber housings 440 can, for example, be configured as shown in FIG. 23. The housing 330 can have a projection 570 on its inner side, with which the housing 330 engages in a corresponding recess 124 provided on the linking device 120.

FIGS. 108 to 111 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments. The embodiment of FIGS. 108 to 111 substantially corresponds to the embodiment of FIGS. 66 to 68.

FIGS. 112 to 119 show a further exemplary embodiment that substantially corresponds to the other exemplary embodiments. Equal reference signs denote equal or corresponding components or features. Reference is made to the description of the other exemplary embodiments. In the following, the focus is laid on the differences to the other exemplary embodiments.

The embodiment of FIGS. 112 to 119 substantially corresponds to the embodiment of FIGS. 36 to 37. In contrast to the embodiment shown therein, the pressure chamber housing is not provided as a separate component, but is integrated directly into the master apparatus 2. Thus, the closure device 290 can secure the valve device 60 in the master device 2.

FIGS. 120 to 122 show a possible configuration of a line connection piece 320 that has recesses 328 at its tip between webs 327 to ensure a safe hydraulic connection.

FIGS. 123 to 126 show a possible configuration of the pressure chamber housing 40. The pressure chamber housing 40 has overflow channels on its inner side to ensure a safe hydraulic connection. On its outer side, channels 46, 47 are provided. They are used to check the tightness or correct positioning of the seals 41 or 42 by a pressure test.

FIGS. 127 to 130 show a possible configuration of the valve chamber housing 140. Valve chamber housing 140 has webs 147 and passages 148, 149 on its outer side to ensure a secure hydraulic connection.

FIGS. 131 to 133 show a possible configuration of the valve chamber housing 240. The valve chamber housing 240 has channels 245 on its inner side to ensure a safe hydraulic connection. Alternatively or additionally, the valve chamber housing 240 has webs 247 and passages 248 on its outer side to ensure a safe hydraulic connection.

FIGS. 134 to 138 show the method steps for coupling the hydraulic line 10 to a housing 30 using an example of an embodiment that substantially corresponds to the embodiment of FIGS. 15 to 17, wherein a press sleeve 12 is additionally provided and a protective cap 13 is shown.

In the embodiment shown in FIGS. 134 to 138, the locking device 570 is pressed into the housing 30 such that the line connection piece 20 is secured in the housing 30. For this purpose, the locking device 570 has a press sleeve 571 that engages in a support 24 provided on the line connection piece 20 with an engagement device 572. The press sleeve 571 also has a snap-in device 573 that, after the pressing-in operation, snaps in a corresponding support 304 provided in the housing 30 and secures the press sleeve 570 in the housing 30 by an interlocking connection. The line connection piece 20 is, in turn, fastened in the line connection piece 20 by the interlocking connection between the engagement device 572 and the support 24.

The sequence of the configuration of the hydraulic line 10 with the line connection piece 20 and the press sleeve 571 in the housing 30 makes it clear that the valve device 60 is closed for a very long time, as shown in FIG. 135, and is only opened before the final pressing operation, as shown in FIG. 136. Immediately afterwards, the connection to the outside is closed again by engaging the line connection piece 20 with the sealing area 26 in the seal 241, so that only very little air can enter or very little hydraulic fluid can escape.

Of course, the invention is not limited to the illustrated embodiments. Therefore, the above description should not be regarded as restrictive but as explanatory. The following claims are to be understood such that a stated feature is present in at least one exemplary embodiment. This does not exclude the presence of further features. If the claims and the above description define "first" and "second" embodiments, this designation is used to distinguish between two similar embodiments without determining a ranking order.

What is claimed is:

1. A hydraulic line coupling for a hydraulic brake or clutch of vehicles having handlebar steering and a hydraulic line, the hydraulic line coupling comprising:
   first and second line connection pieces separate from one another, each of the line connection pieces comprising an extension shaped to connect to the hydraulic line and defining a passage to be connected to the hydraulic line;
   a housing:
      defining first and second coupling openings in which a respective one of the first and second line connection pieces is to be disposed for coupling the hydraulic line to the housing; and
      defining therein an interior compartment communicating with and disposed between the first and second coupling openings;
   a pressure chamber housing:
      disposed in the interior compartment; and
      defining therein a pressure chamber;
   a valve device disposed in the pressure chamber of the pressure chamber housing and configured to close the first coupling opening when the first line connection piece is not in the first coupling opening;
   first and second seals:
      with which the valve device closes the first coupling opening when the first line connection piece is not in the first coupling opening;
      with which first seal the first line connection piece seals the passage from the environment responsive to the first line connection piece being in the first coupling opening; and
      together with an interior surface of the pressure chamber housing, fluidically sealing off the pressure chamber housing from the environment to, thereby, pressure-tightly connect the passage of the first and second line connection pieces to one another through the pressure chamber responsive to the first and second line connection pieces being in a respective one of the first and second coupling openings, the first and second seals each disposed and formed to seal, in a radial direction, between:
         the pressure chamber housing; and
         a respective one of the first and second line connection pieces inserted into a respective one of the first and second coupling openings.

2. The hydraulic line coupling according to claim 1, wherein the pressure chamber housing is configured as a valve chamber housing.

3. The hydraulic line coupling according to claim 1, wherein:
the pressure chamber housing has opposite axial ends; and
the opposite axial ends of the pressure chamber housing is are configured to apply a force to a respective one of the first and second seals in an axial direction.

4. The hydraulic line coupling according to claim 1, wherein the housing:
comprises a support in which the first line connection piece is disposed; and
accommodates the valve device, the valve device comprising a valve closure member disposed in the pressure chamber of the pressure chamber housing and configured to connect the pressure chamber of the pressure chamber housing to the passage of each of the first and second line connection pieces.

5. The hydraulic line coupling according to claim 1, wherein the housing comprises a support in which is disposed the first line connection piece for connecting the hydraulic line and the first line connection piece, and which further comprises a locking device comprising a press sleeve, the locking device securing the first line connection piece in the housing with the press sleeve of the locking device.

6. The hydraulic line coupling according to claim 1, wherein the housing comprises a support in which is disposed the first line connection piece for connecting the hydraulic line and the first line connection piece, and which further comprises a locking device comprising a twist cap, the locking device securing the first line connection piece in the housing with the twist cap.

7. The hydraulic line coupling according to claim 1, wherein the hydraulic line coupling comprises a locking device securing the first line connection piece in the housing.

8. The hydraulic line coupling according to claim 7, wherein the locking device is secured with an interlocking connection to the first line connection piece and with an interlocking connection to the housing such that an indirect interlocking connection between the first line connection piece and the housing is created through the locking device.

9. The hydraulic line coupling according to claim 1, wherein the pressure chamber housing defines a valve chamber housing and the valve device is disposed in the valve chamber housing.

10. The hydraulic line coupling according to claim 9, wherein:
the valve chamber housing has opposite axial ends; and
the opposite axial ends of the valve chamber housing apply a force to a respective one of the first and second seals in an axial direction.

11. The hydraulic line coupling according to claim 1, wherein:
the hydraulic brake or clutch of the vehicle having handlebar steering has a hydraulic component; and
the housing has a connecting area shaped to connect to the hydraulic component.

12. A hydraulic line coupling for a hydraulic brake or clutch of vehicles having handlebar steering and a hydraulic line, the hydraulic line coupling comprising:
first and second line connection pieces separate from one another and each comprising an extension shaped to connect to the hydraulic line, each of the first and second line connection pieces defining a passage to be connected to the hydraulic line;
a housing;
defining first and second coupling openings in which a respective one of the first and second line connection pieces is to be disposed for coupling the hydraulic line to the housing; and
defining therein an interior compartment communicating with and disposed between the first and second coupling openings;
a pressure chamber housing:
disposed in the interior compartment; and
defining a pressure chamber;
first and second seals, together with an interior surface of the pressure chamber housing, fluidically sealing off the pressure chamber housing from the environment to, thereby, pressure-tightly connect the passage of the first and second line connection pieces to one another through the pressure chamber responsive to the first and second line connection pieces being in a respective one of the first and second coupling openings, the first and second seals each disposed and formed to seal, in a radial direction, between:
the pressure chamber housing; and
a respective one of the first and second line connection pieces inserted into a respective one of the first and second coupling openings.

13. The hydraulic line coupling according to claim 12, wherein the housing:
comprises a support in which the first line connection piece is disposed; and
accommodates a valve device comprising a valve closure member disposed in the housing and configured to connect the pressure chamber of the pressure chamber housing to the passage of the first line connection piece.

14. The hydraulic line coupling according to claim 12, wherein the housing comprises a support in which is disposed the first line connection piece for connecting the hydraulic line and the first line connection piece, and which further comprises a locking device comprising a press sleeve, the locking device securing the first line connection piece in the housing with the press sleeve of the locking device.

15. The hydraulic line coupling according to claim 12, wherein the housing comprises a support in which is disposed the first line connection piece for connecting the hydraulic line and the first line connection piece, and which further comprises a locking device comprising a twist cap, the locking device securing the first line connection piece in the housing with the twist cap.

16. The hydraulic line coupling according to claim 12, which further comprises a valve device disposed in the pressure chamber of the pressure chamber housing and configured to close the first coupling opening when the first line connection piece is not in the first coupling opening, the first seal:
with the valve device configured to close the first coupling opening when the first line connection piece is not in the first coupling opening; and
with the first line connection piece sealing the passage from the environment responsive to the first line connection piece being in the first coupling opening.

17. The hydraulic line coupling according to claim 12, wherein the pressure chamber housing is configured as a valve chamber housing.

18. The hydraulic line coupling according to claim 12, wherein:
the pressure chamber housing has first and second opposite axial ends;

the first a seal is disposed at the first axial end of the pressure chamber housing; and the first axial end of the pressure chamber housing applies a force to the first seal in an axial direction.

19. A hydraulic line coupling for a hydraulic brake or clutch of vehicles having handlebar steering and a hydraulic line, the hydraulic line coupling comprising:

first and second line connection pieces separate from one another and each comprising an extension shaped to connect to the hydraulic line, each of the first and second line connection pieces defining a passage to be connected to the hydraulic line;

a housing;
defining first and second coupling openings in which a respective one of the first and second line connection pieces is to be disposed for coupling the hydraulic line to the housing;
defining therein an interior compartment communicating with and disposed between the first and second coupling openings; and
comprising a support in which the first line connection piece is disposed; and a valve chamber housing:
disposed in the interior compartment;
defining a pressure chamber; and
comprising a valve device disposed in the pressure chamber, the valve device comprising a valve closure member configured to connect the pressure chamber to the passage of the first line connection piece, the pressure chamber pressure-tightly connected to the passage of the first line connection piece; and first and second seals, together with an interior surface of the valve chamber housing, fluidically sealing off the valve chamber housing from the environment to, thereby, pressure-tightly connect the passage of the first and second line connection pieces to one another through the pressure chamber responsive to the first and second line connection pieces being in a respective one of the first and second coupling openings, the first and second seals each disposed and formed to seal, in a radial direction, between:
the valve chamber housing; and
a respective one of the first and second line connection pieces inserted into a respective one of the first and second coupling openings.

20. The hydraulic line coupling according to claim 19, which further comprises a locking device comprising a press sleeve, the locking device securing the first line connection piece in the housing with the press sleeve of the locking device.

21. The hydraulic line coupling according to claim 19, which further comprises a locking device comprising a twist cap, the locking device securing the first line connection piece in the housing with the twist cap.

22. The hydraulic line coupling according to claim 19, wherein:
the valve chamber housing has first and second opposite axial ends;
the first a seal is disposed at the first axial end of the valve chamber housing; and
the first axial end of the valve chamber housing applies a force to the first seal in an axial direction.

23. A hydraulic line coupling for a hydraulic brake or clutch of vehicles having handlebar steering and a hydraulic line, the hydraulic line coupling comprising:

first and second line connection pieces separate from one another and each comprising an extension shaped to connect to the hydraulic line, each of the first and second line connection pieces defining a passage to be connected to the hydraulic line;

a housing:
defining first and second coupling openings in which a respective one of the first and second line connection pieces is to be disposed for coupling the hydraulic line to the housing;
defining therein an interior compartment communicating with and disposed between the first and second coupling openings; and
comprising a support in which is disposed the first line connection piece for connecting the hydraulic line and the first line connection piece; and a pressure chamber housing:
disposed in the interior compartment; and
defining a pressure chamber;

first and second seals, together with an interior surface of the pressure chamber housing, fluidically sealing off the pressure chamber housing from the environment to, thereby, pressure-tightly connect the passage of the first and second line connection pieces to one another through the pressure chamber responsive to the first and second line connection pieces being in a respective one of the first and second coupling openings, the first and second seals each disposed and formed to seal, in a radial direction, between:
the pressure chamber housing; and
a respective one of the first and second line connection pieces inserted into a respective one of the first and second coupling openings; and
a locking device comprising a press sleeve, the locking device securing the first line connection piece in the housing with the press sleeve of the locking device.

* * * * *